US009495435B2

(12) United States Patent
Zhang et al.

(10) Patent No.: US 9,495,435 B2
(45) Date of Patent: Nov. 15, 2016

(54) SYSTEM AND METHOD FOR INTELLIGENT DATABASE BACKUP

(71) Applicant: Actifio, Inc., Waltham, MA (US)

(72) Inventors: Xiangdong Zhang, Wellesley, MA (US); Madhav Mutalik, Southborough, MA (US); Sachindra Kumar, Framingham, MA (US)

(73) Assignee: ACTIFIO, INC., Waltham, MA (US)

( * ) Notice: Subject to any disclaimer, the term of this patent is extended or adjusted under 35 U.S.C. 154(b) by 444 days.

(21) Appl. No.: 13/920,950

(22) Filed: Jun. 18, 2013

(65) Prior Publication Data
US 2013/0339302 A1 Dec. 19, 2013

Related U.S. Application Data

(60) Provisional application No. 61/661,135, filed on Jun. 18, 2012.

(51) Int. Cl.
*G06F 17/30* (2006.01)
*G06F 11/14* (2006.01)
(Continued)

(52) U.S. Cl.
CPC ......... *G06F 17/30581* (2013.01); *G06F 3/065* (2013.01); *G06F 3/0617* (2013.01); *G06F 3/0683* (2013.01); *G06F 11/1451* (2013.01); *G06F 11/1461* (2013.01); *G06F 17/30088* (2013.01); *G06F 17/30303* (2013.01); *G06F 17/30578* (2013.01); *H04L 67/10* (2013.01); *G06F 11/1453* (2013.01); *G06F 11/1456* (2013.01); *G06F 2201/80* (2013.01); *G06F 2201/84* (2013.01); *H04L 67/1095* (2013.01)

(58) Field of Classification Search
CPC .............. G06F 17/30097; G06F 17/30578; G06F 17/30159; G06F 17/30212; G06F 17/30088
USPC ............... 707/648, 649, 644, 640, 650
See application file for complete search history.

(56) References Cited

U.S. PATENT DOCUMENTS

| 4,626,829 A | 12/1986 | Hauck |
| 5,381,545 A | 1/1995 | Baker et al. |
| 5,410,667 A | 4/1995 | Belsan et al. |

(Continued)

OTHER PUBLICATIONS

Alapati, "NetApp Technical Report: SnapMirror Sync and SnapMirror Semi-Sync Overview and Design Considerations," NetApp, Jul. 2010 (24 pages).

(Continued)

*Primary Examiner* — Monica Pyo
(74) *Attorney, Agent, or Firm* — Wilmer Cutler Pickering Hale and Dorr LLP

(57) ABSTRACT

Systems and methods are provided for backing up database storage. A protection policy for database storage is activated at a remote host, wherein the database storage is not physically accessible by the computing device, such that the out-of-band storage is not in communication with the remote host through the computing device. A backup request is transmitted to the remote host comprising data indicative of a volume on the database storage to back up according to the protection policy. A response to the backup request is received comprising staging disk requirements including a required size for a staging disk. A staging disk is determined based on the response. The staging disk is presented to the remote host so that the remote host can perform a backup of the volume to the staging disk using a database backup tool provided by a vendor of the database storage.

20 Claims, 49 Drawing Sheets

(51) Int. Cl.
*H04L 29/08* (2006.01)
*G06F 3/06* (2006.01)

(56) References Cited

U.S. PATENT DOCUMENTS

| | | | |
|---|---|---|---|
| 5,497,483 A | 3/1996 | Beardsley et al. |
| 5,535,381 A | 7/1996 | Kopper |
| 5,819,292 A | 10/1998 | Hitz et al. |
| 5,828,876 A | 10/1998 | Fish et al. |
| 5,857,208 A | 1/1999 | Ofek |
| 5,963,962 A | 10/1999 | Hitz et al. |
| 6,065,018 A | 5/2000 | Beier et al. |
| 6,081,875 A | 6/2000 | Clifton et al. |
| 6,119,208 A | 9/2000 | White et al. |
| 6,131,148 A | 10/2000 | West et al. |
| 6,148,412 A | 11/2000 | Cannon et al. |
| 6,163,856 A | 12/2000 | Dion et al. |
| 6,192,444 B1 | 2/2001 | White et al. |
| 6,199,146 B1 | 3/2001 | Pence |
| 6,202,071 B1 | 3/2001 | Keene |
| 6,212,531 B1 | 4/2001 | Blea et al. |
| 6,226,759 B1 | 5/2001 | Miller et al. |
| 6,269,381 B1 | 7/2001 | St. Pierre et al. |
| 6,269,431 B1 | 7/2001 | Dunham |
| 6,324,548 B1 | 11/2001 | Sorenson |
| 6,330,614 B1 | 12/2001 | Aggarwal et al. |
| 6,341,291 B1 | 1/2002 | Bentley et al. |
| 6,434,681 B1 | 8/2002 | Armangau |
| 6,460,055 B1 | 10/2002 | Midgley et al. |
| 6,484,186 B1 | 11/2002 | Rungta |
| 6,487,561 B1 | 11/2002 | Ofek et al. |
| 6,557,089 B1 | 4/2003 | Reed et al. |
| 6,625,704 B2 | 9/2003 | Winokur |
| 6,654,772 B1 | 11/2003 | Crow et al. |
| 6,654,912 B1 | 11/2003 | Viswanathan et al. |
| 6,665,815 B1 | 12/2003 | Goldstein et al. |
| 6,668,264 B1 | 12/2003 | Patterson et al. |
| 6,772,302 B1 | 8/2004 | Thompson |
| 6,779,094 B2 | 8/2004 | Selkirk et al. |
| 6,823,336 B1 | 11/2004 | Srinivasan et al. |
| 6,823,436 B2 | 11/2004 | Krishnamurthy |
| 6,850,929 B2 | 2/2005 | Chang et al. |
| 6,898,688 B2 | 5/2005 | Martin et al. |
| 6,915,397 B2 | 7/2005 | Lubbers et al. |
| 6,928,526 B1 | 8/2005 | Zhu et al. |
| 6,948,039 B2 | 9/2005 | Biessener et al. |
| 6,957,362 B2 | 10/2005 | Armangau |
| 7,072,916 B1 | 7/2006 | Lewis et al. |
| 7,143,251 B1 | 11/2006 | Patterson |
| 7,222,194 B2 | 5/2007 | Kano et al. |
| 7,325,111 B1 | 1/2008 | Jiang |
| 7,346,623 B2 | 3/2008 | Prahlad et al. |
| 7,386,695 B2 | 6/2008 | Fuente |
| 7,428,657 B2 | 9/2008 | Yamasaki |
| 7,647,355 B2 | 1/2010 | Best et al. |
| 7,685,460 B1 | 3/2010 | Bingham et al. |
| 7,689,633 B1 | 3/2010 | Li et al. |
| 7,707,184 B1 | 4/2010 | Zhang et al. |
| 7,814,128 B2 | 10/2010 | Silvers et al. |
| 7,937,547 B2 | 5/2011 | Liu et al. |
| 8,037,032 B2 | 10/2011 | Pershin et al. |
| 8,139,575 B2 | 3/2012 | Biran et al. |
| 8,150,808 B2 | 4/2012 | Zha et al. |
| 8,161,077 B2 | 4/2012 | Zha et al. |
| 8,180,740 B1 | 5/2012 | Stager et al. |
| 8,180,742 B2 | 5/2012 | Claudatos et al. |
| 8,299,944 B2 | 10/2012 | Provenzano |
| 8,321,385 B2 | 11/2012 | Burroughs et al. |
| 8,407,191 B1 | 3/2013 | Nanda |
| 8,468,174 B1 | 6/2013 | Yueh et al. |
| 8,548,944 B2 | 10/2013 | Yueh |
| 8,566,361 B2 | 10/2013 | Zha et al. |
| 8,706,833 B1 | 4/2014 | Bergant et al. |
| 8,788,769 B2 | 7/2014 | Abercrombie et al. |
| 9,020,900 B2 * | 4/2015 | Vijayan |
| | | Retnamma ........ G06F 17/30312 |
| | | 707/652 |
| 9,098,432 B1 | 8/2015 | Bachu et al. |
| 2002/0129214 A1 | 9/2002 | Sarkar |
| 2002/0161911 A1 | 10/2002 | Pinckney et al. |
| 2003/0101321 A1 | 5/2003 | Ohran |
| 2003/0140070 A1 | 7/2003 | Kaczmarski et al. |
| 2004/0199570 A1 | 10/2004 | Terao |
| 2005/0055521 A1 | 3/2005 | Saika |
| 2005/0066095 A1 | 3/2005 | Mullick et al. |
| 2005/0086195 A1 * | 4/2005 | Tan ................ G06F 17/30289 |
| 2005/0165794 A1 | 7/2005 | Mosescu |
| 2006/0053181 A1 | 3/2006 | Anand et al. |
| 2006/0053259 A1 | 3/2006 | Berkowitz et al. |
| 2006/0074945 A1 | 4/2006 | Mori |
| 2006/0112219 A1 | 5/2006 | Chawla et al. |
| 2006/0123210 A1 | 6/2006 | Pritchett et al. |
| 2007/0060113 A1 | 3/2007 | Bonnette et al. |
| 2008/0098013 A1 | 4/2008 | Byng |
| 2008/0098043 A1 | 4/2008 | Galipeau et al. |
| 2009/0222496 A1 | 9/2009 | Liu et al. |
| 2009/0271412 A1 | 10/2009 | Lacapra et al. |
| 2010/0049929 A1 | 2/2010 | Nagarkar et al. |
| 2010/0088277 A1 | 4/2010 | Rao et al. |
| 2010/0228819 A1 | 9/2010 | Wei |
| 2011/0047195 A1 | 2/2011 | Le et al. |
| 2011/0258161 A1 | 10/2011 | Constantinescu et al. |
| 2011/0307447 A1 | 12/2011 | Sabaa et al. |
| 2012/0078899 A1 | 3/2012 | Fontana et al. |
| 2012/0124307 A1 | 5/2012 | Ashutosh et al. |
| 2013/0139113 A1 | 5/2013 | Choudhary et al. |
| 2013/0339319 A1 | 12/2013 | Woodward et al. |

OTHER PUBLICATIONS

American Megatrends, Inc., "StorTrends/ManageTrends (Version 2.7) User's Guide for the StorTends 1300 Storage Appliance" Mar. 23, 2009 (378 pages).

Arrell et al., "Using RVA and SnapShot for Business Intelligence Applications with OS/390 and DB2," IBM, Redbooks, Aug. 1998 (70 pages).

Azagury et al., "Point-in-Time Copy: Yesterday, Today and Tomorrow," IBM Research Lab in Haifa, No Date Listed (pp. 259-270).

Baird, "Virtual Storage Architecture Guide (VSAG)," IEEE, No Month Listed 1995 (pp. 312-326).

Baker, "Disk-Based Mirroring Is a Lot More Than Just Safe," Computer Technology Review, No Month Listed 2000 (pp. 55-57).

Brown et al., "SnapMirror and SnapRestore: Advances in Snapshot Technology," retrieved online at [URL:<<https://web.archive.org/web/2011126183455/http://www.netapp.com/tech_library/3043.html>>] No Date Listed (13 pages).

Cederqvist et al., "Version Management with CVS," No Month Listed 1992 (122 pages).

Chang et al., "Performance Analysis of Two Frozen Image Based Backup/Restore Methods," IEEE International Conference on Electron Information Technology 2005, May 22-25, 2005 (7 pages).

Chapman et al., "SnapMirror® Best Practices Guide," Network Appliance, Inc., Apr. 2006 (63 pages).

Chatterjee et al., "Efficient Replication Leveraging Information Lifecycle Management in Data Storage Systems," Provisional Patent Application No. Not Available, Feb. 9, 2009 (25 pages).

Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 1998 (17 pages).

Chutani et al., "The Episode File System," Usenix Association, Proceedings of the Winter 1992 Usenix Conference, San Francisco, California, Jan. 20-24, 1992 (19 pages).

CommVault, "CommVault® Simpana® Quick Recovery® Software for Critical Data Center Applications and File Systems," No Month Listed 2010 (35 pages).

Dantz Development Corporation, "Retrospect® User's Guide," No Month Listed 2002 (262 pages).

(56) References Cited

OTHER PUBLICATIONS

Degwekar, "Using SnapMirror® with SnapDrive® for Unix®," No Month Listed 2007 (11 pages).
Delphix Corp.'s Invalidity Contentions Under Patent L.R. 3-3, Jul. 24, 2014 (27 pages).
Edwards et al., "FlexVol: Flexible, Efficient File vol. Virtualization in WAFL," Usenix Association, Usenix '08: 2008 Usenix Annual Technical Conference, No Month Listed 2008 (pp. 129-142).
You et al., "Deep Store: An Archival Storage System Architecture," Proceedings of the 21st International Conference on Data Engineering, No Month Listed 2005 (12 pages).
Zhang et al., "yFS: A Journaling File System Design for Handling Large Data Sets with Reduced Seeking," Usenix Association, Proceedings of FAST '03: 2nd Usenix Conference on File and Storage Technologies, San Francisco, California, Mar. 31-Apr. 2, 2003 (15 pages).
EMC, "Backup of Oracle in EMC Symmetrix Environments with EMC NetWorker PowerSnap," Aug. 2008 (25 pages).
Zhu et al., "Avoiding the Disk Bottleneck in the Data Domain Deduplication File System," Proceedings of the 6th Usenix Conference on File and Storage Technologies FAST 2008, San Jose, California, No Month Listed 2008 (14 pages).
EMC, "EMC Celerra Version 5.6 Technical Primer: SLA-Driven Replication with Celerra Replicator (V2): Technology Concepts and Business Considerations," Jul. 2008 (20 pages).
EMC, "EMC DL1500 and DL3000 with EMC NetWorker: Best Practices Planning," Jul. 2009 (36 pages).
EMC, "EMC TimeFinder Product Description Guide," No Date Listed (34 pages).
EMC, "Next-Generation Backup-to-Disk: Building the Foundation for Effective Operational Recovery Management," Jan. 31, 2005 (9 pages).
EMC, "Unified Backup and Recovery with EMC NetWorker," Mar. 2010 (16 pages).
Exhibit 1004 IPR2015-01689, Declaration of Ellie Young, Aug. 5, 2015 (24 pages).
Exhibit 1006 IPR2015-01678, Pfaffenberger, Webster's New World Computer Dictionary Ninth Edition, Hungry Minds, Inc., New York, New York, No Month Listed 2001 (4 pages).
Exhibit 1006 IPR2015-01689, File History for U.S. Appl. No. 12/947,393, Apr. 14, 2015 (108 pages).
Exhibit 1006v2 IPR2015-01689, Version 2, File History for U.S. Appl. No. 12/947,393, No Date Listed (177 pages).
Exhibit 1006v3 IPR2015-01689, Version 3, File History for U.S. Appl. No. 12/947,393, No Date Listed (150 pages).
Exhibit 1006v4 IPR2015-01689, Version 4, File History for U.S. Appl. No. 12/947,393, No Date Listed (98 pages).
Exhibit 1007 IPR2015-01678, Microsoft Computer Dictionary Fourth Edition, Microsoft Press, Redmond, Washington, No Month Listed 1999 (3 pages).
Exhibit 1007 IPR2015-01689, Declaration of Prashant Shenoy, Ph.D. in Support of Petition for Inter Partes Review, Aug. 5, 2015 (82 pages).
Exhibit 1008 IPR2015-01678, File History for U.S. Appl. No. 12/947,438, Apr. 14, 2015 (100 pages).
Exhibit 1008v2 IPR2015-01678, Version 2, File History for U.S. Appl. No. 12/947,438, No Date Listed (103 pages).
Exhibit 1009 IPR2015-01678, Declaration of Prashant Shenoy, Ph.D. in Support of Petition for Inter Partes Review, Aug. 5, 2015 (58 pages).
Exhibit 1010 IPR2015-01678, Rivest, "The MD5 Message-Digest Algorithm," retrieved online at [URL:<<https://www.ietf.org/rfc/rfc1321.txt>>] Apr. 1992 (20 pages).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 1995 (24 pages).

Exhibit A-01 to Delphix Corp.'s Preliminary Invalidity and Non-Infringement Contentions, "Data Domain ("Data Domain") as Prior Art to U.S. Pat. No. 6,732,244," Jul. 3, 2015 (7 pages).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," Jul. 3, 2015 (7 pages).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," Jul. 3, 2015 (7 pages).
Exhibit A-04 to Delphix Corp.'s Preliminary Invalidity and Non-Infringement Contentions, "U.S. Pat. No. 6,269,431 as Prior Art to U.S. Pat. No. 6,732,244," Jul. 3, 2015 (27 pages).
Exhibit A-05 to Delphix Corp.'s Preliminary Invalidity and Non-Infringement Contentions, "U.S. Pat. No. 6,915,397 ("The '397 patent") as Prior Art to U.S. Pat. No. 6,732,244," Jul. 3, 2015 (44 pages).
Exhibit A-06 to Delphix Corp.'s Preliminary Invalidity and Non-Infringement Contentions, "Hutchinson as Claim Chart for U.S. Pat. No. 6,732,244," Jul. 3, 2015 (64 pages).
Exhibit A-07 to Delphix Corp.'s Preliminary Invalidity and Non-Infringement Contentions, "Petal: Distributed Virtual Disks (Lee) as Prior Art to U.S. Pat. No. 6,732,244," Jul. 3, 2015 (35 pages).
Exhibit A-08 to Delphix Corp.'s Preliminary Invalidity and Non-Infringement Contentions, "EMC TimeFinder as Prior Art to U.S. Pat. No. 6,732,244," Jul. 3, 2015 (51 pages).
Exhibit A-09 to Delphix Corp.'s Preliminary Invalidity and Non-Infringement Contentions, "U.S. Pat. No. 6,434,681 as Prior Art to U.S. Pat. No. 6,732,244," Jul. 3, 2015 (19 pages).
Exhibit A-10 to Delphix Corp.'s Preliminary Invalidity and Non-Infringement Contentions, "U.S. Pat. No. 7,072,916 ("The '916 patent") as Prior Art to U.S. Pat. No. 6,732,244," Jul. 3, 2015 (65 pages).
Exhibit A-11 to Delphix Corp.'s Preliminary Invalidity and Non-Infringement Contentions, "U.S. Pat. No. 6,898,688 as Prior Art to U.S. Pat. No. 6,732,244," Jul. 3, 2015 (35 pages).
Exhibit A-12 to Delphix Corp.'s Preliminary Invalidity and Non-Infringement Contentions, "Chervenak as Prior Art to U.S. Pat. No. 6,732,244," Jul. 3, 2015 (21 pages).
Exhibit A-13 to Delphix Corp.'s Preliminary Invalidity and Non-Infringement Contentions, "IBM ADSTAR Distributed Storage Manager ("ADSM")/Tivoli Storage Manager as Prior Art to U.S. Pat. No. 6,732,244," Jul. 3, 2015 (52 pages).
Exhibit A-14 to Delphix Corp.'s Preliminary Invalidity and Non-Infringement Contentions, "Green, Designing a Fast On-line Backup System for a Log-structured File System as Prior Art to U.S. Pat. No. 6,732,244," Jul. 3, 2015 (80 pages).
Exhibit A-15 to Delphix Corp.'s Preliminary Invalidity and Non-Infringement Contentions, "U.S. Pat. No. 5,535,381 as Prior Art to U.S. Pat. No. 6,732,244," Jul. 3, 2015 (53 pages).
Exhibit A-16 to Delphix Corp.'s Preliminary Invalidity and Non-Infringement Contentions, "IBM Ramac Virtual Array ("RAMAC" or "RVA") as Prior Art to U.S. Pat. No. 6,732,244," Jul. 3, 2015 (68 pages).
Exhibit A-17 to Delphix Corp.'s Preliminary Invalidity and Non-Infringement Contentions, "The Episode File System ("Episode") as Prior Art to U.S. Pat. No. 6,732,244," Jul. 3, 2015 (21 pages).
Exhibit A-18 to Delphix Corp.'s Preliminary Invalidity and Non-Infringement Contentions, "Informix Storage Manager and Database Servers ("Informix") as Prior Art to U.S. Pat. No. 6,732,244," Jul. 3, 2015 (34 pages).
Exhibit A-19 to Delphix Corp.'s Preliminary Invalidity and Non-Infringement Contentions, "U.S. Pat. No. 6,779,094 ("the '094 patent") as Prior Art to U.S. Pat. No. 6,732,244," Jul. 3, 2015 (44 pages).
Exhibit A-20 to Delphix Corp.'s Preliminary Invalidity and Non-Infringement Contentions, "EMC NetWorker/Legato NetWorker ("NetWorker") as Prior Art to U.S. Pat. No. 6,732,244," Jul. 3, 2015 (59 pages).
Exhibit A-21 to Delphix Corp.'s Preliminary Invalidity and Non-Infringement Contentions, "EMC TimeFinder as Prior Art to U.S. Pat. No. 6,732,244," Jul. 3, 2015 (51 pages).

(56) References Cited

OTHER PUBLICATIONS

Exhibit A-22 to Delphix Corp.'s Preliminary Invalidity and Non-Infringement Contentions, "Retrospect as Prior Art to U.S. Pat. No. 6,732,244," Jul. 3, 2015 (12 pages).
Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," Jul. 3, 2015 (25 pages).
Exhibit B-01 to Delphix Corp.'s Preliminary Invalidity and Non-Infringement Contentions, "Data Domain ("Data Domain") as Prior Art to U.S. Pat. No. 6,959,369," Jul. 3, 2015 (10 pages).
Exhibit B-02 to Delphix Corp.'s Preliminary Invalidity and Non-Infringement Contentions, "Hitachi ShadowImage ("ShadowImage") as Prior Art to U.S. Pat. No. 6,959,369," Jul. 3, 2015 (10 pages).
Exhibit B-03 to Delphix Corp.'s Preliminary Invalidity and Non-Infringement Contentions, "U.S. Pat. No. 6,269,431 as Prior Art to U.S. Pat. No. 6,959,369," Jul. 3, 2015 (42 pages).
Exhibit B-04 to Delphix Corp.'s Preliminary Invalidity and Non-Infringement Contentions, "Green, Designing a Fast On-line Backup System for a Log-structured File System as Prior Art to U.S. Pat. No. 6,959,369," Jul. 3, 2015 (104 pages).
Exhibit B-05 to Delphix Corp.'s Preliminary Invalidity and Non-Infringement Contentions, "U.S. Pat. No. 5,535,381 as Prior Art to U.S. Pat. No. 6,959,369," Jul. 3, 2015 (84 pages).
Exhibit B-06 to Delphix Corp.'s Preliminary Invalidity and Non-Infringement Contentions, "Hutchinson as Claim Chart for U.S. Pat. No. 6,959,369," Jul. 3, 2015 (80 pages).
Exhibit B-07 to Delphix Corp.'s Preliminary Invalidity and Non-Infringement Contentions, "U.S. Patent Application No. 2003/0140070 ("the '070 application") as Prior Art to U.S. Pat. No. 6,959,369," Jul. 3, 2015 (67 pages).
Exhibit B-08 to Delphix Corp.'s Preliminary Invalidity and Non-Infringement Contentions, "U.S. Pat. No. 6,898,688 as Prior Art to U.S. Pat. No. 6,959,369," Jul. 3, 2015 (53 pages).
Exhibit B-09 to Delphix Corp.'s Preliminary Invalidity and Non-Infringement Contentions, "U.S. Pat. No. 6,434,681 as Prior Art to U.S. Pat. No. 6,959,369," Jul. 3, 2015 (44 pages).
Exhibit B-10 to Delphix Corp.'s Preliminary Invalidity and Non-Infringement Contentions, "U.S. Pat. No. 7,072,916 ("the '916 patent") as Prior Art to U.S. Pat. No. 6,959,369," Jul. 3, 2015 (59 pages).
Exhibit B-11 to Delphix Corp.'s Preliminary Invalidity and Non-Infringement Contentions, "Chervenak as Prior Art to U.S. Pat. No. 6,959,369," Jul. 3, 2015 (69 pages).
Exhibit B-12 to Delphix Corp.'s Preliminary Invalidity and Non-Infringement Contentions, "IBM Adstar Distributed Storage Manager ("ADSM")/Tivoli Storage Manager as Prior Art to U.S. Pat. No. 6,959,369," Jul. 3, 2015 (54 pages).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," Jul. 3, 2015 (51 pages).
Exhibit B-14 to Delphix Corp.'s Preliminary Invalidity and Non-Infringement Contentions, "U.S. Pat. No. 6,915,397 ("the '397 patent") as Prior Art to U.S. Pat. No. 6,959,369," Jul. 3, 2015 (94 pages).
Exhibit B-15 to Delphix Corp.'s Preliminary Invalidity and Non-Infringement Contentions, "IBM Ramac Virtual Array ("RAMAC" or "RVA") as Prior Art to U.S. Pat. No. 6,959,369," Jul. 3, 2015 (89 pages).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," Jul. 3, 2015 (65 pages).
Exhibit B-17 to Delphix Corp.'s Preliminary Invalidity and Non-Infringement Contentions, "EMC NetWorker/Legato NetWorker ("NetWorker") as Prior Art to U.S. Pat. No. 6,959,369," Jul. 3, 2015 (92 pages).
Exhibit B-18 to Delphix Corp.'s Preliminary Invalidity and Non-Infringement Contentions, "Retrospect as Prior Art to U.S. Pat. No. 6,959,369," Jul. 3, 2015 (35 pages).
Exhibit B-19 to Delphix Corp.'s Preliminary Invalidity and Non-Infringement Contentions, "EMC TimeFinder as Prior Art to U.S. Pat. No. 6,959,369," Jul. 3, 2015 (90 pages).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," Jul. 3, 2015 (70 pages).
Exhibit B-21 to Delphix Corp.'s Preliminary Invalidity and Non-Infringement Contentions, "NetApp Data Protection Solution ("NetApp") as Prior Art to U.S. Pat. No. 6,959,369," Jul. 3, 2015 (58 pages).
Exhibit B-22 to Delphix Corp.'s Preliminary Invalidity and Non-Infringement Contentions, "U.S. Pat. No. 6,119,208 to White et al. ("White") as Prior Art to U.S. Pat. No. 6,959,369," Jul. 3, 2015 (43 pages).
Friess et al., "Windows NT Backup and Recovery with ADSM," IBM, Redbooks, May 1998 (190 pages).
Galli, "Journal File Systems in Linux," Upgrade the European Online Magazine for the IT Professional, vol. 2, No. 6, Dec. 2001 (8 pages).
Garrett et al., "Syncsort Backup Express and NetApp: Advances Data Protection and Disaster Recovery," Enterprise Strategy Group, Jan. 2009 (19 pages).
Gordon, "High Noon-Backup and Recovery: What Works, What Doesn't and Why," Enterprise Systems Journal, vol. 15, No. 9, Sep. 2000 (5 pages).
Green et al., "Designing a Fast, On-Line Backup System for a Log-Structured File System," Digital Technical Journal, vol. 8, No. 2, No Month Listed 1996 (pp. 32-45).
Gu et al., "DB2 UDB Backup and Recovery with ESS Copy Services," IBM, Redbooks, Aug. 2002 (144 pages).
Hendricks et al., "Improving Small File Performance in Object-Based Storage," Parallel Data Laboratory, Carnegie Mellon University, Pittsburgh, Pennsylvania, May 2006 (21 pages).
Herrin et al., "The Viva File System," retrieved online at [URL:<<http://www.cs.wisc.edu/~shankar/Viva/viva.html>>] Jun. 14, 1997 (26 pages).
Heyt et al., "Tivoli Storage Manager Version 3.7: Technical Guide," IBM, Redbooks, Dec. 1999 (248 pages).
Hitz et al., "File System Design for an NFS File Server Appliance," Network Appliance, Jan. 19, 1994 (23 pages).
Holton et al., "XFS: A Next Generation Journalled 64-Bit Filesystem with Guaranteed Rate I/O," retrieved online at [URL:<<http://www.sgi.com/Technology/xfs-whitepaper.html>>] Jun. 5, 1997 (15 pages).
Hutchinson, "Logical vs. Physical File System Backup," Usenix Association, Proceedings of the 3rd Symposium on Operating Systems Design and Implementation, New Orleans, Louisiana, Feb. 1999 (12 pages).
IBM, "IBM Ramac Virtual Array," IBM, Redbooks, Jul. 1997, (490 pages).
IBM, "Setting Up and Implementing ADSTAR Distributed Storage Manager/400," IBM, Redbooks, Mar. 1995 (350 pages).
Informix Corporation, "Informix Backup and Restore Guide," Dec. 1999 (280 pages).
Informix Corporation, "Informix Storage Manager: Administrators Guide," Dec. 1999 (166 pages).
Isilon Systems, "Backup and Recovery with Isilon IQ Clustered Storage," Aug. 2007 (19 pages).
Kara, "Ext4, btrfs and the others," Linux-Kongress, The International Linux System Technology Conference, Oct. 30, 2009 (15 pages).
Keeton et al., "A Framework for Evaluating Storage System Dependability," Proceedings of the 2004 International Conference on Dependable Systems and Networks, No Month Listed 2004 (10 pages).
Kim et al., "Volume Management in SAN Environment," IEEE, No Month Listed 2001 (pp. 500-505).
Klivansky, "A Thorough Introduction to FlexClone™ Volumes," Network Appliance, Inc., Oct. 2004 (35 pages).

(56) References Cited

OTHER PUBLICATIONS

Klosterman, "Delayed Instantiation Bulk Operations for Management of Distributed, Object-Based Storage Systems," Department of Electrical and Computer Engineering, Carnegie Mellon University, Pittsburgh, Pennsylvania, Aug. 2009 (255 pages).
Kulkarni et al., "Redundancy Elimination Within Large Collections of Files," Usenix Association, Proceedings of the General Track: 2004 Usenix Annual Technical Conference, Boston, MA, Jun. 27-Jul. 2, 2004 (15 pages).
Lee et al., "A Comparison of Two Distributed Disk Systems," Systems Research Center, Palo Alto, California, Apr. 30, 1998 (25 pages).
Lee et al., "Petal: Distributed Virtual Disks," ACM, No Month Listed 1996 (pp. 84-92).
Legato, "Legato NetWorker Release 6.1 UNIX Version: Administrators Guide," No Month Listed 2001 (638 pages).
Leins et al., "Tivoli Storage Manager Version 3.7.3 & 4.1: Technical Guide," IBM, Redbooks, Sep. 2000 (368 pages).
Linett et al., "The Real Problems of Backup," Fourth NASA Goddard Conference on Mass Storage Systems and Technologies, College Park, Maryland, Mar. 28-30, 1995 (13 pages).
Merrill et al., "SnapVault Best Practices Guide," NetApp, No Date Listed (29 pages).
Mesnier et al., "Object-Based Storage," IEEE Communications Magazine, Aug. 2003 (pp. 84-90).
Mesnier et al., "Object-Based Storage," IEEE Potentials, Apr./May 2005 (pp. 31-34).
Milligan et al., "Simplifying Management of Complex Business Operations (A Study of Mainline Storage Virtualization)," CMG 2001 Proceedings, vol. 2, Dec. 2-7, 2001 (13 pages).
Mortimer et al., "ADSM Version 3 Technical Guide," IBM, Redbooks, Dec. 1998 (384 pages).
Mortimer et al., "Using ADSM to Back Up Databases," IBM, Redbooks, Jul. 1998 (618 pages).
Mullender et al., "Immediate Files," Software—Practice and Experience, vol. 14, No. 4, Apr. 1984 (pp. 365-368).
Muller et al., "A High Performance Multi-Structured File System Design," ACM, No Month Listed 1991 (pp. 56-67).
Mushran, "OCFS2: A Cluster File System for Linux: User's Guide for Release 1.4," Jul. 2008 (44 pages).
Muthitacharoen et al., "A Low-Bandwidth Network File System," ACM, No Month Listed 2001 (pp. 174-187).
NetApp, Inc., "Data ONTAP® 7.3 Data Protection: Online Backup and Recovery Guide," Jun. 2008 (405 pages).
NetApp, Inc., "Data ONTAP® 7.3 System Administration Guide," Nov. 2010 (349 pages).
Network Appliance Inc., "Data ONTAP 10.0: Architecture Basic Concepts Guide," Nov. 2006 (18 pages).
Network Appliance Inc., "SnapManager® 2.1 for Oracle® Installation and Administration Guide," Apr. 2007 (272 pages).
Network Appliance, Inc., "Data ONTAP™ 6.3 Command Reference," Network Appliance, Inc., Sunnyvale, California, Aug. 2002 (452 pages).
Network Appliance, Inc., "Network Appliance™ SnapMirror® Software," No Month Listed 2006 (2 pages).
No Author Listed, "FDR InstantBackup™ . . . Innovation Instant Solutions," Innovation Data Processing, No Date Listed (2 pages).
Osuna et al., "Data Protection Strategies in IBM System Storage N Series," IBM, Redbooks, Jun. 2008 (90 pages).
Osuna et al., "IBM System Storage N Series SnapMirror," IBM, Redbooks, Jul. 2006 (124 pages).
Pate et al., "Implementing SnapShot," IBM, Redbooks, Jul. 1999 (214 pages).
Pate et al., "RAMAC Virtual Array, Peer-to-Peer Remote Copy, and IXFP/SnapShot for VSE/ESA," IBM, Redbooks, Jan. 1999 (84 pages).
Pate et al., "RAMAC Virtual Array: Implementing Peer-to-Peer Remote Copy," IBM, Redbooks, Dec. 1998 (140 pages).
Patterson et al., "SnapMirror® File System Based Asynchronous Mirroring for Disaster Recovery," Usenix Association, Proceedings of the FAST 2002 Conference on File and Storage Technologies, Monterey, California, Jan. 28-30, 2002 (14 pages).
Petition for Inter Partes Review of U.S. Pat. No. 8,299,944 Under 35 U.S.C. §§ 311-319 and 37 C.F.R. §§ 42.1-.80, 42.100-.123, Aug. 6, 2015 (43 pages).
Petition for Inter Partes Review of U.S. Pat. No. 8,788,769 Under 35 U.S.C. §§ 311-319 and 37 C.F.R. §§ 42.1-.80, 42.100-.123, Aug. 7, 2015 (71 pages).
Phillips, "Zumastor Linux Storage Server," Proceedings of the Linux Symposium, vol. 2, Ottawa, Ontario, Canada, Jun. 27-30, 2007 (14 pages).
Prahlad et al., "Method for Managing SnapShots Generated by an Operating System or Other Application," U.S. Appl. No. 60/326,021, Sep. 28, 2001 (16 pages).
Quinlan et al., "Venti: A New Approach to Archival Storage," Usenix Association, Proceedings of the Fast 2002 Conference on File and Storage Technologies, Monterey, California, Jan. 28-30, 2002 (14 pages).
Sadagopan et al., "NetApp Technical Report: Oracle Fusion Middleware DR Solution Using NetApp Storage," NetApp., May 2008 (38 pages).
Sarkar, "Instant Image: Transitive and Cyclical Snapshots in Distributed Storage Volumes," Euro-Par 2000, No Month Listed 2000 (pp. 1284-1291).
Schuettinger et al., "Helping DBAs Become More Efficient: NetApp Efficiency and Manageability Advantages," NetApp, Inc., Jul. 2009 (12 pages).
Solid et al., "Network Appliance Adds SnapRestore, SnapMirror to OnTap," Computergram International, Apr. 26, 1999 (2 pages).
Solter et al., "OpenSolaris™ Bible," Wiley Publishing, Inc. Indianapolis, Indiana, No Month Listed 2009 (9 pages).
Sweeney, "xFS In-core (node Management," retrieved online at [URL:<<http://linux-xfs.sgi.com/projects/xfs/design_docs/>>] Nov. 29, 1993 (10 pages).
Symantec Corporation, "Symantec Backup Exec Quick Recovery & Off-Host Backup Solutions for Microsoft Exchange Server 2003 & Microsoft SQL Server," No Month Listed 2005 (9 pages).
Syncsort Incorporated, "Near-Instant Oracle Cloning with Syncsort AdvancedClient Technologies," No Month Listed 2007 (12 pages).
Syncsort Incorporated, "Syncsort Backup Express Advanced Recovery for NetApp," No Month Listed 2008 (12 pages).
Tate et al., "Implementing the IBM System Storage SAN Volume Controller V4.3," IBM, Redbooks, Oct. 2008 (970 pages).
Thekkath et al., "Frangipani: A Scalable Distributed File System," Proceeding SOSP '97, Proceedings of the Sixteenth ACM Symposium on Operating Systems Principles, No Month Listed 1997 (25 pages).
Tretau et al., "IBM TotalStorage NAS Backup and Recovery Solutions," IBM, Redbooks, Jul. 2002 (226 pages).
Veritas Software Corporation, "Veritas File System 4.1 Administrators Guide," May 2005 (270 pages).
Veritas Software Corporation, "Veritas FlashSnap Point-in-Time Copy Solutions, Administrators Guide 4.1," Apr. 2006 (102 pages).
Veritas Software Corporation, "Veritas NetBackup 4.5 Business Server™: Getting Started Guide," Mar. 2002 (91 pages).
Veritas Software Corporation, "Veritas NetBackup™ 4.5 for Informix: System Administrator's Guide," Mar. 2002 (94 pages).
Veritas Software Corporation, "Veritas NetBackup™ 4.5: User's Guide for UNIX," Mar. 2002 (212 pages).
Vmware, "Vmware Consolidated Backup: Best Practices and Deployment Considerations for SAN Environments," retrieved online at [URL:<<https://web.archive.org/web/20080804070141/http://www.vmware.com/files/pdf/vcb_best_practices>>] No Month Listed 2007 (39 pages).
Wolf, "VM Backup Bliss? The State of VM Data Protection in the Enterprise," Burton Group, Midvale, Utah, Aug. 1, 2007 (45 pages).
International Search Report and Written Opinion Issued by the U.S. Patent and Trademark Office for International Application No. PCT/US13/46351 mailed Feb. 21, 2014 (17 pgs.).

* cited by examiner

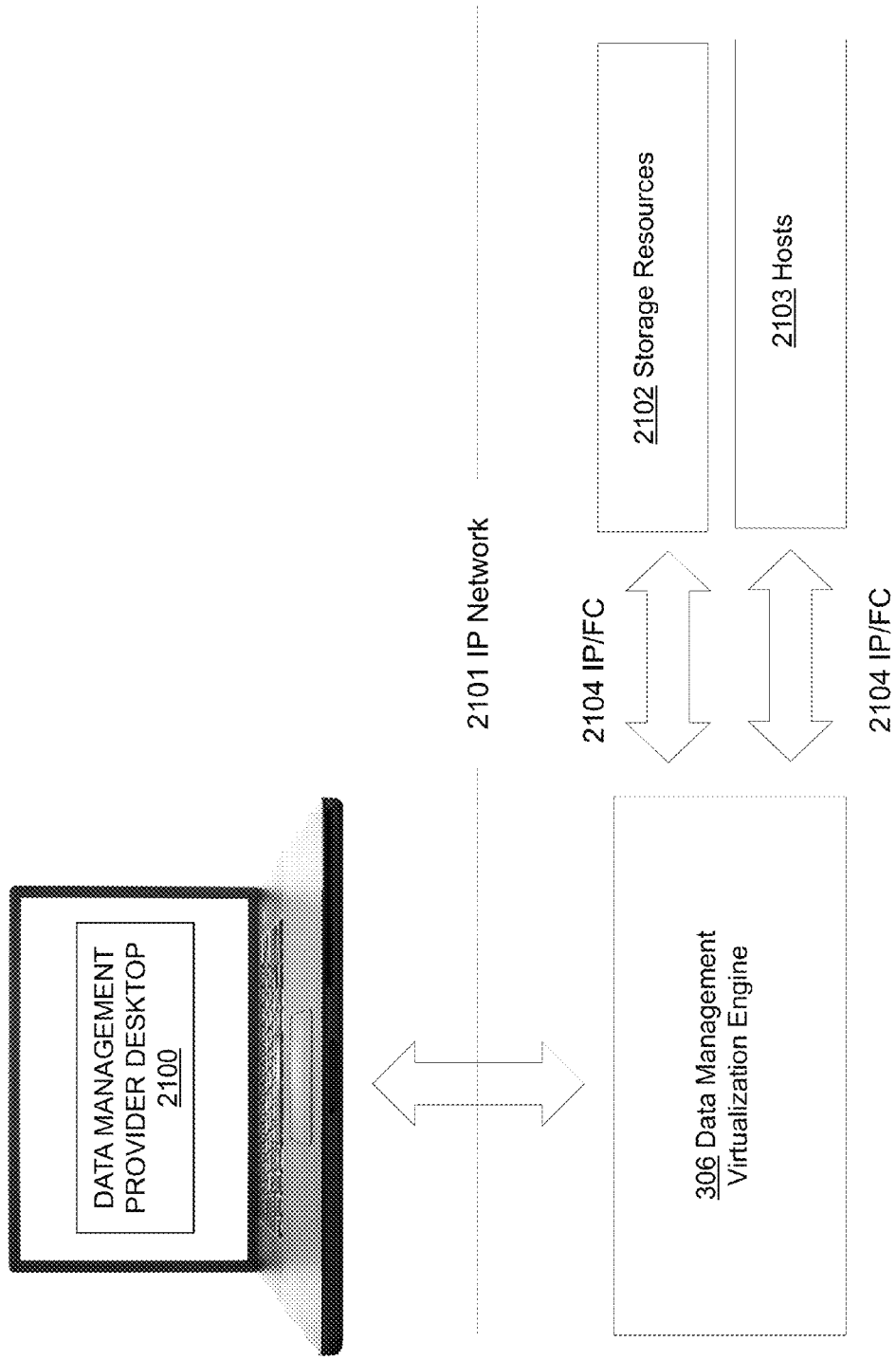

| 2904 Protection | | | | |
|---|---|---|---|---|
| 10002 (id) | 10004 (id) | 10007 (id) | 10012 (id) | 10015 (id) |
| Mod 1-1 | Mod 1-13 | Mod 1-2 | Mod 1-12 | Mod 1-12 |
| ... | ... | ... | ... | ... |

| 3004 Protection | | | | |
|---|---|---|---|---|
| 10002 (id) | 10004 (id) | 10020 (id) | 10012 (id) | 10015 (id) |
| Mod 1-1 | Mod 1-13 | Mod 1-20 | Mod 1-12 | Mod 1-16 |
| ... | ... | ... | ... | ... |

FIG. 30B

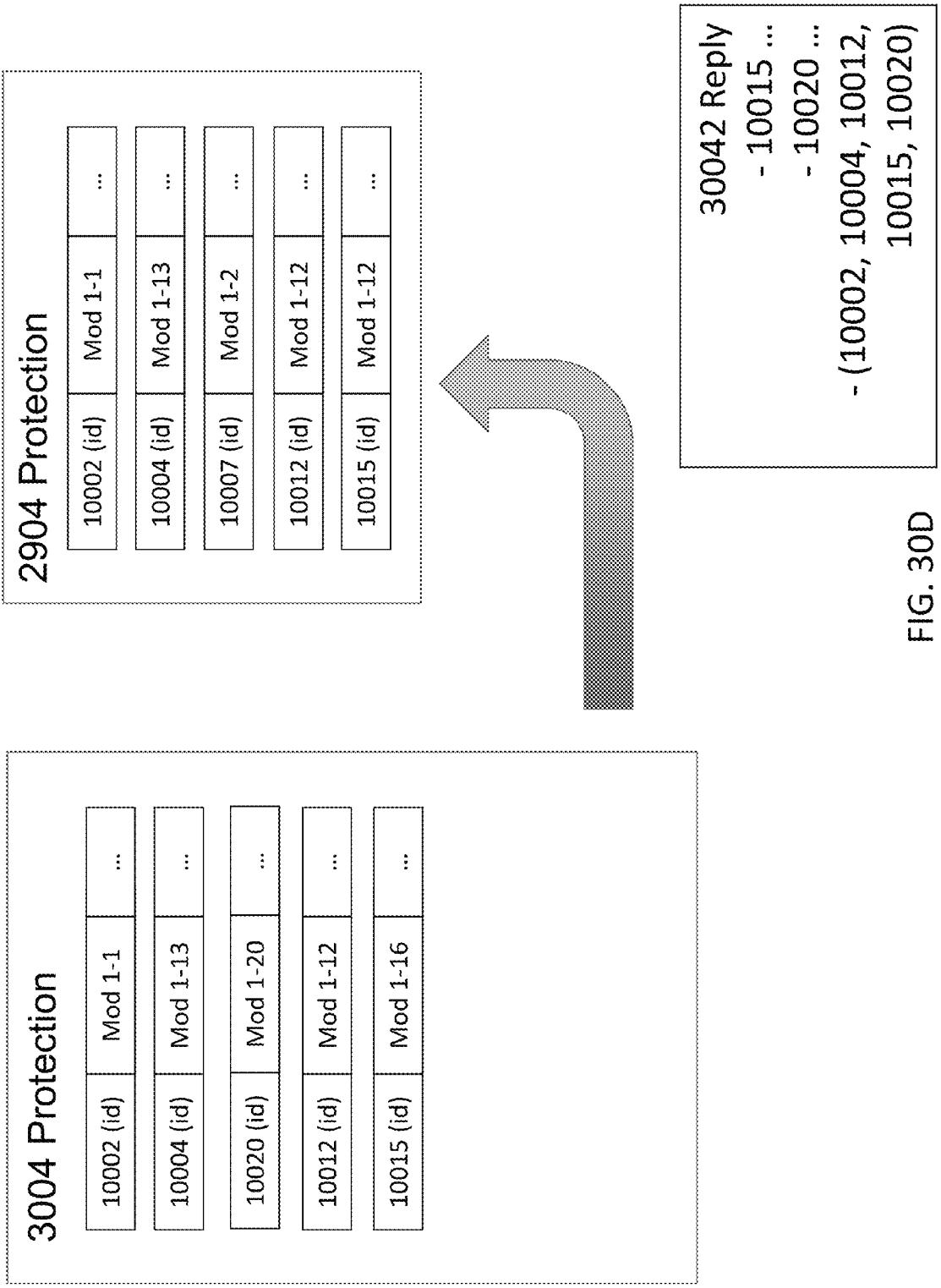

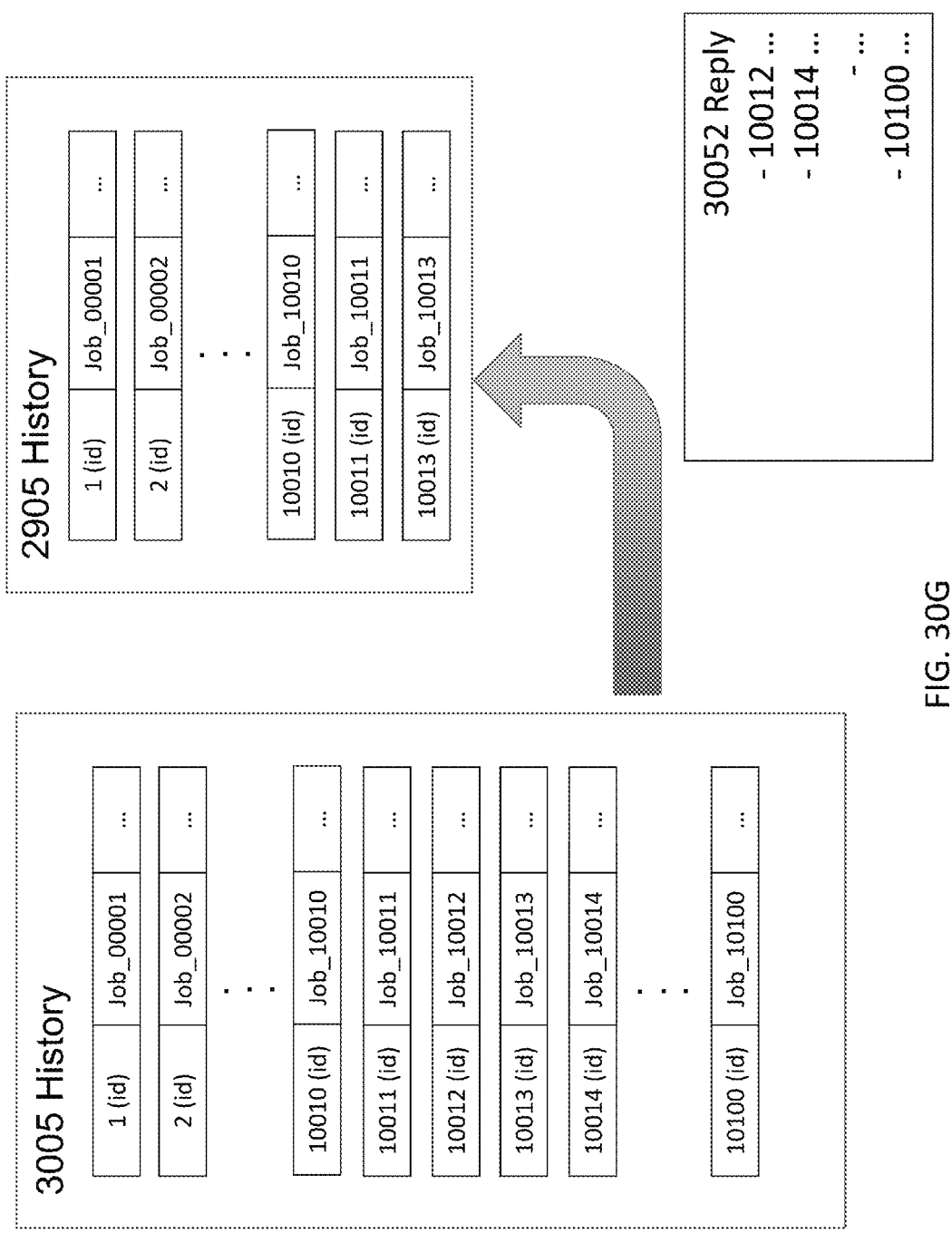

SYSTEM AND METHOD FOR INTELLIGENT DATABASE BACKUP

CROSS-REFERENCES TO RELATED APPLICATIONS

The present application relates to and claims priority under 35 U.S.C. 119(e) to U.S. Provisional Application No. 61/661,135, filed on Jun. 18, 2012 and entitled "Enhanced Data Management Virtualization System," the disclosure of which is hereby incorporated by reference herein in its entirety.

This application is also related to the following applications, filed herewith and hereby incorporated by reference:
- "System and Method for Efficient Database Record Replication Using Different Replication Strategies Based on the Database Records" (U.S. application Ser. No. 13/920,932);
- "System and Method for Caching Hashes for Co-Located Data in a Deduplication Data Store" (U.S. application Ser. No. 13/920,923);
- "System and Method for Incrementally Backing Up Out-of-band Data" (U.S. application Ser. No. 13/920,981);
- "System and Method for Providing Intra-Process Communication for an Application Programming Interface" (U.S. application Ser. No. 13/920,976); and
- "System and Method for Quick-Linking User Interface Jobs Across Services Based on System Implementation Information" (U.S. application Ser. No. 13/921,008); and
- "System and Method for Intelligent Database Backup" (U.S. application Ser. No. 13/920,950).

BACKGROUND

The business requirements for managing the lifecycle of application data have been traditionally met by deploying multiple point solutions, each of which addresses a part of the lifecycle. This has resulted in a complex and expensive infrastructure where multiple copies of data are created and moved multiple times to individual storage repositories. The adoption of server virtualization has become a catalyst for simple, agile and low-cost compute infrastructure. This has led to larger deployments of virtual hosts and storage, further exacerbating the gap between the emerging compute models and the current data management implementations.

Applications that provide business services depend on storage of their data at various stages of its lifecycle. FIG. 1 shows a typical set of data management operations that would be applied to the data of an application such as a database underlying a business service such as payroll management. In order to provide a business service, application 102 requires primary data storage 122 with some contracted level of reliability and availability.

Backups 104 are made to guard against corruption or the primary data storage through hardware or software failure or human error. Typically backups may be made daily or weekly to local disk or tape 124, and moved less frequently (weekly or monthly) to a remote physically secure location 125.

Concurrent development and test 106 of new applications based on the same database requires a development team to have access to another copy of the data 126. Such a snapshot might be made weekly, depending on development schedules.

Compliance with legal or voluntary policies 108 may require that some data be retained for safely future access for some number of years; usually data is copied regularly (say, monthly) to a long-term archiving system 128.

Disaster Recovery services 110 guard against catastrophic loss of data if systems providing primary business services fail due to some physical disaster. Primary data is copied 130 to a physically distinct location as frequently as is feasible given other constraints (such as cost). In the event of a disaster the primary site can be reconstructed and data moved back from the safe copy.

Business Continuity services 112 provide a facility for ensuring continued business services should the primary site become compromised. Usually this requires a hot copy 132 of the primary data that is in near-lockstep with the primary data, as well as duplicate systems and applications and mechanisms for switching incoming requests to the Business Continuity servers.

Thus, data management is currently a collection of point applications managing the different parts of the lifecycle. This has been an artifact of evolution of data management solutions over the last two decades.

SUMMARY OF THE INVENTION

In accordance with the disclosed subject matter, systems, methods, and non-transitory computer-readable media are provided for intelligent database backup.

The disclosed subject matter includes a computerized method for backing up database storage. The method includes activating, by a computing device, a protection policy for database storage at a remote host, wherein the database storage is not physically accessible by the computing device, such that the out-of-band storage is not in communication with the remote host through the computing device. The method includes transmitting, by the computing device, a backup request to the remote host including data indicative of a volume on the database storage to back up according to the protection policy. The method includes receiving, by the computing device, a response to the backup request including data indicative of staging disk requirements for the volume, the staging disk requirements including a required size for a staging disk to back up the volume. The method includes determining, by the computing device, a staging disk based on the response. The method includes presenting, by the computing device, the staging disk to the remote host so that the remote host can perform a backup of the volume to the staging disk using a database backup tool provided by a vendor of the database storage. The method includes receiving, by the computing device, a backup result from the remote host including data indicative of whether the backup of the volume to the staging disk succeeded or whether the backup of the volume to the staging disk failed, wherein the backup of the volume to the staging disk was performed using a database backup tool provided by a vendor of the database storage.

In some embodiments, the method includes determining, based on the backup result, that the backup failed, and identifying an error code in the backup result and storing the error code. The method can include determining, based on the backup result, that the backup succeeded, creating a point-in-time snapshot of the staging disk, and cataloging the point-in-time snapshot of the staging disk as a most recent backup of the volume.

In some embodiments, determining the staging disk based on the response includes identifying a previously cataloged point-in-time snapshot for the volume, and using the previously catalogued point-in-time image as the staging disk. Identifying a previously cataloged point-in-time snapshot for the volume can include receiving a unique signature in the staging disk requirements in the response to the backup request, and identifying the previously cataloged point-in-time snapshot for the volume based on the required size and the unique signature. Determining the staging disk based on the response can include determining there is no previously cataloged point-in-time snapshot for the volume, and allocating the staging disk from data storage of the computing device with a size based on the required size from the staging disk requirements. The size can be calculated based on a predetermined threshold that specifies a size of the staging disk that allows repeated back-ups to the staging disk without running out of storage.

In some embodiments, the method includes determining that a previously cataloged point-in-time snapshot for the volume expired, and deleting the previously cataloged point-in-time snapshot. The method can include determining that a previously cataloged point-in-time snapshot for the volume is associated with a previous staging disk including a size below the required size from the staging disk requirements, and allocating the staging disk from data storage of the computing device with a size based on the required size from the staging disk requirements, wherein the staging disk does not include the previously cataloged point-in-time snapshot.

In some embodiments, the database storage stored on the remote host includes a database on an internal disk to the remote device, on a networked drive, or any combination thereof. The database storage can be an Oracle database, and the database backup tool can be the Oracle RMAN command.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

FIG. 21 depicts a Desktop, which is the user interface that implements systems and methods for Protection and Availability (PAS) storage appliance, in accordance with some embodiments.

FIG. 30B depicts examples of protection data for medium-sized data in data management operational data, in accordance with some embodiments.

FIG. 30D depicts an example of a response to the synchronization request for medium-sized data in data management operational data, in accordance with some embodiments.

FIG. 30G depicts an example of a response to the synchronization request for history data for large-sized data in data management operational data, in accordance with some embodiments.

DETAILED DESCRIPTION

Figure 1:
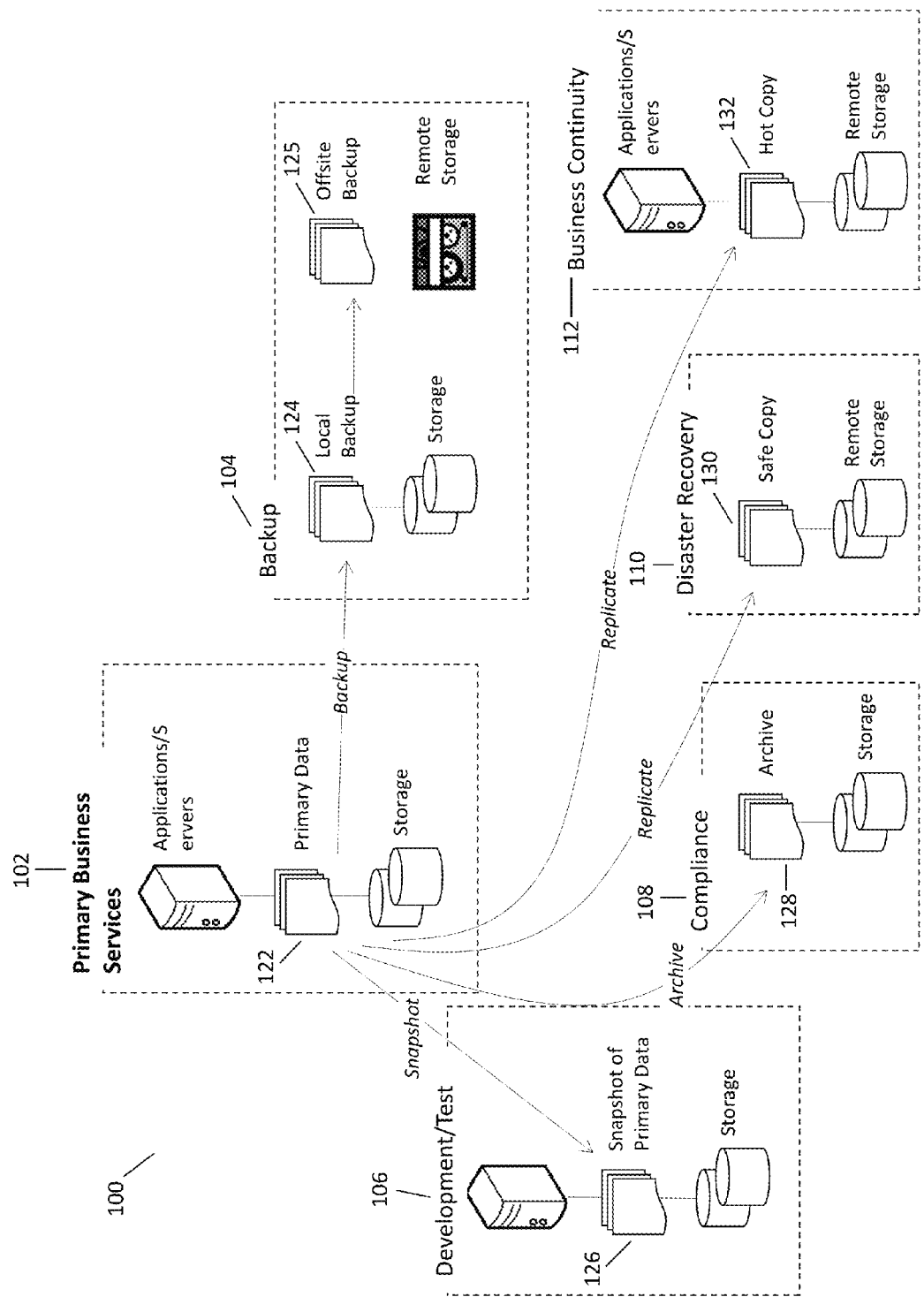
FIG. 1 is a simplified diagram of current methods deployed to manage the data lifecycle for a business service.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Current Data Management architecture and implementations such as described above involve multiple applications addressing different parts of data lifecycle management, all of them performing certain common functions: (a) make a copy of application data (the frequency of this action is commonly termed the Recovery Point Objective (RPO)), (b) store the copy of data in an exclusive storage repository, typically in a proprietary format, and (c) retain the copy for certain duration, measured as Retention Time. A primary difference in each of the point solutions is in the frequency of the RPO, the Retention Time, and the characteristics of the individual storage repositories used, including capacity, cost and geographic location.

This disclosure pertains to Data Management Virtualization. Data Management activities, such as Backup, Replication and Archiving are virtualized in that they do not have to be configured and run individually and separately. Instead, the user defines their business requirement with regard to the lifecycle of the data, and the Data Management Virtualization System performs these operations automatically. A snapshot is taken from primary storage to secondary storage; this snapshot is then used for a backup operation to other secondary storage. Essentially an arbitrary number of these backups may be made, providing a level of data protection specified by a Service Level Agreement.

This disclosure also pertains to a method of storing deduplicated images in which a portion of the image is stored in encoded form directly in a hash table, the method comprising organizing unique content of each data object as a plurality of content segments and storing the content segments in a data store; for each data object, creating an organized arrangement of hash structures, wherein each structure, for a subset of the hash structures, includes a field to contain a hash signature for a corresponding content segment and is associated with a reference to the corresponding content segment, wherein the logical organization of the arrangement represents the logical organization of the content segments as they are represented within the data object; receiving content to be included in the deduplicated image of the data object; determining if the received content may be encoded using a predefined non-lossy encoding technique and in which the encoded value would fit within the field for containing a hash signature; if so, placing the encoding in the field and marking the hash structure to indicate that the field contains encoded content for the deduplicated image; if not, generating a hash signature for the received content and placing the hash signature in the field and placing the received content in a corresponding content segment in said data store if it is unique.

Data Management Virtualization technology according to this disclosure is based on an architecture and implementation based on the following guiding principles.

First, define the business requirements of an application with a Service Level Agreement (SLA) for its entire data lifecycle. The SLA is much more than a single RPO, Retention and Recovery Time Objective (RTO). It describes the data protection characteristics for each stage of the data lifecycle. Each application may have a different SLA.

Second, provide a unified Data Management Virtualization Engine that manages the data protection lifecycle, moving data across the various storage repositories, with improved storage capacity and network bandwidth. The Data Management Virtualization system achieves these improvements by leveraging extended capabilities of modern storage systems by tracking the portions of the data that have changed over time and by data deduplication and compression algorithms that reduce the amount of data that needs to be copied and moved.

Third, leverage a single master copy of the application data to be the basis for multiple elements within the lifecycle. Many of the Data Management operations such as backup, archival and replication depend on a stable, consistent copy of the data to be protected. The Data Management Virtualization System leverages a single copy of the data for multiple purposes. A single instance of the data maintained by the system may serve as the source, from which each data management function may make additional copies as needed. This contrasts with requiring application data to be copied multiple times by multiple independent data management applications in the traditional approach.

Fourth, abstracting physical storage resources into a series of data protection storage pools, which are virtualized out of different classes of storage including local and remote disk, solid state memory, tape and optical media, private, public and/or hybrid storage clouds. The storage pools provide access independent of the type, physical location or underlying storage technology. Business requirements for the lifecycle of data may call for copying the data to different types of storage media at different times. The Data Management Virtualization system allows the user to classify and aggregate different storage media into storage pools, for example, a Quick Recovery Pool, which consists of high speed disks, and a Cost Efficient Long-term Storage Pool, which may be a deduplicated store on high capacity disks, or a tape library. The Data Management Virtualization System can move data amongst these pools to take advantage of the unique characteristics of each storage medium. The abstraction of Storage Pools provides access independent of the type, physical location or underlying storage technology.

Fifth, improve the movement of the data between storage pools and disaster locations utilizing underlying device capabilities and post-deduplicated application data. The Data Management Virtualization System discovers the capabilities of the storage systems that comprise the Storage Pools, and takes advantage of these capabilities to move data efficiently. If the Storage System is a disk array that supports the capability of creating a snapshot or clone of a data volume, the Data Management Virtualization System will take advantage of this capability and use a snapshot to make a copy of the data rather than reading the data from one place and writing it to another. Similarly, if a storage system supports change tracking, the Data Management Virtualization System will update an older copy with just the changes to efficiently create a new copy. When moving data across a network, the Data Management Virtualization system uses a deduplication and compression algorithm that avoids sending data that is already available on the other side of the network.

One key aspect of improving data movement is recognizing that application data changes slowly over time. A copy of an application that is made today will, in general, have a lot of similarities to the copy of the same application that was made yesterday. In fact today's copy of the data could be represented as yesterday's copy with a series of delta transformations, where the size of the delta transformations themselves are usually much smaller than all of the data in the copy itself. The Data Management Virtualization system captures and records these transformations in the form of bitmaps or extent lists. In one embodiment of the system, the underlying storage resources—a disk array or server virtualization system—are capable of tracking the changes made to a volume or file; in these environments, the Data Management Virtualization system queries the storage resources to obtain these change lists, and saves them with the data being protected.

In the preferred embodiment of the Data Management Virtualization system, there is a mechanism for eavesdropping on the primary data access path of the application, which enables the Data Management Virtualization system to observe which parts of the application data are modified, and to generate its own bitmap of modified data. If, for example, the application modifies blocks 100, 200 and 300 during a particular period, the Data Management Virtualization system will eavesdrop on these events, and create a bitmap that indicates that these particular blocks were modified. When processing the next copy of application data, the Data Management Virtualization system will only process blocks 100, 200 and 300 since it knows that these were the only blocks that were modified.

In one embodiment of the system, where the primary storage for the application is a modern disk array or storage virtualization appliance, the Data Management Virtualization system takes advantage of a point-in-time snapshot capability of an underlying storage device to make the initial copy of the data. This virtual copy mechanism is a fast, efficient and low-impact technique of creating the initial copy that does not guarantee that all the bits will be copied, or stored together. Instead, virtual copies are constructed by maintaining metadata and data structures, such as copy-on-write volume bitmaps or extents, that allow the copies to be reconstructed at access time. The copy has a lightweight impact on the application and on the primary storage device. In another embodiment, where the application is based on a Server Virtualization System such as VMware or Xen, the Data Management Virtualization system uses the similar virtual-machine-snapshot capability that is built into the Server Virtualization systems. When a virtual copy capability is not available, the Data Management Virtualization System may include its own built-in snapshot mechanism.

It is possible to use the snapshot as a data primitive underlying all of the data management functions supported by the system. Because it is lightweight, the snapshot can be used as an internal operation even when the requested operation is not a snapshot per se; it is created to enable and facilitate other operations.

At the time of creation of a snapshot, there may be certain preparatory operations involved in order to create a coherent snapshot or coherent image, such that the image may be restored to a state that is usable by the application. These preparatory operations need only be performed once, even if the snapshot will be leveraged across multiple data management functions in the system, such as backup copies which are scheduled according to a policy. The preparatory operations may include application quiescence, which includes flushing data caches and freezing the state of the application; it may also include other operations known in the art and other operations useful for retaining a complete image, such as collecting metadata information from the application to be stored with the image.

Figure 2:
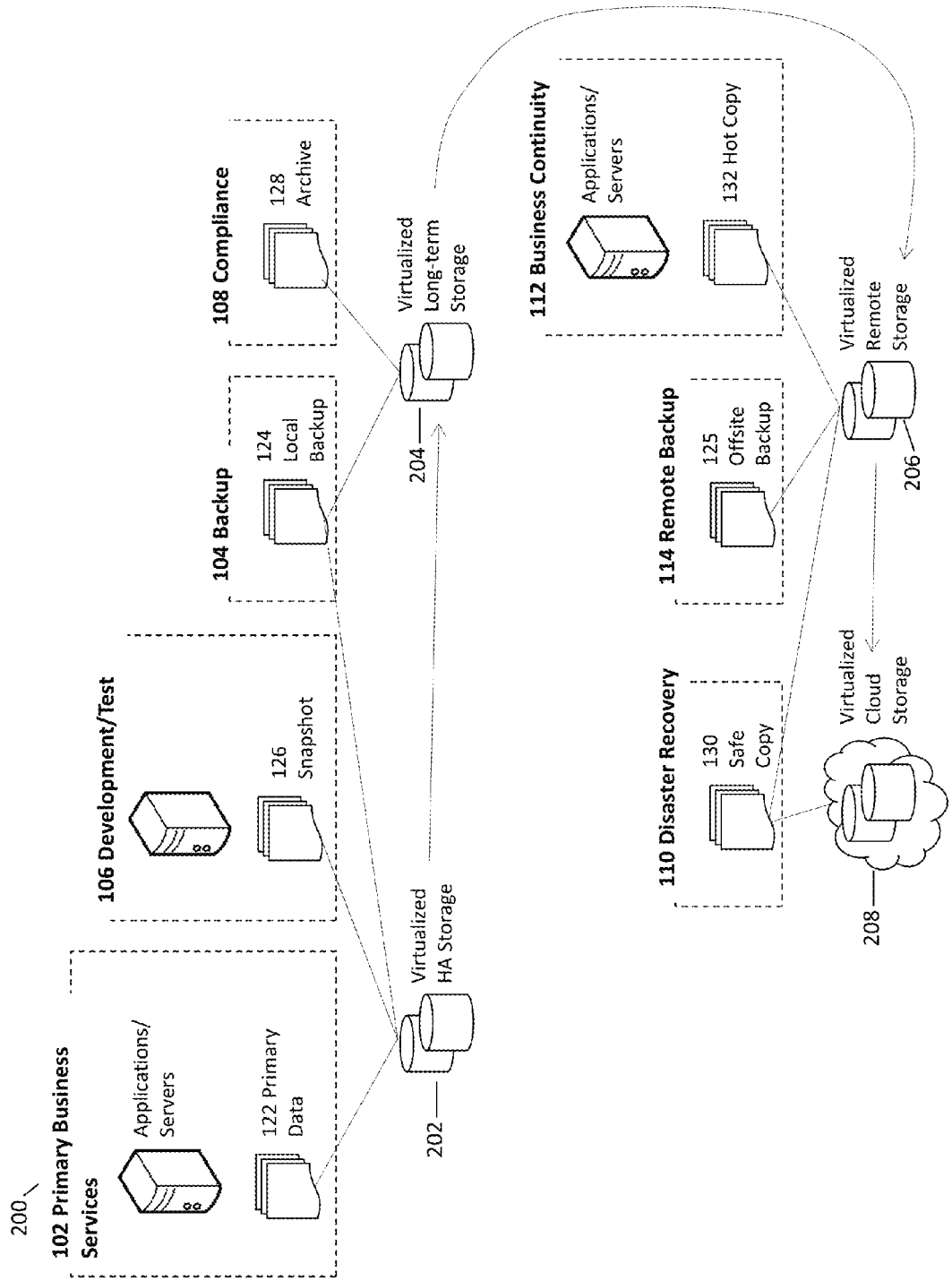
FIG. 2 is an overview of the management of data throughout its lifecycle by a single Data Management Virtualization System.

FIG. 2 illustrates one way that a Virtualized Data Management system can address the data lifecycle requirements described earlier in accordance with these principles.

To serve local backup requirements, a sequence of efficient snapshots are made within local high-availability storage 202. Some of these snapshots are used to serve development/test requirements without making another copy. For longer term retention of local backup, a copy is made efficiently into long-term local storage 204, which in this implementation uses deduplication to reduce repeated copying. The copies within long-term storage may be accessed as backups or treated as an archive, depending on the retention policy applied by the SLA. A copy of the data is made to remote storage 206 in order to satisfy requirements for remote backup and business continuity—again a single set of copies suffices both purposes. As an alternative for remote backup and disaster recovery, a further copy of the data may be made efficiently to a repository 208 hosted by a commercial or private cloud storage provider.

The Data Management Virtualization System

Figure 3:
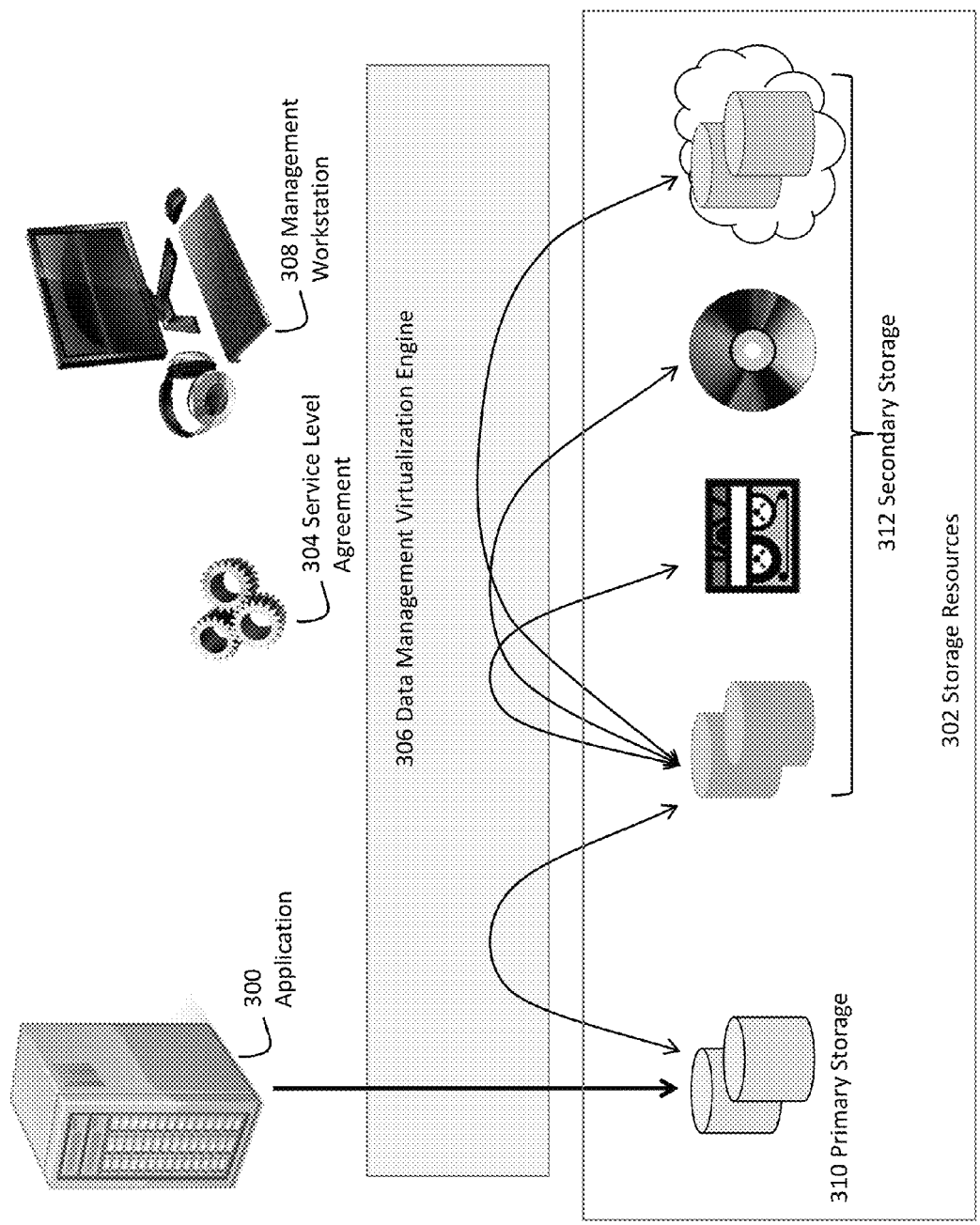
FIG. 3 is a simplified block diagram of the Data Management Virtualization system.

FIG. 3 illustrates the high level components of the Data Management Virtualization System that implements the above principles. Preferably, the system comprises these basic functional components further described below.

Application 300 creates and owns the data. This is the software system that has been deployed by the user, as for example, an email system, a database system, or financial reporting system, in order to satisfy some computational need. The Application typically runs on a server and utilizes storage. For illustrative purposes, only one application has been indicated. In reality there may be hundreds or even thousands of applications that are managed by a single Data Management Virtualization System.

Storage Resources 302 is where application data is stored through its lifecycle. The Storage Resources are the physical storage assets, including internal disk drives, disk arrays, optical and tape storage libraries and cloud-based storage systems that the user has acquired to address data storage requirements. The storage resources consist of Primary Storage 310, where the online, active copy of the application data is stored, and Secondary Storage 312 where additional copies of the application data are stored for the purposes such as backup, disaster recovery, archiving, indexing, reporting and other uses. Secondary storage resources may include additional storage within the same enclosure as the primary storage, as well as storage based on similar or different storage technologies within the same data center, another location or across the internet.

One or more Management Workstations 308 allow the user to specify a Service Level Agreement (SLA) 304 that defines the lifecycle for the application data. A Management workstation is a desktop or laptop computer or a mobile computing device that is used to configure, monitor and control the Data Management Virtualization System. A Service Level Agreement is a detailed specification that captures the detailed business requirements related to the creation, retention and deletion of secondary copies of the application data. The SLA is much more than the simple RTO and RPO that are used in traditional data management applications to represent the frequency of copies and the anticipated restore time for a single class of secondary storage. The SLA captures the multiple stages in the data lifecycle specification, and allows for non uniform frequency and retention specifications within each class of secondary storage. The SLA is described in greater detail in FIG. 7.

Data Management Virtualization Engine 306 manages all of the lifecycle of the application data as specified in SLA. It manages potentially a large number of SLAs for a large number of applications. The Data Management Virtualization Engine takes inputs from the user through the Management Workstation and interacts with the applications to discover the applications primary storage resources. The Data Management Virtualization Engine makes decisions regarding what data needs to be protected and what secondary storage resources best fulfill the protection needs. For example, if an enterprise designates its accounting data as requiring copies to be made at very short intervals for business continuity purposes as well as for backup purposes, the Engine may decide to create copies of the accounting data at a short interval to a first storage pool, and to also create backup copies of the accounting data to a second storage pool at a longer interval, according to an appropriate set of SLAs. This is determined by the business requirements of the storage application.

The Engine then makes copies of application data using advanced capabilities of the storage resources as available. In the above example, the Engine may schedule the short-interval business continuity copy using a storage appliance's built-in virtual copy or snapshot capabilities. Data Management Virtualization Engine moves the application data amongst the storage resources in order to satisfy the business requirements that are captured in the SLA. The Data Management Virtualization Engine is described in greater detail in FIG. 4.

The Data Management Virtualization System as a whole may be deployed within a single host computer system or appliance, or it may be one logical entity but physically distributed across a network of general-purpose and purpose-built systems. Certain components of the system may also be deployed within a computing or storage cloud.

In one embodiment of the Data Management Virtualization System the Data Management Virtualization Engine largely runs as multiple processes on a fault tolerant, redundant pair of computers. Certain components of the Data Management Virtualization Engine may run close to the application within the application servers. Some other components may run close to the primary and secondary storage, within the storage fabric or in the storage systems themselves. The Management stations are typically desktop and laptop computers and mobile devices that connect over a secure network to the Engine.

The Data Management Virtualization Engine

Figure 4:
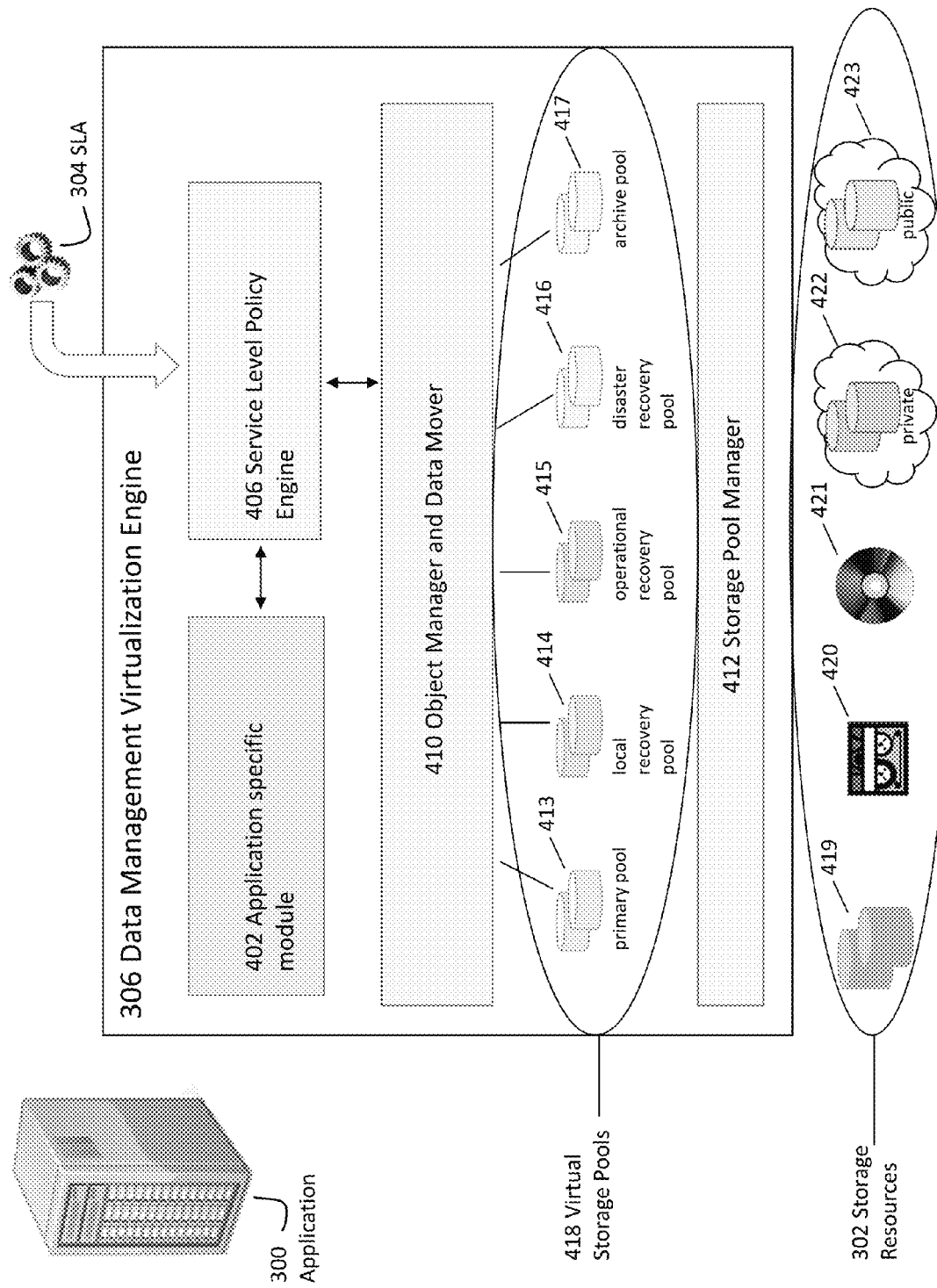
FIG. 4 is a view of the Data Management Virtualization Engine.

FIG. 4 illustrates an architectural overview of the Data Management Virtualization Engine 306 according to certain embodiments of the invention. The 306 Engine includes the following modules:

Application Specific Module 402: This module is responsible for controlling and collecting metadata from the application 300. Application metadata includes information about the application such as the type of application, details about its configuration, location of its datastores, its current operating state. Controlling the operation of the application includes actions such as flushing cached data to disk, freezing and thawing application I/O, rotating or truncating log files, and shutting down and restarting applications. The Application Specific module performs these operations and sends and receives metadata in responses to commands from the Service Level Policy Engine 406, described below. The Application Specific Module is described in more detail in connection with FIG. 8.

Service Level Policy Engine 406 acts on the SLA 304 provided by the user to make decisions regarding the creation, movement and deletion of copies of the application data. Each SLA describes the business requirements related to protection of one application. The Service Level Policy Engine analyzes each SLA and arrives at a series of actions each of which involve the copying of application data from one storage location to another. The Service Level Policy Engine then reviews these actions to determine priorities and dependencies, and schedules and initiates the data movement jobs. The Service Level Policy Engine is described in more detail in connection with FIG. 9.

Object Manager and Data Movement Engine 410 creates a composite object consisting of the Application data, the Application Metadata and the SLA which it moves through different storage pools per instruction from the Policy Engine. The Object Manager receives instructions from the Service Policy Engine 406 in the form of a command to create a copy of application data in a particular pool based on the live primary data 413 belonging to the application 300, or from an existing copy, e.g., 415, in another pool. The copy of the composite object that is created by the Object Manager and the Data Movement Engine is self contained and self describing in that it contains not only application data, but also application metadata and the SLA for the application. The Object Manager and Data Movement Engine are described in more detail in connection with FIG. 5.

Storage Pool Manager 412 is a component that adapts and abstracts the underlying physical storage resources 302 and presents them as virtual storage pools 418. The physical storage resources are the actual storage assets, such as disk arrays and tape libraries that the user has deployed for the purpose of supporting the lifecycle of the data of the user's applications. These storage resources might be based on different storage technologies such as disk, tape, flash memory or optical storage. The storage resources may also have different geographic locations, cost and speed attributes, and may support different protocols. The role of the Storage Pool Manager is to combine and aggregate the storage resources, and mask the differences between their programming interfaces. The Storage Pool Manager presents the physical storage resources to the Object Manager 410 as a set of storage pools that have characteristics that make these pools suitable for particular stages in the lifecycle of application data. The Storage Pool Manager is described in more detail in connection with FIG. 6.

Object Manager and Data Movement Engine

Figure 5:
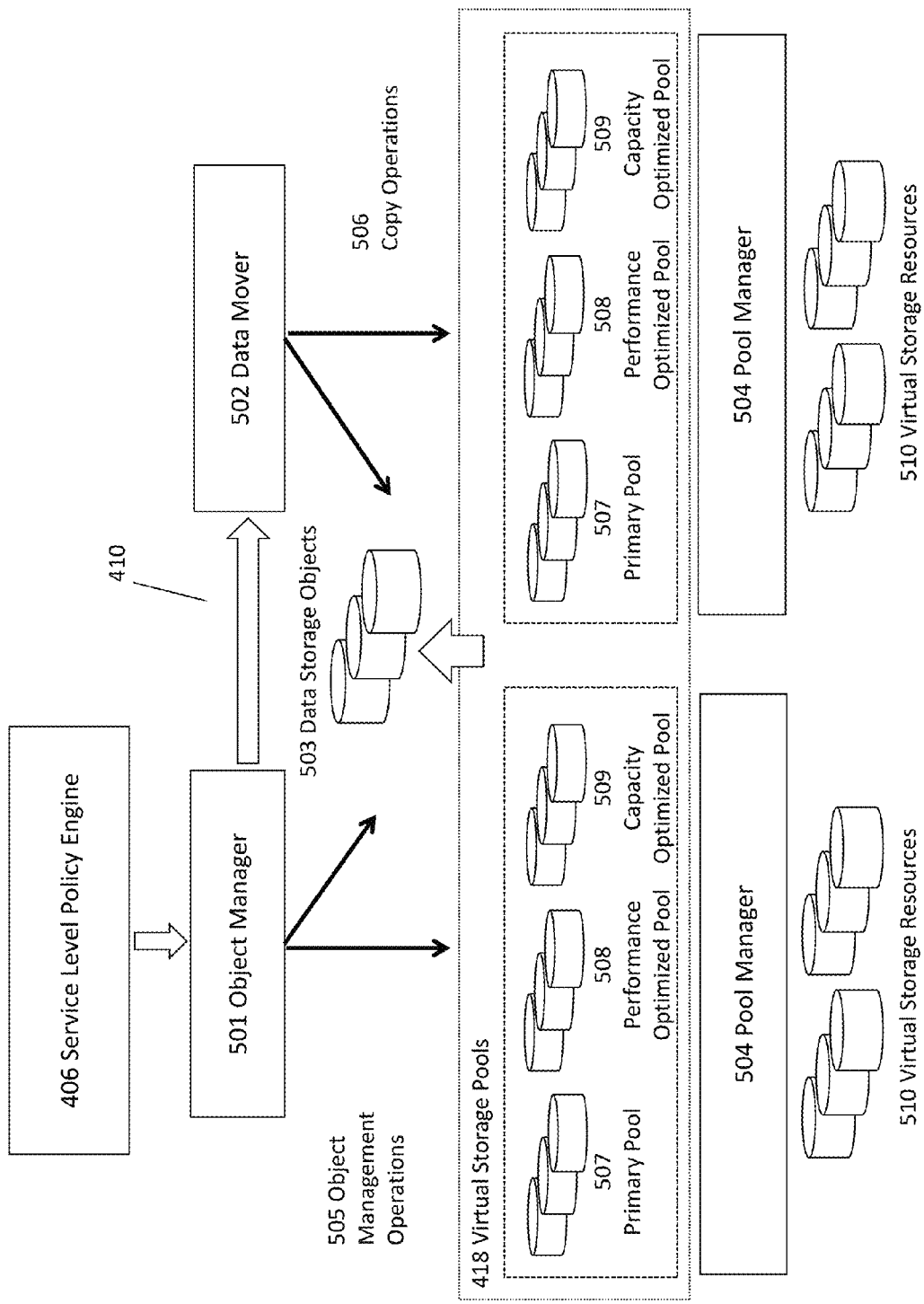
FIG. 5 illustrates the Object Management and Data Movement Engine.

FIG. 5 illustrates the Object Manager and Data Movement Engine 410. The Object Manager and Data Movement Engine discovers and uses Virtual Storage Resources 510 presented to it by the Pool Managers 504. It accepts requests from the Service Level Policy Engine 406 to create and maintain Data Storage Object instances from the resources in a Virtual Storage Pool, and it copies application data among instances of storage objects from the Virtual Storage Pools according to the instructions from the Service Level Policy Engine. The target pool selected for the copy implicitly designates the business operation being selected, e.g. backup, replication or restore. The Service Level Policy Engine resides either locally to the Object Manager (on the same system) or remotely, and communicates using a protocol over standard networking communication. TCP/IP may be used in a preferred embodiment, as it is well understood, widely available, and allows the Service Level Policy Engine to be located locally to the Object Manager or remotely with little modification.

In one embodiment, the system may deploy the Service Level Policy Engine on the same computer system as the Object Manager for ease of implementation. In another embodiment, the system may employ multiple systems, each hosting a subset of the components if beneficial or convenient for an application, without changing the design.

The Object Manager 501 and the Storage Pool Managers 504 are software components that may reside on the computer system platform that interconnects the storage resources and the computer systems that use those storage resources, where the user's application resides. The placement of these software components on the interconnect platform is designated as a preferred embodiment, and may provide the ability to connect customer systems to storage via communication protocols widely used for such applications (e.g. Fibre Channel, iSCSI, etc.), and may also provide ease of deployment of the various software components.

The Object Manager 501 and Storage Pool Manager 504 communicate with the underlying storage virtualization platform via the Application Programming Interfaces made available by the platform. These interfaces allow the software components to query and control the behavior of the computer system and how it interconnects the storage resources and the computer system where the user's Application resides. The components apply modularity techniques as is common within the practice to allow replacement of the intercommunication code particular to a given platform.

The Object Manager and Storage Pool Managers communicate via a protocol. These are transmitted over standard networking protocols, e.g. TCP/IP, or standard Interprocess Communication (IPC) mechanisms typically available on the computer system. This allows comparable communication between the components if they reside on the same computer platform or on multiple computer platforms connected by a network, depending on the particular computer platform. The current configuration has all of the local software components residing on the same computer system for ease of deployment. This is not a strict requirement of the design, as described above, and can be reconfigured in the future as needed.

Object Manager

Object Manager 501 is a software component for maintaining Data Storage Objects, and provides a set of protocol operations to control it. The operations include creation, destruction, duplication, and copying of data among the objects, maintaining access to objects, and in particular allow the specification of the storage pool used to create copies. There is no common subset of functions supported by all pools; however, in a preferred embodiment, primary pools may be performance-optimized, i.e. lower latency, whereas backup or replication pools may be capacity-optimized, supporting larger quantities of data and content-addressable. The pools may be remote or local. The storage pools are classified according to various criteria, including means by which a user may make a business decision, e.g. cost per gigabyte of storage.

First, the particular storage device from which the storage is drawn may be a consideration, as equipment is allocated for different business purposes, along with associated cost and other practical considerations. Some devices may not even be actual hardware but capacity provided as a service, and selection of such a resource can be done for practical business purposes.

Second, the network topological "proximity" is considered, as near storage is typically connected by low-latency, inexpensive network resources, while distant storage may be connected by high-latency, bandwidth limited expensive network resources; conversely, the distance of a storage pool relative to the source may be beneficial when geographic diversity protects against a physical disaster affecting local resources.

Third, storage optimization characteristics are considered, where some storage is optimized for space-efficient storage, but requires computation time and resources to analyze or transform the data before it can be stored, while other storage by comparison is "performance optimized," taking more storage resources by comparison but using comparatively little computation time or resource to transform the data, if at all.

Fourth, "speed of access" characteristics are considered, where some resources intrinsic to a storage computer platform are readily and quickly made available to the user's Application, e.g. as a virtual SCSI block device, while some can only be indirectly used. These ease and speed of recovery is often governed by the kind of storage used, and this allows it to be suitably classified.

Fifth, the amount of storage used and the amount available in a given pool are considered, as there may be benefit to either concentrating or spreading the storage capacity used.

The Service Level Policy Engine, described below, combines the SLA provided by the user with the classification criteria to determine how and when to maintain the application data, and from which storage pools to draw the needed resources to meet the Service Level Agreement (SLA).

The object manager 501 creates, maintains and employs a history mechanism to track the series of operations performed on a data object within the performance pools, and to correlate those operations with others that move the object to other storage pools, in particular capacity-optimized ones. This series of records for each data object is maintained at the object manager for all data objects in the primary pool, initially correlated by primary data object, then correlated by operation order: a time line for each object and a list of all such time lines. Each operation performed exploits underlying virtualization primitives to capture the state of the data object at a given point in time.

Additionally, the underlying storage virtualization appliance may be modified to expose and allow retrieval of internal data structures, such as bitmaps, that indicate the modification of portions of the data within the data object. These data structures are exploited to capture the state of a data object at a point in time: e.g., a snapshot of the data object, and to provide differences between snapshots taken at a specific time, and thereby enables optimal backup and restore. While the particular implementations and data structures may vary among different appliances from different vendors, a data structure is employed to track changes to the data object, and storage is employed to retain the original state of those portions of the object that have changed: indications in the data structure correspond to data retained in the storage. When accessing the snapshot, the data structure is consulted and for portions that have been changed, the preserved data is accessed rather than the current data, as the data object has been modified at the areas so indicated. A typical data structure employed is a bitmap, where each bit corresponds to a section of the data object. Setting the bit indicates that section has been modified after the point in time of the snapshot operation. The underlying snapshot primitive mechanism maintains this for as long as the snapshot object exists.

The time line described above maintains a list of the snapshot operations against a given primary data object, including the time an operation is started, the time it is stopped (if at all), a reference to the snapshot object, and a reference to the internal data structure (e.g. bitmaps or extent lists), so that it can be obtained from the underlying system. Also maintained is a reference to the result of copying the state of the data object at any given point in time into another pool—as an example, copying the state of a data object into a capacity-optimized pool 407 using content addressing results in an object handle. That object handle corresponds to a given snapshot and is stored with the snapshot operation in the time line. This correlation is used to identify suitable starting points.

Optimal backup and restore consult the list of operations from a desired starting point to an end point. A time ordered list of operations and their corresponding data structures (bitmaps) are constructed such that a continuous time series from start to finish is realized: there is no gap between start times of the operations in the series. This ensures that all changes to the data object are represented by the corresponding bitmap data structures. It is not necessary to retrieve all operations from start to finish; simultaneously existing data objects and underlying snapshots overlap in time; it is only necessary that there are no gaps in time where a change might have occurred that was not tracked. As bitmaps indicate that a certain block of storage has changed but not what the change is, the bitmaps may be added or composed together to realize a set of all changes that occurred in the time interval. Instead of using this data structure to access the state at a point in time, the system instead exploits the fact that the data structure represents data modified as time marches forward. Rather, the end state of the data object is accessed at the indicated areas, thus returning the set of changes to the given data object from the given start time to the end time.

The backup operation exploits this time line, the correlated references, and access to the internal data structures to realize our backup operation. Similarly, it uses the system in a complementary fashion to accomplish our restore operation. The specific steps are described below in the section for "Optimal Backup/Restore."

Virtual Storage Pool Types

FIG. 5 illustrates several representative storage pool types. Although one primary storage pool and two secondary storage pools are depicted in the figure, many more may be configured in some embodiments.

Primary Storage Pool 507—contains the storage resources used to create the data objects in which the user Application stores its data. This is in contrast to the other storage pools, which exist to primarily fulfill the operation of the Data Management Virtualization Engine.

Performance Optimized Pool 508—a virtual storage pool able to provide high performance backup (i.e. point in time duplication, described below) as well as rapid access to the backup image by the user Application Capacity Optimized Pool 509—a virtual storage pool that chiefly provides storage of a data object in a highly space-efficient manner by use of deduplication techniques described below. The virtual storage pool provides access to the copy of the data object, but does not do so with high performance as its chief aim, in contrast to the Performance Optimized pool above.

The initial deployments contain storage pools as described above, as a minimal operational set. The design fully expects multiple Pools of a variety of types, representing various combinations of the criteria illustrated above, and multiple Pool Managers as is convenient to represent all of the storage in future deployments. The tradeoffs illustrated above are typical of computer data storage systems.

From a practical point of view, these three pools represent a preferred embodiment, addressing most users requirements in a very simple way. Most users will find that if they have one pool of storage for urgent restore needs, which affords quick recovery, and one other pool that is low cost, so that a large number of images can be retained for a large period of time, almost all of the business requirements for data protection can be met with little compromise.

The format of data in each pool is dictated by the objectives and technology used within the pool. For example, the quick recovery pool is maintained in the form very similar to the original data to minimize the translation required and to improve the speed of recovery. The long-term storage pool, on the other hand, uses deduplication and compression to reduce the size of the data and thus reduce the cost of storage.

Object Management Operations 505

The Object Manager 501 creates and maintains instances of Data Storage Objects 503 from the Virtual Storage Pools 418 according to the instructions sent to it by the Service Level Policy Engine 406. The Object Manager provides data object operations in five major areas: point-in-time duplication or copying (commonly referred to as "snapshots"), standard copying, object maintenance, mapping and access maintenance, and collections.

Object Management operations also include a series of Resource Discovery operations for maintaining Virtual Storage Pools themselves and retrieving information about them. The Pool Manager 504 ultimately supplies the functionality for these.

Point-In-Time Copy ("Snapshot") Operations

Snapshot operations create a data object instance representing an initial object instance at a specific point in time. More specifically, a snapshot operation creates a complete virtual copy of the members of a collection using the resources of a specified Virtual Storage Pool. This is called a Data Storage Object. Multiple states of a Data Storage Object are maintained over time, such that the state of a Data Storage Object as it existed at a point in time is available. As described above, a virtual copy is a copy implemented using an underlying storage virtualization API that allows a copy to be created in a lightweight fashion, using copy-on-write or other in-band technologies instead of copying and storing all bits of duplicate data to disk. This may be implemented using software modules written to access the capabilities of an off-the-shelf underlying storage virtualization system such as provided by EMC, vmware or IBM in some embodiments. Where such underlying virtualizations are not available, the described system may provide its own virtualization layer for interfacing with unintelligent hardware.

Snapshot operations require the application to freeze the state of the data to a specific point so that the image data is coherent, and so that the snapshot may later be used to restore the state of the application at the time of the snapshot. Other preparatory steps may also be required. These are handled by the Application-Specific Module 302, which is described in a subsequent section. For live applications, therefore, the most lightweight operations are desired.

Snapshot operations are used as the data primitive for all higher-level operations in the system. In effect, they provide access to the state of the data at a particular point in time. As well, since snapshots are typically implemented using copy-on-write techniques that distinguish what has changed from what is resident on disk, these snapshots provide differences that can also be composed or added together to efficiently copy data throughout the system. The format of the snapshot may be the format of data that is copied by Data Mover 502, which is described below.

Standard Copy Operations

When a copy operation is not a snapshot, it may be considered a standard copy operation. A standard copy operation copies all or a subset of a source data object in one storage pool to a data object in another storage pool. The result is two distinct objects. One type of standard copy operation that may be used is an initial "baseline" copy. This is typically done when data is initially copied from one Virtual Storage Pool into another, such as from a performance-optimized pool to a capacity-optimized storage pool. Another type of standard copy operation may be used wherein only changed data or differences are copied to a target storage pool to update the target object. This would occur after an initial baseline copy has previously been performed.

A complete exhaustive version of an object need not be preserved in the system each time a copy is made, even though a baseline copy is needed when the Data Virtualization System is first initialized. This is because each virtual copy provides access to a complete copy. Any delta or difference can be expressed in relation to a virtual copy instead of in relation to a baseline. This has the positive side effect of virtually eliminating the common step of walking through a series of change lists.

Standard copy operations are initiated by a series of instructions or requests supplied by the Pool Manager and received by the Data Mover to cause the movement of data among the Data Storage Objects, and to maintain the Data Storage Objects themselves. The copy operations allow the creation of copies of the specified Data Storage Objects using the resources of a specified Virtual Storage Pool. The result is a copy of the source Data Object in a target Data Object in the storage pool.

The Snapshot and Copy operations are each structured with a preparation operation and an activation operation. The two steps of prepare and activate allow the long-running resource allocation operations, typical of the prepare phase, to be decoupled from the actuation. This is required by applications that can only be paused for a short while to fulfill the point-in-time characteristics of a snapshot operation, which in reality takes a finite but non-zero amount of time to accomplish. Similarly for copy and snapshot operations, this two-step preparation and activation structure allows the Policy Engine to proceed with an operation only if resources for all of the collection members can be allocated.

Object Maintenance

Object Maintenance operations are a series of operations for maintaining data objects, including creation, destruction, and duplication. The Object Manager and Data Mover use functionality provided by a Pool Request Broker (more below) to implement these operations. The data objects may be maintained at a global level, at each Storage Pool, or preferably both.

Collections

Collection operations are auxiliary functions. Collections are abstract software concepts, lists maintained in memory by the object manager. They allow the Policy Engine 206 to request a series of operations over all of the members in a collection, allowing a consistent application of a request to all members. The use of collections allows for simultaneous activation of the point-in-time snapshot so that multiple Data Storage Objects are all captured at precisely the same point in time, as this is typically required by the application for a logically correct restore. The use of collections allows for convenient request of a copy operation across all members of a collection, where an application would use multiple storage objects as a logical whole.

Resource Discovery Operations

The Object Manager discovers Virtual Storage Pools by issuing Object Management Operations 505 to the Pool Manager 504, and uses the information obtained about each of the pools to select one that meets the required criteria for a given request, or in the case where none match, a default pool is selected, and the Object Manager can then create a data storage object using resources from the selected Virtual Storage Pool.

Mapping and Access

The Object Manager also provides sets of Object Management operations to allow and maintain the availability of these objects to external Applications. The first set is operations for registering and unregistering the computers where the user's Applications reside. The computers are registered by the identities typical to the storage network in use (e.g. Fibre Channel WWPN, iSCSI identity, etc.). The second set is "mapping" operations, and when permitted by the storage pool from which an object is created, the Data Storage Object can be "mapped," that is, made available for use to a computer on which a user Application resides.

This availability takes a form appropriate to the storage, e.g. a block device presented on a SAN as a Fibre Channel disk or iSCSI device on a network, a filesystem on a file sharing network, etc. and is usable by the operating system on the Application computer. Similarly, an "unmapping" operation reverses the availability of the virtual storage device on the network to a user Application. In this way, data stored for one Application, i.e. a backup, can be made available to another Application on another computer at a later time, i.e. a restore.

502 Data Mover

The Data Mover 502 is a software component within the Object Manager and Data Mover that reads and writes data among the various Data Storage Objects 503 according to instructions received from the Object Manager for Snapshot (Point in Time) Copy requests and standard copy requests. The Data Mover provides operations for reading and writing data among instances of data objects throughout the system. The Data Mover also provides operations that allow querying and maintaining the state of long running operations that the Object Manager has requested for it to perform.

The Data Mover uses functionality from the Pool Functionality Providers (see FIG. 6) to accomplish its operation. The Snapshot functionality provider 608 allows creation of a data object instance representing an initial object instance at a specific point in time. The Difference Engine functionality provider 614 is used to request a description of the differences between two data objects that are related in a temporal chain. For data objects stored on content-addressable pools, a special functionality is provided that can provide differences between any two arbitrary data objects. This functionality is also provided for performance-optimized pools, in some cases by an underlying storage virtualization system, and in other cases by a module that implements this on top of commodity storage. The Data Mover 502 uses the information about the differences to select the set of data that it copies between instances of data objects 503.

For a given Pool, the Difference Engine Provider provides a specific representation of the differences between two states of a Data Storage Object over time. For a Snapshot provider the changes between two points in time are recorded as writes to a given part of the Data Storage Object. In one embodiment, the difference is represented as a bitmap where each bit corresponds to an ordered list of the Data Object areas, starting at the first and ascending in order to the last, where a set bit indicates a modified area. This bitmap is derived from the copy-on-write bitmaps used by the underlying storage virtualization system. In another embodiment, the difference may be represented as a list of extents corresponding to changed areas of data. For a Content Addressable storage provider 610, the representation is described below, and is used to determine efficiently the parts of two Content Addressable Data Objects that differ.

The Data Mover uses this information to copy only those sections that differ, so that a new version of a Data Object can be created from an existing version by first duplicating it, obtaining the list of differences, and then moving only the data corresponding to those differences in the list. The Data Mover 502 traverses the list of differences, moving the indicated areas from the source Data Object to the target Data Object. (See Optimal Way for Data Backup and Restore.)

506 Copy Operation—Request Translation and Instructions

The Object Manager 501 instructs the Data Mover 502 through a series of operations to copy data among the data objects in the Virtual Storage Pools 418. The procedure comprises the following steps, starting at the reception of instructions:

First, create Collection request. A name for the collection is returned.

Second, add Object to Collection. The collection name from above is used as well as the name of the source Data Object that is to be copied and the name of two antecedents: a Data Object against which differences are to be taken in the source Storage Resource Pool, and a corresponding Data Object in the target Storage Resource Pool. This step is repeated for each source Data Object to be operated on in this set.

Third, prepare Copy Request. The collection name is supplied as well as a Storage Resource Pool to act as a target. The prepare command instructs the Object Manager to contact the Storage Pool Manager to create the necessary target Data Objects, corresponding to each of the sources in the collection. The prepare command also supplies the corresponding Data Object in the target Storage Resource Pool to be duplicated, so the Provider can duplicate the provided object and use that as a target object. A reference name for the copy request is returned.

Fourth, activate Copy Request. The reference name for the copy request returned above is supplied. The Data Mover is instructed to copy a given source object to its corresponding target object. Each request includes a reference name as well as a sequence number to describe the overall job (the entire set of source target pairs) as well as a sequence number to describe each individual source-target pair. In addition to the source-target pair, the names of the corresponding antecedents are supplied as part of the Copy instruction.

Fifth, the Copy Engine uses the name of the Data Object in the source pool to obtain the differences between the antecedent and the source from the Difference Engine at the source. The indicated differences are then transmitted from the source to the target. In one embodiment, these differences are transmitted as bitmaps and data. In another embodiment, these differences are transmitted as extent lists and data.

503 Data Storage Objects

Data Storage Objects are software constructs that permit the storage and retrieval of Application data using idioms and methods familiar to computer data processing equipment and software. In practice these currently take the form of a SCSI block device on a storage network, e.g. a SCSI LUN, or a content-addressable container, where a designator for the content is constructed from and uniquely identifies the data therein. Data Storage Objects are created and maintained by issuing instructions to the Pool Manager. The actual storage for persisting the Application data is drawn from the Virtual Storage Pool from which the Data Storage Object is created.

The structure of the data storage object varies depending on the storage pool from which it is created. For the objects that take the form of a block device on a storage network, the data structure for a given block device Data Object implements a mapping between the Logical Block Address (LBA) of each of the blocks within the Data Object to the device identifier and LBA of the actual storage location. The identifier of the Data Object is used to identify the set of mappings to be used. The current embodiment relies on the services provided by the underlying physical computer platform to implement this mapping, and relies on its internal data structures, such as bitmaps or extent lists.

For objects that take the form of a Content Addressable Container, the content signature is used as the identifier, and the Data Object is stored as is described below in the section about deduplication.

504 Pool Manager

A Pool Manager 504 is a software component for managing virtual storage resources and the associated functionality and characteristics as described below. The Object manager 501 and Data Movement Engine 502 communicate with one or more Pool Managers 504 to maintain Data Storage Objects 503.

510 Virtual Storage Resources

Virtual Storage Resources 510 are various kinds of storage made available to the Pool Manager for implementing storage pool functions, as described below. In this embodiment, a storage virtualizer is used to present various external Fibre Channel or iSCSI storage LUNs as virtualized storage to the Pool Manager 504.

The Storage Pool Manager

Figure 6:
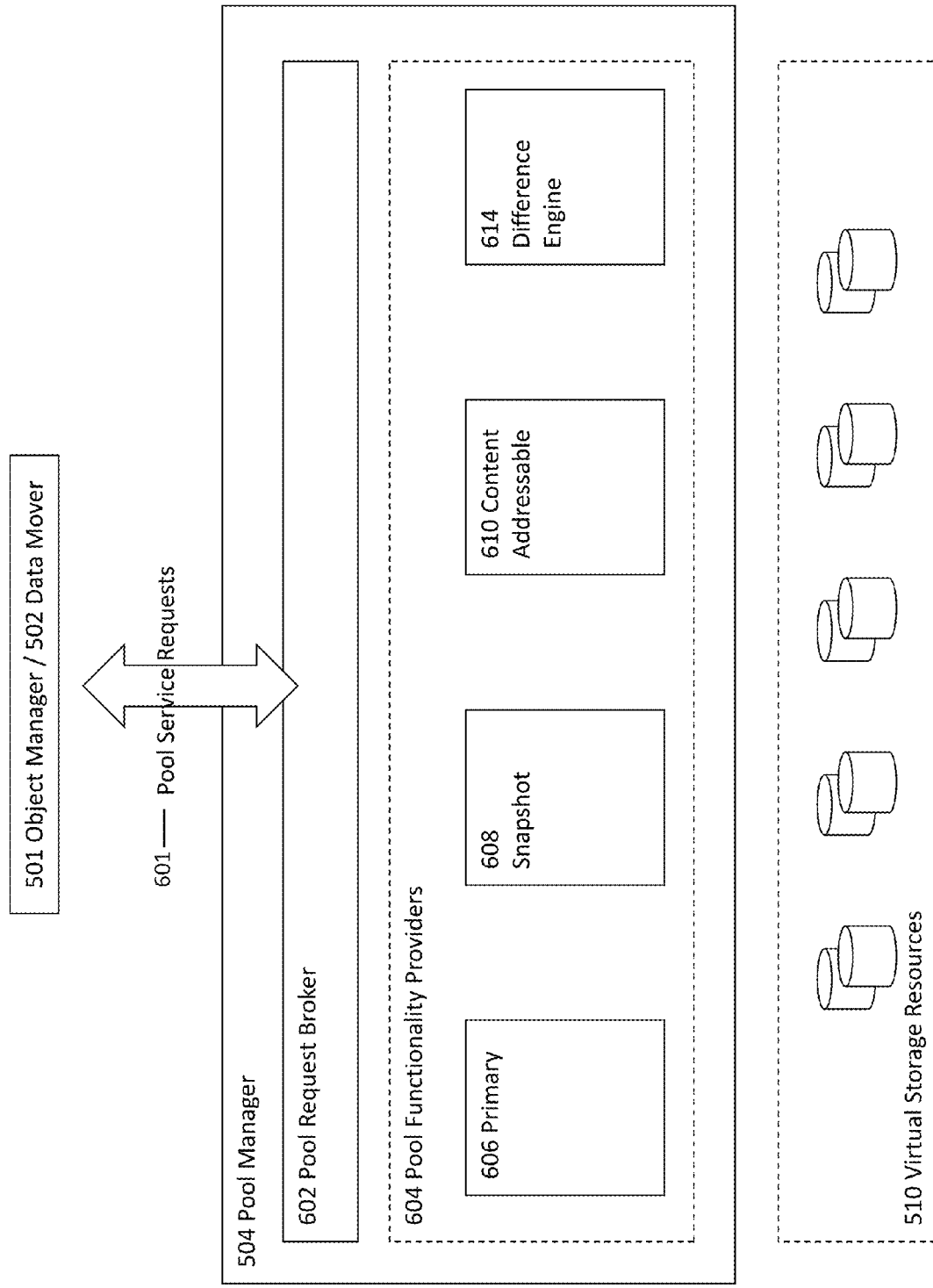
FIG. 6 shows the Storage Pool Manager.

FIG. 6 further illustrates the Storage Pool Manager 504. The purpose of the storage pool manager is to present underlying virtual storage resources to the Object Manager/Data Mover as Storage Resource Pools, which are abstractions of storage and data management functionality with common interfaces that are utilized by other components of the system. These common interfaces typically include a mechanism for identifying and addressing data objects associated with a specific temporal state, and a mechanism for producing differences between data objects in the form of bitmaps or extents. In this embodiment, the pool manager presents a Primary Storage Pool, a Performance Optimized Pool, and a Capacity Optimized Pool. The common interfaces allow the object manager to create and delete Data Storage objects in these pools, either as copies of other data storage objects or as new objects, and the data mover can move data between data storage objects, and can use the results of data object differencing operations.

The storage pool manager has a typical architecture for implementing a common interface to diverse implementations of similar functionality, where some functionality is provided by "smart" underlying resources, and other functionality must be implemented on top of less functional underlying resources.

Pool request broker 602 and pool functionality providers 604 are software modules executing in either the same process as the Object Manager/Data Mover, or in another process communicating via a local or network protocol such as TCP. In this embodiment the providers comprise a Primary Storage provider 606, Snapshot provider 608, Content Addressable provider 610, and Difference Engine provider 614, and these are further described below. In another embodiment the set of providers may be a superset of those shown here.

Virtual Storage Resources 510 are the different kinds of storage made available to the Pool Manager for implementing storage pool functions. In this embodiment, the virtual storage resources comprise sets of SCSI logical units from a storage virtualization system that runs on the same hardware as the pool manager, and accessible (for both data and management operations) through a programmatic interface: in addition to standard block storage functionality additional capabilities are available including creating and deleting snapshots, and tracking changed portions of volumes. In another embodiment the virtual resources can be from an external storage system that exposes similar capabilities, or may differ in interface (for example accessed through a file-system, or through a network interface such as CIFS, iSCSI or CDMI), in capability (for example, whether the resource supports an operation to make a copy-on-write snapshot), or in non-functional aspects (for example, high-speed/limited-capacity such as Solid State Disk versus low-speed/high-capacity such as SATA disk). The capabilities and interface available determine which providers can consume the virtual storage resources, and which pool functionality needs to be implemented within the pool manager by one or more providers: for example, this implementation of a content addressable storage provider only requires "dumb" storage, and the implementation is entirely within content addressable provider 610; an underlying content addressable virtual storage resource could be used instead with a simpler "pass-through" provider. Conversely, this implementation of a snapshot provider is mostly "pass-through" and requires storage that exposes a quick point-in-time copy operation.

Pool Request Broker 602 is a simple software component that services requests for storage pool specific functions by executing an appropriate set of pool functionality providers against the configured virtual storage resource 510. The requests that can be serviced include, but are not limited to, creating an object in a pool; deleting an object from a pool; writing data to an object; reading data from an object; copying an object within a pool; copying an object between pools; requesting a summary of the differences between two objects in a pool.

Primary storage provider 606 enables management interfaces (for example, creating and deleting snapshots, and tracking changed portions of files) to a virtual storage resource that is also exposed directly to applications via an interface such as fibre channel, iSCSI, NFS or CIFS.

Snapshot provider 608 implements the function of making a point-in-time copy of data from a Primary resource pool. This creates the abstraction of another resource pool populated with snapshots. As implemented, the point-in-time copy is a copy-on-write snapshot of the object from the primary resource pool, consuming a second virtual storage resource to accommodate the copy-on-write copies, since this management functionality is exposed by the virtual storage resources used for primary storage and for the snapshot provider.

Difference engine provider 614 can satisfy a request for two objects in a pool to be compared that are connected in a temporal chain. The difference sections between the two objects are identified and summarized in a provider-specific way, e.g. using bitmaps or extents. For example, the difference sections might be represented as a bitmap where each set bit denotes a fixed size region where the two objects differ; or the differences might be represented procedurally as a series of function calls or callbacks.

Depending on the virtual storage resource on which the pool is based, or on other providers implementing the pool, a difference engine may produce a result efficiently in various ways. As implemented, a difference engine acting on a pool implemented via a snapshot provider uses the copy-on-write nature of the snapshot provider to track changes to objects that have had snapshots made. Consecutive snapshots of a single changing primary object thus have a record of the differences that is stored alongside them by the snapshot provider, and the difference engine for snapshot pools simply retrieves this record of change. Also as implemented, a difference engine acting on a pool implemented via a Content Addressable provider uses the efficient tree structure (see below, FIG. 12) of the content addressable implementation to do rapid comparisons between objects on demand.

Figure 11:
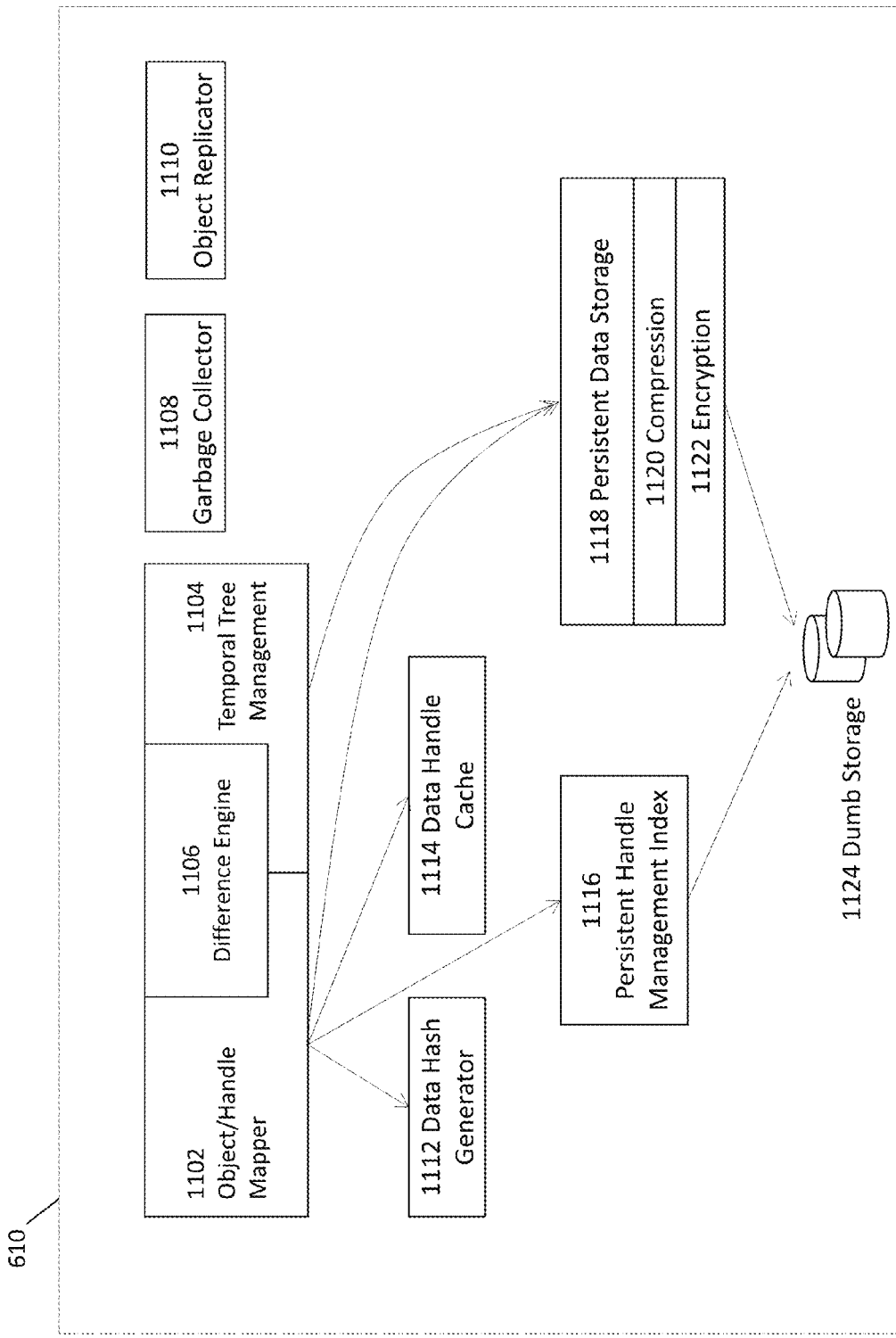
FIG. 11 is a block diagram of the Content Addressable Storage (CAS) provider.

Content addressable provider 610 implements a write-once content addressable interface to the virtual storage resource it consumes. It satisfies read, write, duplicate and delete operations. Each written or copied object is identified by a unique handle that is derived from its content. The content addressable provider is described further below (FIG. 11).

Pool Manager Operations

In operation, the pool request broker 502 accepts requests for data manipulation operations such as copy, snapshot, or delete on a pool or object. The request broker determines which provider code from pool 504 to execute by looking at the name or reference to the pool or object. The broker then translates the incoming service request into a form that can be handled by the specific pool functionality provider, and invokes the appropriate sequence of provider operations.

For example, an incoming request could ask to make a snapshot from a volume in a primary storage pool, into a snapshot pool. The incoming request identifies the object (volume) in the primary storage pool by name, and the combination of name and operation (snapshot) determines that the snapshot provider should be invoked which can make point-in-time snapshots from the primary pool using the underlying snapshot capability. This snapshot provider will translate the request into the exact form required by the native copy-on-write function performed by the underlying storage virtualization appliance, such as bitmaps or extents, and it will translate the result of the native copy-on-write function to a storage volume handle that can be returned to the object manager and used in future requests to the pool manager.

Optimal Way for Data Backup Using the Object Manager and Data Mover

Optimal Way for Data Backup is a series of operations to make successive versions of Application Data objects over time, while minimizing the amount of data that must be copied by using bitmaps, extents and other temporal difference information stored at the Object Mover. It stores the application data in a data storage object and associates with it the metadata that relates the various changes to the application data over time, such that changes over time can be readily identified.

In a preferred embodiment, the procedure comprises the following steps:

1. The mechanism provides an initial reference state, e.g. T0, of the Application Data within a Data Storage Object.
2. Subsequent instances (versions) are created on demand over time of the Data Storage Object in a Virtual Storage Pool that has a Difference Engine Provider.
3. Each successive version, e.g. T4, T5, uses the Difference Engine Provider for the Virtual Storage Pool to obtain the difference between it and the instance created prior to it, so that T5 is stored as a reference to T4 and a set of differences between T5 and T4.
4. The Copy Engine receives a request to copy data from one data object (the source) to another data object (the destination).
5. If the Virtual Storage Pool in which the destination object will be created contains no other objects created from prior versions of the source data object, then a new object is created in the destination Virtual Storage Pool and the entire contents of the source data object are copied to the destination object; the procedure is complete. Otherwise the next steps are followed.
6. If the Virtual Storage Pool in which the destination object is created contains objects created from prior versions of the source data object, a recently created prior version in the destination Virtual Storage Pool is selected for which there exists a corresponding prior version in the Virtual Storage Pool of the source data object. For example, if a copy of T5 is initiated from a snapshot pool, and an object created at time T3 is the most recent version available at the target, T3 is selected as the prior version.
7. Construct a time-ordered list of the versions of the source data object, beginning with an initial version identified in the previous step, and ending with the source data object that is about to be copied. In the above example, at the snapshot pool, all states of the object are available, but only the states including and following T3 are of interest: T3, T4, T5.
8. Construct a corresponding list of the differences between each successive version in the list such that all of the differences, from the beginning version of the list to the end are represented. Difference both, identify which portion of data has changed and includes the new data for the corresponding time. This creates a set of differences from the target version to the source version, e.g. the difference between T3 and T5.
9. Create the destination object by duplicating the prior version of the object identified in Step 6 in the destination Virtual Storage Pool, e.g. object T3 in the target store.
10. Copy the set of differences identified in the list created in Step 8 from the source data object to the destination object; the procedure is complete.

Each data object within the destination Virtual Storage Pool is complete; that is, it represents the entire data object and allows access to the all of the Application Data at the point in time without requiring external reference to state or representations at other points in time. The object is accessible without replaying all deltas from a baseline state to the present state. Furthermore, the duplication of initial and subsequent versions of the data object in the destination Virtual Storage Pool does not require exhaustive duplication of the Application Data contents therein. Finally, to arrive at second and subsequent states requires only the transmission of the changes tracked and maintained, as described above, without exhaustive traversal, transmission or replication of the contents of the data storage object.

Optimal Way for Data Restore Using the Object Manager and Data Mover

Intuitively, the operation of the Optimal Way for Data Restore is the converse of the Optimal Way for Data Backup. The procedure to recreate the desired state of a data object in a destination Virtual Storage Pool at a given point in time comprises the following steps:

1. Identify a version of the data object in another Virtual Storage Pool that has a Difference Engine Provider, corresponding to the desired state to be recreated. This is the source data object in the source Virtual Storage Pool.
2. Identify a preceding version of the data object to be recreated in the destination Virtual Storage Pool.
3. If no version of the data object is identified in Step 2, then create a new destination object in the destination Virtual Storage Pool and copy the data from the source data object to the destination data object. The procedure is complete. Otherwise, proceed with the following steps.
4. If a version of the data object is identified in Step 2, then identify a data object in the source Virtual Storage Pool corresponding to the data object identified in Step 2.
5. If no data object is identified in Step 4, then create a new destination object in the destination Virtual Storage Pool and copy the data from the source data object to the destination data object. The procedure is complete. Otherwise, proceed with the following steps.
6. Create a new destination data object in the Destination Virtual Storage Pool by duplicating the data object identified in Step 2.
7. Employ the Difference Engine Provider for the source Virtual Storage Pool to obtain the set of differences between the data object identified in Step 1 and the data object identified in Step 4.

8. Copy the data identified by the list created in Step 7 from the source data object to the destination data object. The procedure is complete.

Access to the desired state is complete: it does not require external reference to other containers or other states. Establishing the desired state given a reference state requires neither exhaustive traversal nor exhaustive transmission, only the retrieved changes indicated by the provided representations within the source Virtual Storage Pool.

The Service Level Agreement

Figure 7:
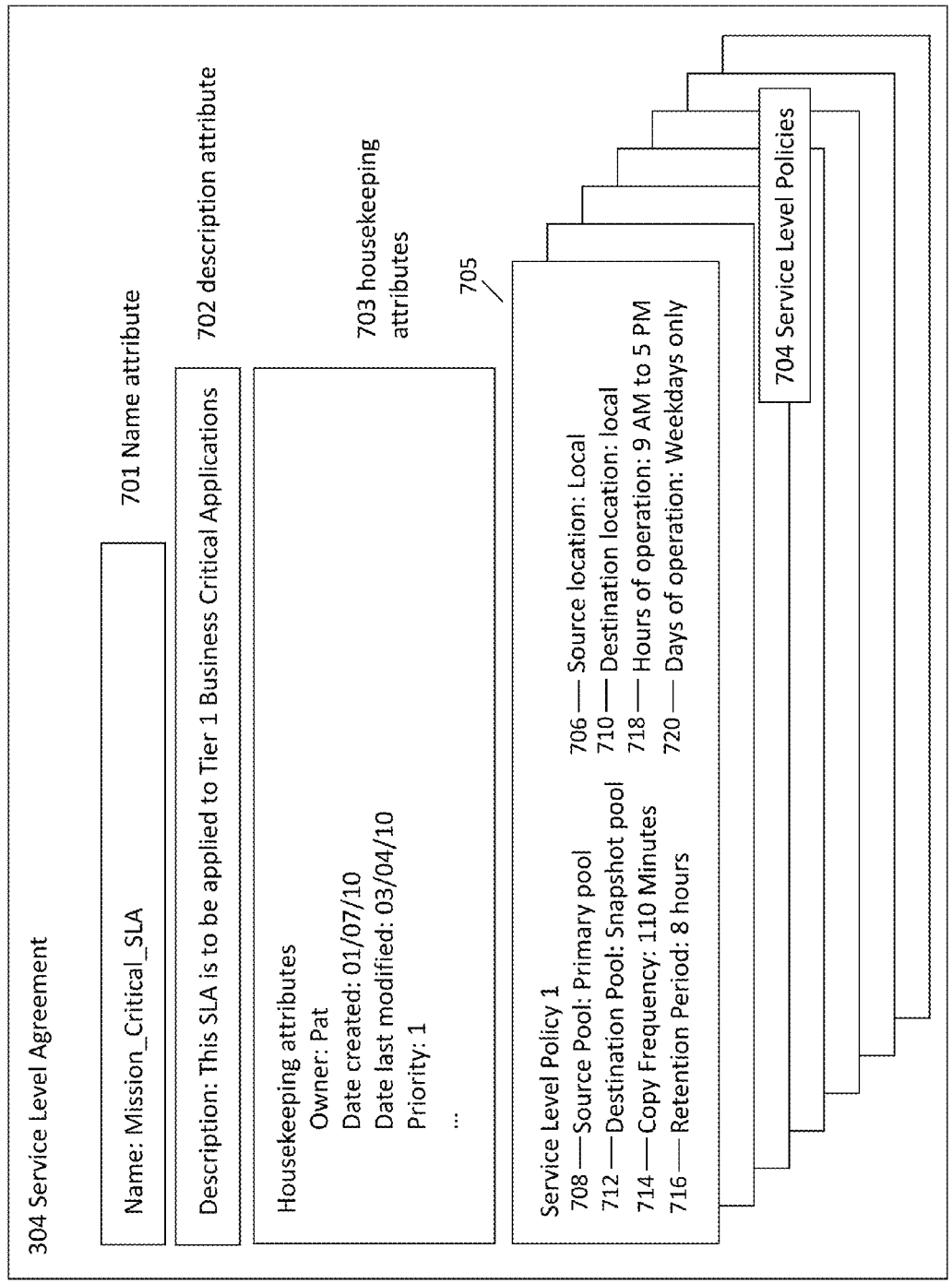
FIG. 7 shows the decomposition of the Service Level Agreement.

FIG. 7 illustrates the Service Level Agreement. The Service Level Agreement captures the detailed business requirements with respect to secondary copies of the application data. In the simplest description, the business requirements define when and how often copies are created, how long they are retained and in what type of storage pools these copies reside. This simplistic description does not capture several aspects of the business requirements. The frequency of copy creation for a given type of pool may not be uniform across all hours of the day or across all days of a week. Certain hours of the day, or certain days of a week or month may represent more (or less) critical periods in the application data, and thus may call for more (or less) frequent copies. Similarly, all copies of application data in a particular pool may not be required to be retained for the same length of time. For example, a copy of the application data created at the end of monthly processing may need to be retained for a longer period of time than a copy in the same storage pool created in the middle of a month.

The Service Level Agreement 304 of certain embodiments has been designed to represent all of these complexities that exist in the business requirements. The Service Level Agreement has four primary parts: the name, the description, the housekeeping attributes and a collection of Service Level Policies. As mentioned above, there is one SLA per application.

The name attribute 701 allows each Service Level Agreement to have a unique name.

The description attribute 702 is where the user can assign a helpful description for the Service Level Agreement.

The Service Level agreement also has a number of housekeeping attributes 703 that enable it to be maintained and revised. These attributes include but are not limited to the owner's identity, the dates and times of creation, modification and access, priority, enable/disable flags.

The Service Level Agreement also contains a plurality of Service Level Policies 705. Some Service level Agreements may have just a single Service Level Policy. More typically, a single SLA may contain tens of policies.

Each Service Level Policy consists of at least the following, in certain embodiments: the source storage pool location 706 and type 708; the target storage pool location 710 and type 712; the frequency for the creation of copies 714, expressed as a period of time; the length of retention of the copy 716, expressed as a period of time; the hours of operation 718 during the day for this particular Service Level Policy; and the days of the week, month or year 720 on which this Service Level Policy applies.

Each Service Level Policy specifies a source and target storage pool, and the frequency of copies of application data that are desired between those storage pools. Furthermore, the Service Level Policy specifies its hours of operation and days on which it is applicable. Each Service Level Policy is the representation of one single statement in the business requirements for the protection of application data. For example, if a particular application has a business requirement for an archive copy to be created each month after the monthly close and retained for three years, this might translate to a Service level Policy that requires a copy from the Local Backup Storage Pool into the Long-term Archive Storage Pool at midnight on the last day of the month, with a retention of three years.

All of the Service Level Policies with a particular combination of source and destination pool and location, say for example, source Primary Storage pool and destination local Snapshot pool, when taken together, specify the business requirements for creating copies into that particular destination pool. Business requirements may dictate for example that snapshot copies be created every hour during regular working hours, but only once every four hours outside of these times. Two Service Level Policies with the same source and target storage pools will effectively capture these requirements in a form that can be put into practice by the Service Policy Engine.

This form of a Service Level Agreement allows the representation of the schedule of daily, weekly and monthly business activities, and thus captures business requirements for protecting and managing application data much more accurately than traditional RPO and RPO based schemes. By allowing hour of operation and days, weeks, and months of the year, scheduling can occur on a "calendar basis."

Taken together, all of the Service Level Policies with one particular combination of source and destinations, for example, "source: local primary and destination: local performance optimized", captures the non-uniform data protection requirements for one type of storage. A single RPO number, on the other hand, forces a single uniform frequency of data protection across all times of day and all days. For example, a combination of Service Level Policies may require a large number of snapshots to be preserved for a short time, such as 10 minutes, and a lesser number of snapshots to be preserved for a longer time, such as 8 hours; this allows a small amount of information that has been accidentally deleted can be reverted to a state not more than 10 minutes before, while still providing substantial data protection at longer time horizons without requiring the storage overhead of storing all snapshots taken every ten minutes. As another example, the backup data protection function may be given one Policy that operates with one frequency during the work week, and another frequency during the weekend.

When Service Level Policies for all of the different classes of source and destination storage are included, the Service Level Agreement fully captures all of the data protection requirements for the entire application, including local snapshots, local long duration stores, off-site storage, archives, etc. A collection of policies within a SLA is capable of expressing when a given function should be performed, and is capable of expressing multiple data management functions that should be performed on a given source of data.

Service Level Agreements are created and modified by the user through a user interface on a management workstation. These agreements are electronic documents stored by the Service Policy Engine in a structured SQL database or other repository that it manages. The policies are retrieved, electronically analyzed, and acted upon by the Service Policy Engine through its normal scheduling algorithm as described below.

Figure 8:
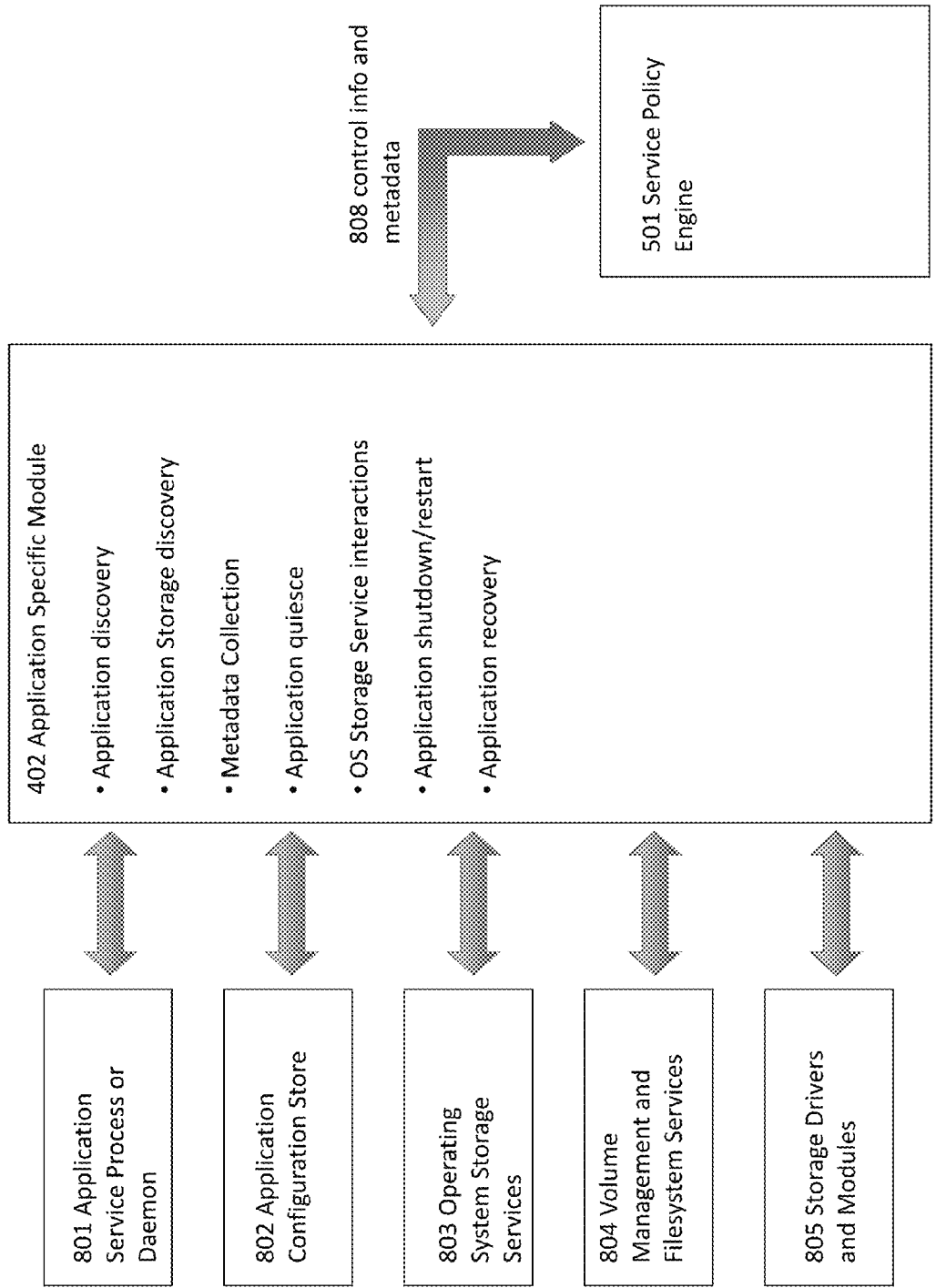
FIG. 8 illustrates the Application Specific Module.

FIG. 8 illustrates the Application Specific Module 402. The Application Specific module runs close to the Application 300 (as described above), and interacts with the Application and its operating environment to gather metadata and to query and control the Application as required for data management operations.

The Application Specific Module interacts with various components of the application and its operating environment including Application Service Processes and Daemons 801, Application Configuration Data 802, Operating System Storage Services 803 (such as VSS and VDS on Windows), Logical Volume Management and Filesystem Services 804, and Operating System Drivers and Modules 805.

The Application Specific Module performs these operations in response to control commands from the Service Policy Engine 406. There are two purposes for these interactions with the application: Metadata Collection and Application Consistency.

Metadata Collection is the process by which the Application Specific Module collects metadata about the application. In some embodiments, metadata includes information such as: configuration parameters for the application; state and status of the application; control files and startup/shutdown scripts for the application; location of the datafiles, journal and transaction logs for the application; and symbolic links, filesystem mount points, logical volume names, and other such entities that can affect the access to application data.

Metadata is collected and saved along with application data and SLA information. This guarantees that each copy of application data within the system is self contained and includes all of the details required to rebuild the application data.

Application Consistency is the set of actions that ensure that when a copy of the application data is created, the copy is valid, and can be restored into a valid instance of the application. This is critical when the business requirements dictate that the application be protected while it is live, in its online, operational state. The application may have interdependent data relations within its data stores, and if these are not copied in a consistent state will not provide a valid restorable image.

The exact process of achieving application consistency varies from application to application. Some applications have a simple flush command that forces cached data to disk. Some applications support a hot backup mode where the application ensures that its operations are journalled in a manner that guarantees consistency even as application data is changing. Some applications require interactions with operating system storage services such as VSS and VDS to ensure consistency. The Application Specific Module is purpose-built to work with a particular application and to ensure the consistency of that application. The Application Specific Module interacts with the underlying storage virtualization device and the Object Manager to provide consistent snapshots of application data.

For efficiency, the preferred embodiment of the Application Specific Module 402 is to run on the same server as Application 300. This assures the minimum latency in the interactions with the application, and provides access to storage services and filesystems on the application host. The application host is typically considered primary storage, which is then snapshotted to a performance-optimized store.

In order to minimize interruption of a running application, including minimizing preparatory steps, the Application Specific Module is only triggered to make a snapshot when access to application data is required at a specific time, and when a snapshot for that time does not exist elsewhere in the system, as tracked by the Object Manager. By tracking which times snapshots have been made, the Object Manager is able to fulfill subsequent data requests from the performance-optimized data store, including for satisfying multiple requests for backup and replication which may issue from secondary, capacity-optimized pools. The Object Manager may be able to provide object handles to the snapshot in the performance-optimized store, and may direct the performance-optimized store in a native format that is specific to the format of the snapshot, which is dependent on the underlying storage appliance. In some embodiments this format may be application data combined with one or more LUN bitmaps indicating which blocks have changed; in other embodiments it may be specific extents. The format used for data transfer is thus able to transfer only a delta or difference between two snapshots using bitmaps or extents.

Metadata, such as the version number of the application, may also be stored for each application along with the snapshot. When a SLA policy is executed, application metadata is read and used for the policy. This metadata is stored along with the data objects. For each SLA, application metadata will only be read once during the lightweight snapshot operation, and preparatory operations which occur at that time such as flushing caches will only be performed once during the lightweight snapshot operation, even though this copy of application data along with its metadata may be used for multiple data management functions.

The Service Policy Engine

Figure 9:
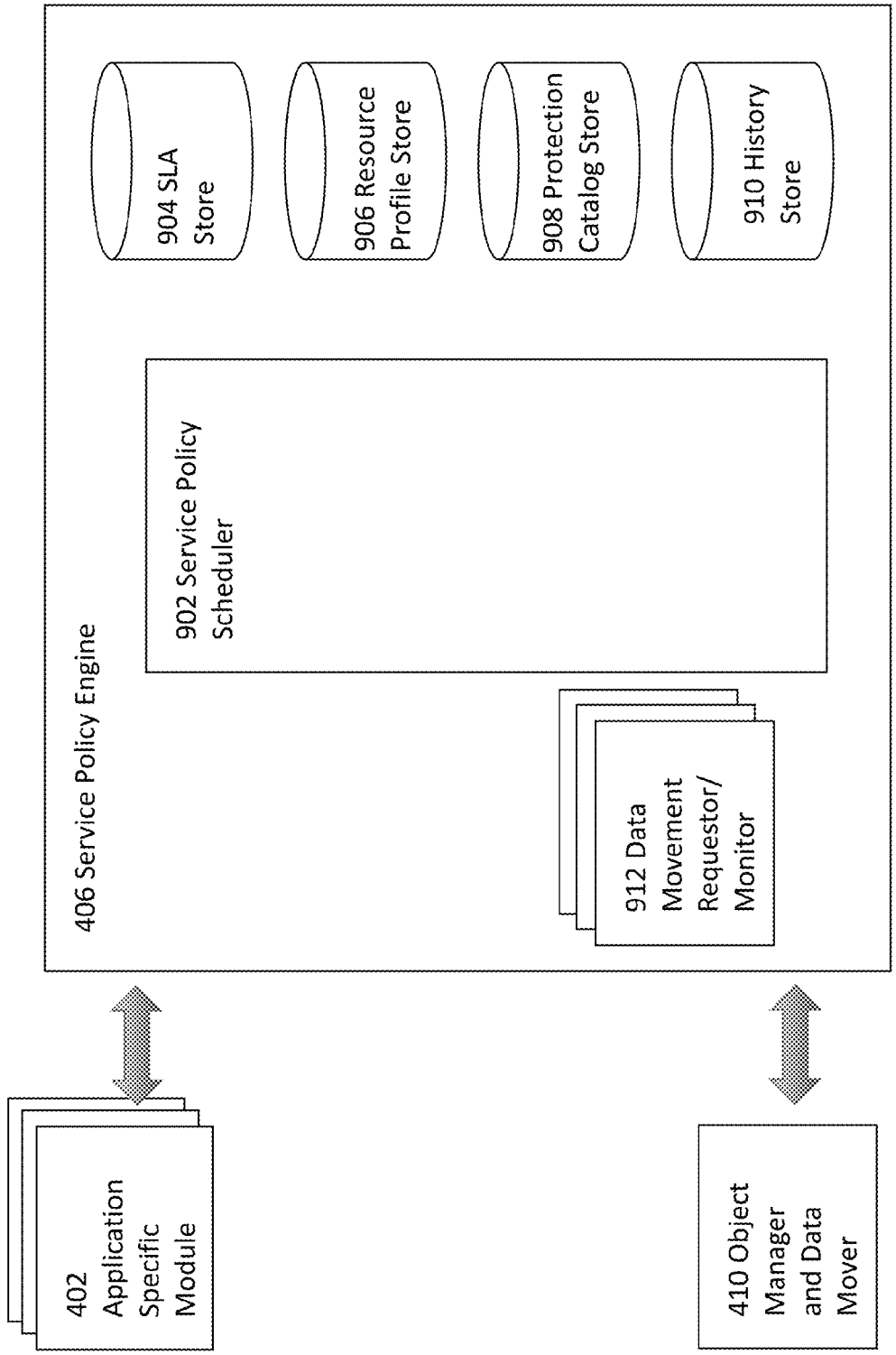
FIG. 9 shows the Service Policy Manager.

FIG. 9 illustrates the Service Policy Engine 406. The Service Policy Engine contains the Service Policy Scheduler 902, which examines all of the Service Level Agreements configured by the user and makes scheduling decisions to satisfy Service Level Agreements. It relies on several data stores to capture information and persist it over time, including, in some embodiments, a SLA Store 904, where configured Service Level Agreements are persisted and updated; a Resource Profile Store 906, storing Resource Profiles that provide a mapping between logical storage pool names and actual storage pools; Protection Catalog Store 908, where information is cataloged about previous successful copies created in various pools that have not yet expired; and centralized History Store 910.

History Store 910 is where historical information about past activities is saved for the use of all data management applications, including the timestamp, order and hierarchy of previous copies of each application into various storage pools. For example, a snapshot copy from a primary data store to a capacity-optimized data store that is initiated at 1 P.M. and is scheduled to expire at 9 P.M. will be recorded in History Store 910 in a temporal data store that also includes linked object data for snapshots for the same source and target that have taken place at 11 A.M. and 12 P.M.

These stores are managed by the Service Policy Engine. For example, when the user, through the Management workstation creates a Service Level Agreement, or modifies one of the policies within it, it is the Service Policy Engine that persists this new SLA in its store, and reacts to this modification by scheduling copies as dictated by the SLA. Similarly, when the Service Policy Engine successfully completes a data movement job that results in a new copy of an application in a Storage Pool, the Storage Policy Engine updates the History Store, so that this copy will be factored into future decisions.

The preferred embodiment of the various stores used by the Service Policy Engine is in the form of tables in a relational database management system in close proximity to the Service Policy Engine. This ensures consistent transactional semantics when querying and updating the stores, and allows for flexibility in retrieving interdependent data.

Figure 10:
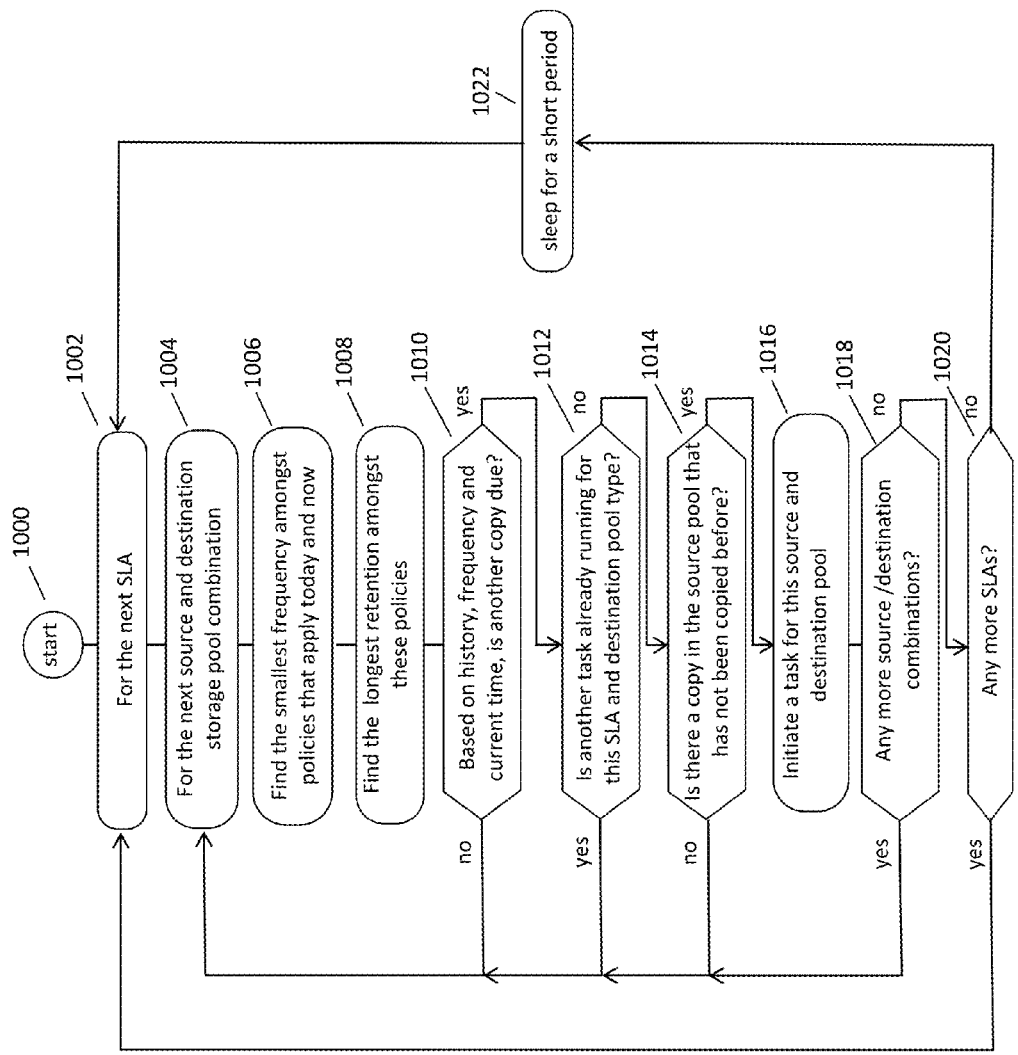
FIG. 10 is a flowchart of the Service Policy Scheduler.

The scheduling algorithm for the Service Policy Scheduler 902 is illustrated in FIG. 10. When the Service Policy Scheduler decides it needs to make a copy of application data from one storage pool to another, it initiates a Data Movement Requestor and Monitor task, 912. These tasks are not recurring tasks and terminate when they are completed. Depending on the way that Service Level Policies are specified, a plurality of these requestors might be operational at the same time.

The Service Policy Scheduler considers the priorities of Service Level Agreements when determining which additional tasks to undertake. For example, if one Service Level Agreement has a high priority because it specifies the protection for a mission-critical application, whereas another SLA has a lower priority because it specifies the protection for a test database, then the Service Policy Engine may choose to run only the protection for the mission-critical application, and may postpone or even entirely skip the protection for the lower priority application. This is accomplished by the Service Policy Engine scheduling a higher priority SLA ahead of a lower priority SLA. In the preferred embodiment, in such a situation, for auditing purposes, the Service Policy Engine will also trigger a notification event to the management workstation.

The Policy Scheduling Algorithm

FIG. 10 illustrates the flowchart of the Policy Schedule Engine. The Policy Schedule Engine continuously cycles through all the SLAs defined. When it gets to the end of all of the SLAs, it sleeps for a short while, e.g. 10 seconds, and resumes looking through the SLAs again. Each SLA encapsulates the complete data protection business requirements for one application; thus all of the SLAs represent all of the applications.

For each SLA, the schedule engine collects together all of the Service Level Policies that have the same source pool and destination pool 1004 the process state at 1000 and iterates to the next SLA in the set of SLAs in 1002. Taken together, this subset of the Service Level Policies represent all of the requirements for a copy from that source storage pool to that particular destination storage pool.

Among this subset of Service Level Policies, the Service Policy Scheduler discards the policies that are not applicable to today, or are outside their hours of operation. Among the policies that are left, find the policy that has the shortest frequency 1006, and based on the history data and in history store 910, the one with the longest retention that needs to be run next 1008.

Next, there are a series of checks 1010-1014 which rule out making a new copy of application data at this time—because the new copy is not yet due, because a copy is already in progress or because there is not new data to copy. If any of these conditions apply, the Service Policy Scheduler moves to the next combination of source and destination pools 1004. If none of these conditions apply, a new copy is initiated. The copy is executed as specified in the corresponding service level policy within this SLA 1016.

Next, the Scheduler moves to the next Source and Destination pool combination for the same Service Level agreement 1018. If there are no more distinct combinations, the Scheduler moves on to the next Service Level Agreement 1020.

After the Service Policy Scheduler has been through all source/destination pool combinations of all Service Level Agreements, it pauses for a short period and then resumes the cycle.

A simple example system with a snapshot store and a backup store, with only 2 policies defined, would interact with the Service Policy Scheduler as follows. Given two policies, one stating "backup every hour, the backup to be kept for 4 hours" and another stating "backup every 2 hours, the backup to be kept for 8 hours," the result would be a single snapshot taken each hour, the snapshots each being copied to the backup store but retained a different amount of time at both the snapshot store and the backup store. The "backup every 2 hours" policy is scheduled to go into effect at 12:00 P.M by the system administrator.

At 4:00 P.M., when the Service Policy Scheduler begins operating at step 1000, it finds the two policies at step 1002. (Both policies apply because a multiple of two hours has elapsed since 12:00 P.M.) There is only one source and destination pool combination at step 1004. There are two frequencies at step 1006, and the system selects the 1-hour frequency because it is shorter than the 2-hour frequency. There are two operations with different retentions at step 1008, and the system selects the operation with the 8-hour retention, as it has the longer retention value. Instead of one copy being made to satisfy the 4-hour requirement and another copy being made to satisfy the 8-hour requirement, the two requirements are coalesced into the longer 8-hour requirement, and are satisfied by a single snapshot copy operation. The system determines that a copy is due at step 1010, and checks the relevant objects at the History Store 910 to determine if the copy has already been made at the target (at step 912) and at the source (at step 914). If these checks are passed, the system initiates the copy at step 916, and in the process triggers a snapshot to be made and saved at the snapshot store. The snapshot is then copied from the snapshot store to the backup store. The system then goes to sleep 1022 and wakes up again after a short period, such as 10 seconds. The result is a copy at the backup store and a copy at the snapshot store, where every even-hour snapshot lasts for 8 hours, and every odd-hour snapshot lasts 4 hours. The even-hour snapshots at the backup store and the snapshot store are both tagged with the retention period of 8 hours, and will be automatically deleted from the system by another process at that time.

Note that there is no reason to take two snapshots or make two backup copies at 2 o'clock, even though both policies apply, because both policies are satisfied by a single copy. Combining and coalescing these snapshots results in the reduction of unneeded operations, while retaining the flexibility of multiple separate policies. As well, it may be helpful to have two policies active at the same time for the same target with different retention. In the example given, there are more hourly copies kept than two-hour copies, resulting in more granularity for restore at times that are closer to the present. For example, in the previous system, if at 7:30 P.M. damage is discovered from earlier in the afternoon, a backup will be available for every hour for the past four hours: 4, 5, 6, 7 P.M. As well, two more backups will have been retained from 2 P.M. and 12 P.M.

The Content Addressable Store

FIG. 11 is a block diagram of the modules implementing the content addressable store for the Content Addressable Provider 510.

The content addressable store 510 implementation provides a storage resource pool that is optimized for capacity rather than for copy-in or copy-out speed, as would be the case for the performance-optimized pool implemented through snapshots, described earlier, and thus is typically used for offline backup, replication and remote backup. Content addressable storage provides a way of storing common subsets of different objects only once, where those common subsets may be of varying sizes but typically as small as 4 KiBytes. The storage overhead of a content addressable store is low compared to a snapshot store, though the access time is usually higher. Generally objects in a content addressable store have no intrinsic relationship to one another, even though they may share a large percentage of their content, though in this implementation a history relationship is also maintained, which is an enabler of various optimizations to be described. This contrasts with a snapshot store where snapshots intrinsically form a chain, each storing just deltas from a previous snapshot or baseline copy. In particular, the content addressable store will store only one copy of a data subset that is repeated multiple times within a single object, whereas a snapshot-based store will store at least one full-copy of any object.

The content addressable store 510 is a software module that executes on the same system as the pool manager, either in the same process or in a separate process communicating via a local transport such as TCP. In this embodiment, the content addressable store module runs in a separate process so as to minimize impact of software failures from different components.

This module's purpose is to allow storage of Data Storage Objects 403 in a highly space-efficient manner by deduplicating content (i.e., ensuring repeated content within single or multiple data objects is stored only once).

The content addressable store module provides services to the pool manager via a programmatic API. These services comprise the following:

Object to Handle mapping 1102: an object can be created by writing data into the store via an API; once the data is written completely the API returns an object handle determined by the content of the object. Conversely, data may be read as a stream of bytes from an offset within an object by providing the handle. Details of how the handle is constructed are explained in connection with the description of FIG. 12.

Temporal Tree Management 1104 tracks parent/child relationships between data objects stored. When a data object is written into the store 510, an API allows it to be linked as a child to a parent object already in the store. This indicates to the content addressable store that the child object is a modification of the parent. A single parent may have multiple children with different modifications, as might be the case for example if an application's data were saved into the store regularly for some while; then an early copy were restored and used as a new starting point for subsequent modifications. Temporal tree management operations and data models are described in more detail below.

Difference Engine 1106 can generate a summary of difference regions between two arbitrary objects in the store. The differencing operation is invoked via an API specifying the handles of two objects to be compared, and the form of the difference summary is a sequence of callbacks with the offset and size of sequential difference sections. The difference is calculated by comparing two hashed representations of the objects in parallel.

Garbage Collector 1108 is a service that analyzes the store to find saved data that is not referenced by any object handle, and to reclaim the storage space committed to this data. It is the nature of the content addressable store that much data is referenced by multiple object handles, i.e., the data is shared between data objects; some data will be referenced by a single object handle; but data that is referenced by no object handles (as might be the case if an object handle has been deleted from the content addressable system) can be safely overwritten by new data.

Object Replicator 1110 is a service to duplicate data objects between two different content addressable stores. Multiple content addressable stores may be used to satisfy additional business requirements, such as offline backup or remote backup.

These services are implemented using the functional modules shown in FIG. 11. The Data Hash module 1112 generates fixed length keys for data chunks up to a fixed size limit. For example, in this embodiment the maximum size of chunk that the hash generator will make a key for is 64 KiB. The fixed length key is either a hash, tagged to indicate the hashing scheme used, or a non-lossy algorithmic encoding. The hashing scheme used in this embodiment is SHA-1, which generates a secure cryptographic hash with a uniform distribution and a probability of hash collision near enough zero that no facility need be incorporated into this system to detect and deal with collisions.

The Data Handle Cache 1114 is a software module managing an in-memory database that provides ephemeral storage for data and for handle-to-data mappings.

The Persistent Handle Management Index 1104 is a reliable persistent database of CAH-to-data mappings. In this embodiment it is implemented as a B-tree, mapping hashes from the hash generator to pages in the persistent data store 1118 that contain the data for this hash. Since the full B-tree cannot be held in memory at one time, for efficiency, this embodiment also uses an in-memory bloom filter to avoid expensive B-tree searches for hashes known not to be present.

The Persistent Data Storage module 1118 stores data and handles to long-term persistent storage, returning a token indicating where the data is stored. The handle/token pair is subsequently used to retrieve the data. As data is written to persistent storage, it passes through a layer of lossless data compression 1120, in this embodiment implemented using zlib, and a layer of optional reversible encryption 1122, which is not enabled in this embodiment.

For example, copying a data object into the content addressable store is an operation provided by the object/handle mapper service, since an incoming object will be stored and a handle will be returned to the requestor. The object/handle mapper reads the incoming object, requests hashes to be generated by the Data Hash Generator, stores the data to Persistent Data Storage and the handle to the Persistent Handle Management Index. The Data Handle Cache is kept updated for future quick lookups of data for the handle. Data stored to Persistent Data Storage is compressed and (optionally) encrypted before being written to disk. Typically a request to copy in a data object will also invoke the temporal tree management service to make a history record for the object, and this is also persisted via Persistent Data Storage.

As another example, copying a data object out of the content addressable store given its handle is another operation provided by the object/handle mapper service. The handle is looked up in the Data Handle Cache to locate the corresponding data; if the data is missing in the cache the persistent index is used; once the data is located on disk, it is retrieved via persistent data storage module (which decrypts and decompresses the disk data) and then reconstituted to return to the requestor.

The Content Addressable Store Handle

Figure 12:
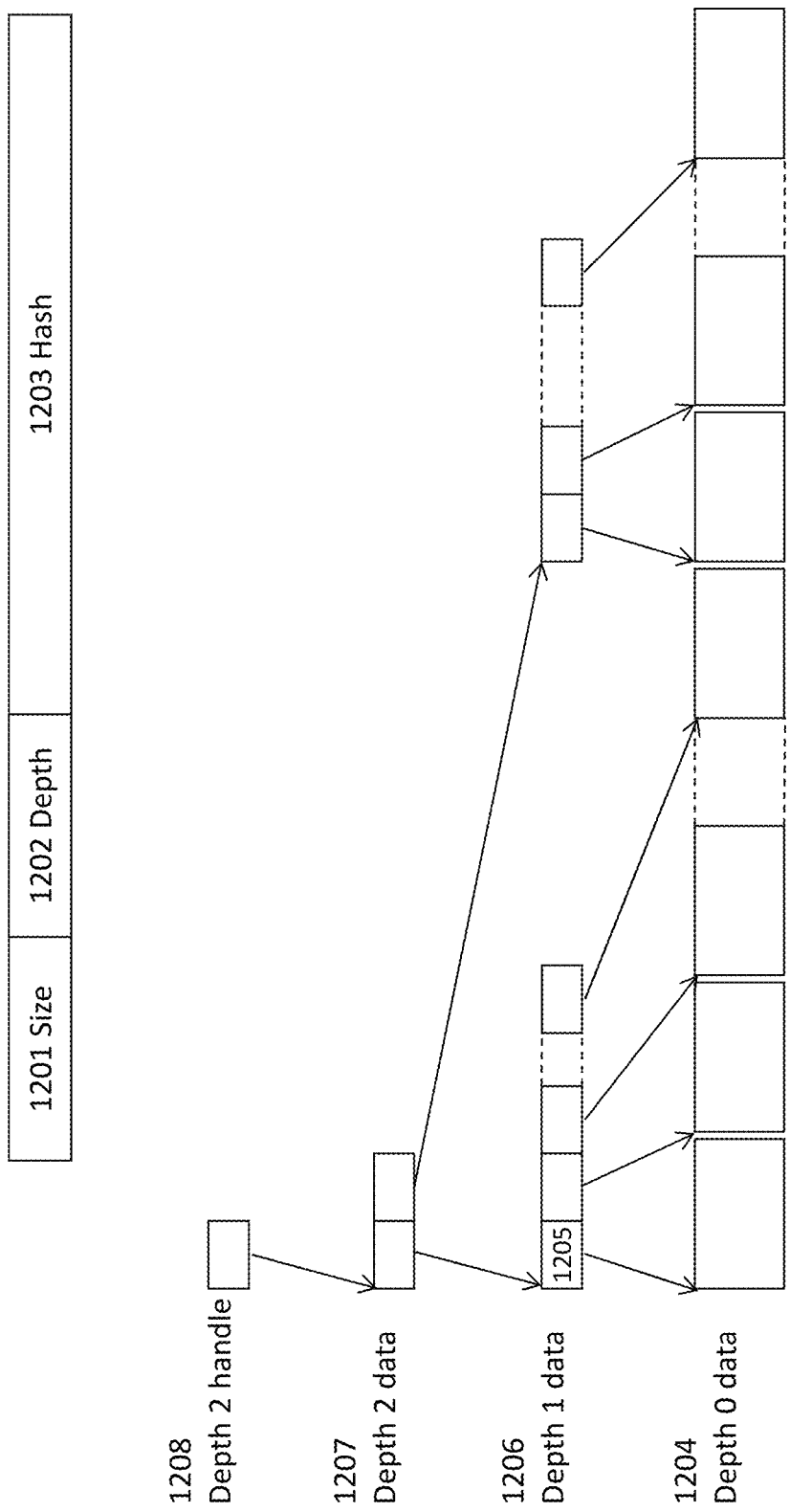
FIG. 12 shows the definition of an object handle within the CAS system.

FIG. 12 shows how the handle for a content addressed object is generated. The data object manager references all content addressable objects with a content addressable handle. This handle is made up of three parts. The first part 1201 is the size of the underlying data object the handle immediately points to. The second part 1202 is the depth of object it points to. The third 1203 is a hash of the object it points to. Field 1203 optionally includes a tag indicating that the hash is a non-lossy encoding of the underlying data. The tag indicates the encoding scheme used, such as a form of run-length encoding (RLE) of data used as an algorithmic encoding if the data chunk can be fully represented as a short enough RLE. If the underlying data object is too large to be represented as a non-lossy encoding, a mapping from the hash to a pointer or reference to the data is stored separately in the persistent handle management index 1104.

The data for a content addressable object is broken up into chunks 1204. The size of each chunk must be addressable by one content addressable handle 1205. The data is hashed by the data hash module 1102, and the hash of the chunk is used to make the handle. If the data of the object fits in one chunk, then the handle created is the final handle of the object. If not, then the handles themselves are grouped together into chunks 1206 and a hash is generated for each group of handles. This grouping of handles continues 1207 until there is only one handle 1208 produced which is then the handle for the object.

When an object is to be reconstituted from a content handle (the copy-out operation for the storage resource pool), the top level content handle is dereferenced to obtain a list of next-level content handles. These are dereferenced in turn to obtain further lists of content handles until depth-0 handles are obtained. These are expanded to data, either by looking up the handle in the handle management index or cache, or (in the case of an algorithmic hash such as run-length encoding) expanding deterministically to the full content.

Temporal Tree Management

Figure 13:
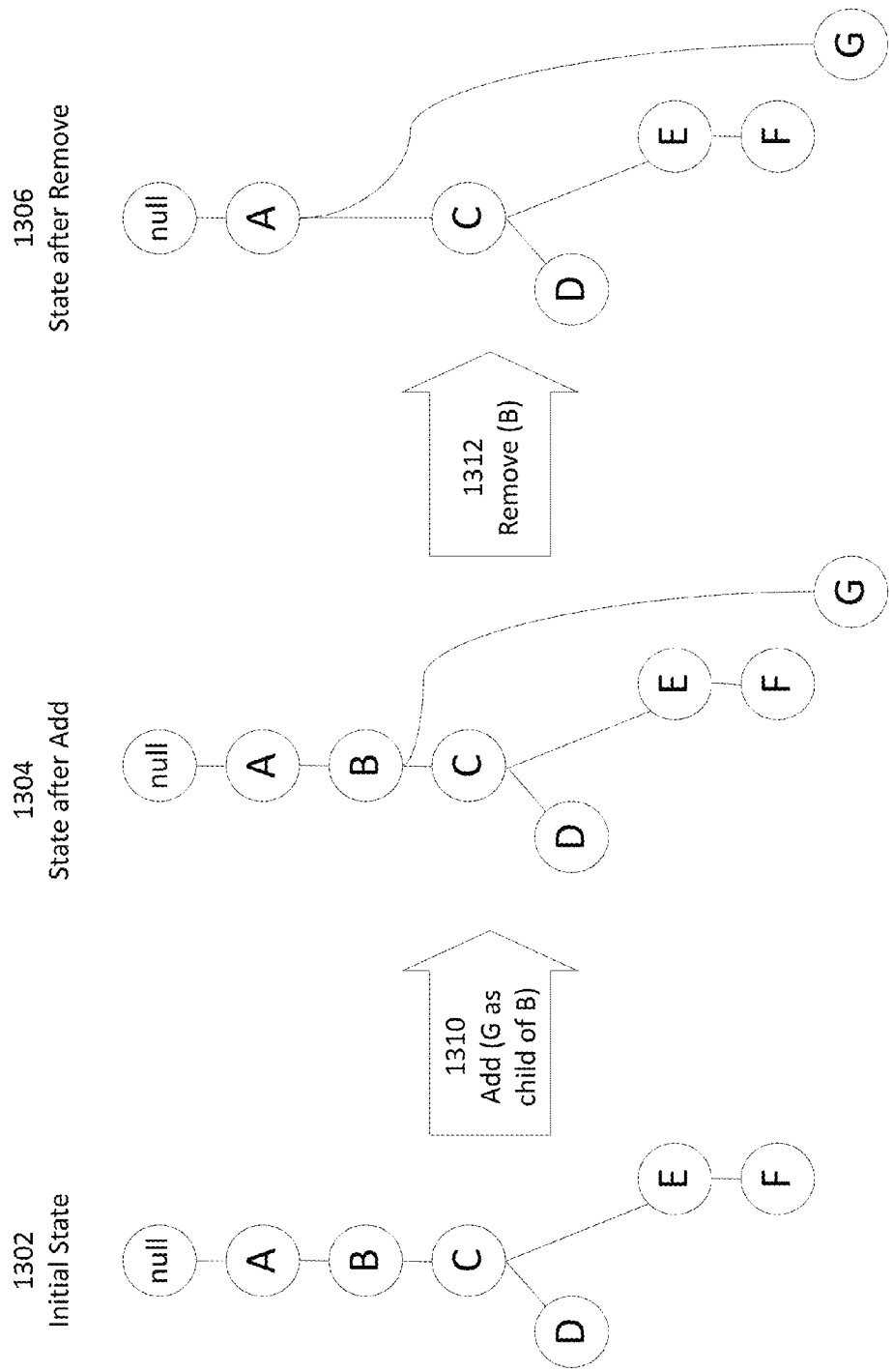
FIG. 13 shows the data model and operations for the temporal relationship graph stored for objects within the CAS.

FIG. 13 illustrates the temporal tree relationship created for data objects stored within the content addressable store. This particular data structure is utilized only within the content addressable store. The temporal tree management module maintains data structures 1302 in the persistent store that associate each content-addressed data object to a parent (which may be null, to indicate the first in a sequence of revisions). The individual nodes of the tree contain a single hash value. This hash value references a chunk of data, if the hash is a depth-0 hash, or a list of other hashes, if the hash is a depth-1 or higher hash. The references mapped to a hash value is contained in the Persistent Handle Management Index 1104. In some embodiments the edges of the tree may have weights or lengths, which may be used in an algorithm for finding neighbors.

This is a standard tree data structure and the module supports standard manipulation operations, in particular: 1310 Add: adding a leaf below a parent, which results in a change to the tree as between initial state 1302 and after-add state 1304; and 1312 Remove: removing a node (and reparenting its children to its parent), which results in a change to the tree as between after-add state 1304 and after-remove state 1306.

The "Add" operation is used whenever an object is copied-in to the CAS from an external pool. If the copy-in is via the Optimal Way for Data Backup, or if the object is originating in a different CAS pool, then it is required that a predecessor object be specified, and the Add operation is invoked to record this predecessor/successor relationship.

The "Remove" operation is invoked by the object manager when the policy manager determines that an object's retention period has expired. This may lead to data stored in the CAS having no object in the temporal tree referring to it, and therefore a subsequent garbage collection pass can free up the storage space for that data as available for re-use.

Note that it is possible for a single predecessor to have multiple successors or child nodes. For example, this may occur if an object is originally created at time T1 and modified at time T2, the modifications are rolled back via a restore operation, and subsequent modifications are made at time T3. In this example, state T1 has two children, state T2 and state T3.

Different CAS pools may be used to accomplish different business objectives such as providing disaster recovery in a remote location. When copying from one CAS to another CAS, the copy may be sent as hashes and offsets, to take advantage of the native deduplication capabilities of the target CAS. The underlying data pointed to by any new hashes is also sent on an as-needed basis.

The temporal tree structure is read or navigated as part of the implementation of various services:
- Garbage Collection navigates the tree in order to reduce the cost of the "mark" phase, as described below
- Replication to a different CAS pool finds a set of near-neighbors in the temporal tree that are also known to have been transferred already to the other CAS pool, so that only a small set of differences need to be transferred additionally
- Optimal-Way for data restore uses the temporal tree to find a predecessor that can be used as a basis for the restore operation. In the CAS temporal tree data structure, children are subsequent versions, e.g., as dictated by archive policy. Multiple children are supported on the same parent node; this case may arise when a parent node is changed, then used as the basis for a restore, and subsequently changed again.

CAS Difference Engine

The CAS difference engine 1106 compares two objects identified by hash values or handles as in FIGS. 11 and 12, and produces a sequence of offsets and extents within the objects where the object data is known to differ. This sequence is achieved by traversing the two object trees in parallel in the hash data structure of FIG. 12. The tree traversal is a standard depth- or breadth-first traversal. During traversal, the hashes at the current depth are compared. Where the hash of a node is identical between both sides, there is no need to descend the tree further, so the traversal may be pruned. If the hash of a node is not identical, the traversal continues descending into the next lowest level of the tree. If the traversal reaches a depth-0 hash that is not identical to its counterpart, then the absolute offset into the data object being compared where the non-identical data occurs, together with the data length, is emitted into the output sequence. If one object is smaller in size than another, then its traversal will complete earlier, and all subsequent offsets encountered in the traversal of the other are emitted as differences.

Garbage Collection Via Differencing

As described under FIG. 11, Garbage Collector is a service that analyzes a particular CAS store to find saved data that is not referenced by any object handle in the CAS store temporal data structure, and to reclaim the storage space committed to this data. Garbage collection uses a standard "Mark and Sweep" approach. Since the "mark" phase may be quite expensive, the algorithm used for the mark phase attempts to minimize marking the same data multiple times, even though it may be referenced many times; however the mark phase must be complete, ensuring that no referenced data is left unmarked, as this would result in data loss from the store as, after a sweep phase, unmarked data would later be overwritten by new data.

The algorithm employed for marking referenced data uses the fact that objects in the CAS are arranged in graphs with temporal relationships using the data structure depicted in FIG. 13. It is likely that objects that share an edge in these graphs differ in only a small subset of their data, and it is also rare that any new data chunk that appears when an object is created from a predecessor should appear again between any two other objects. Thus, the mark phase of garbage collection processes each connected component of the temporal graph.

Figure 14:
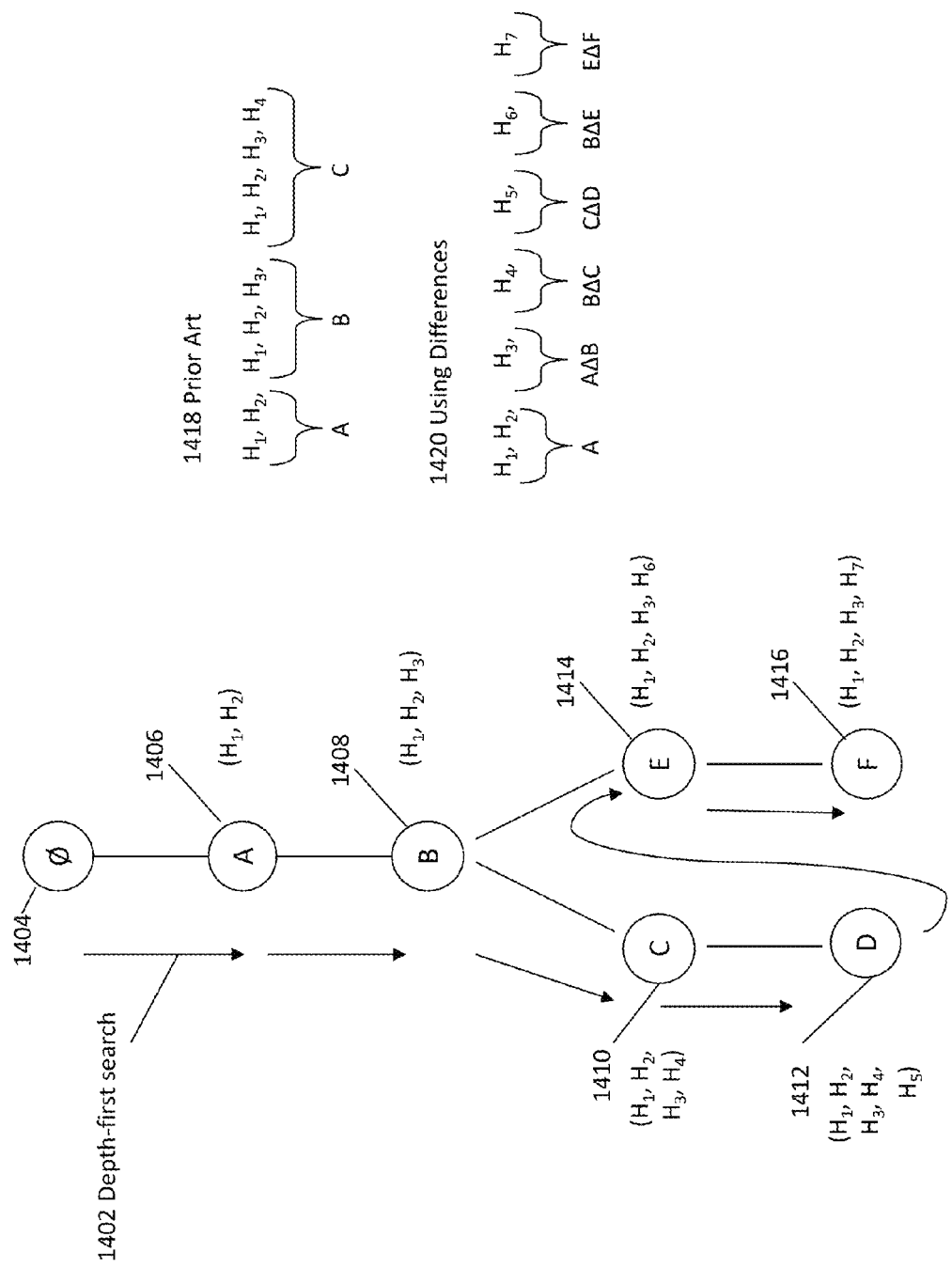
FIG. 14 is a diagram representing the operation of a garbage collection algorithm in the CAS.

FIG. 14 is an example of garbage collection using temporal relationships in certain embodiments. A depth-first search is made, represented by arrows 1402, of a data structure containing temporal relationships. Take a starting node 1404 from which to begin the tree traversal. Node 1404 is the tree root and references no objects. Node 1406 contains references to objects $H_1$ and $H_2$, denoting a hash value for object 1 and a hash value for object 2. All depth-0, depth-1 and higher data objects that are referenced by node 1406, here $H_1$ and $H_2$, are enumerated and marked as referenced.

Next, node 1408 is processed. As it shares an edge with node 1406, which has been marked, the difference engine is applied to the difference between the object referenced by 1406 and the object referenced by 1408, obtaining a set of depth-0, depth-1 and higher hashes that exist in the unmarked object but not in the marked object. In the figure, the hash that exists in node 1408 but not in node 1406 is $H_3$, so $H_3$ is marked as referenced. This procedure is continued until all edges are exhausted.

A comparison of the results produced by a prior art algorithm 1418 and the present embodiment 1420 shows that when node 1408 is processed by the prior art algorithm, previously-seen hashes $H_1$ and $H_2$ are emitted into the output stream along with new hash $H_3$. Present embodiment 1420 does not emit previously seen hashes into the output stream, resulting in only new hashes $H_3$, $H_4$, $H_5$, $H_6$, $H_7$ being emitted into the output stream, with a corresponding improvement in performance. Note that this method does not guarantee that data will not be marked more than once. For example, if hash value $H_4$ occurs independently in node 1416, it will be independently marked a second time.

Copy an Object into the CAS

Figure 15:
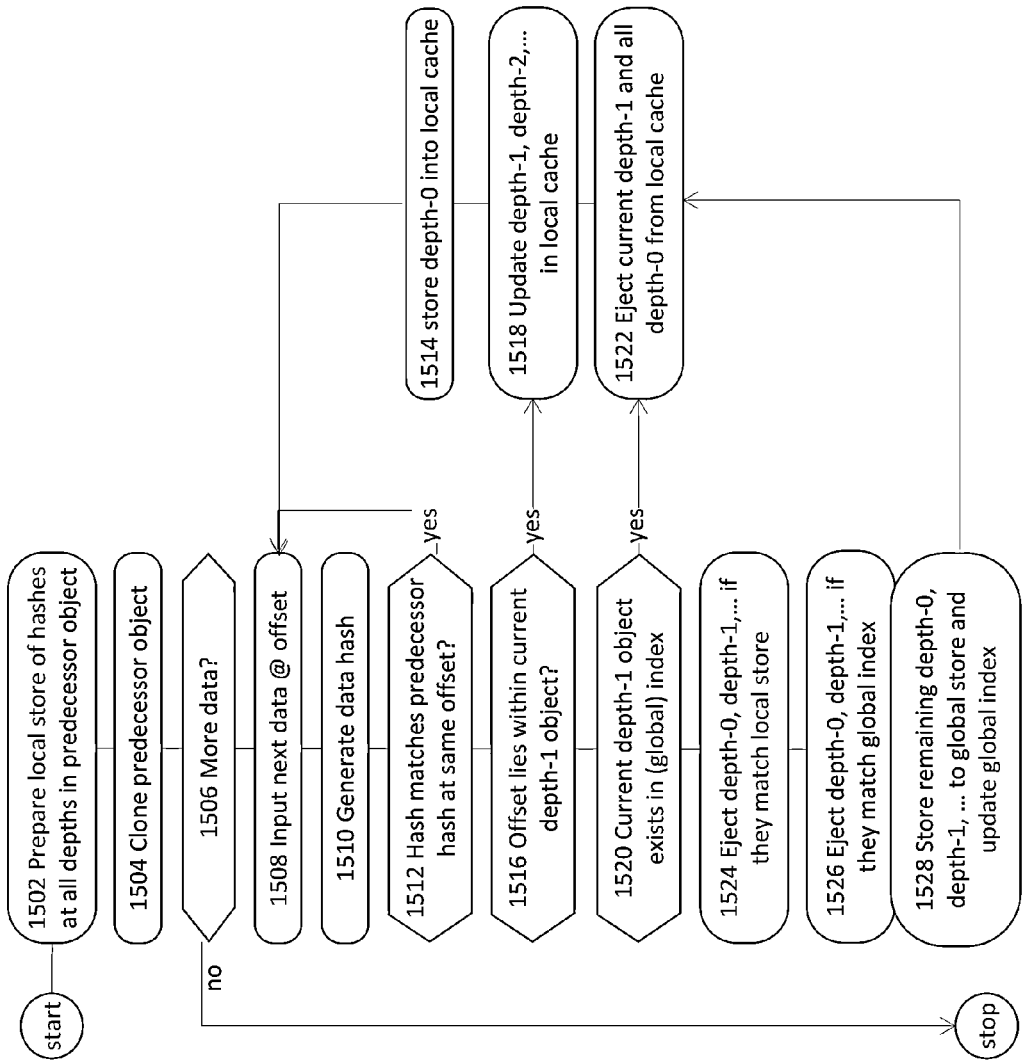
FIG. 15 is a flowchart for the operation of copying an object into the CAS.

Copying an object from another pool into the CAS uses the software modules described in FIG. 11 to produce a data structure referenced by an object handle as in FIG. 12. The input to the process is (a) a sequence of chunks of data at specified offsets, sized appropriately for making depth-0 handles, and optionally (b) a previous version of the same object. Implicitly, the new object will be identical to the previous version except where the input data is provided and itself differs from the previous version. The algorithm for the copy-in operation is illustrated in a flowchart at FIG. 15.

If a previous version (b) is provided, then the sequence (a) may be a sparse set of changes from (b). In the case that the object to be copied and is known to differ from a previous object at only a few points, this can greatly reduce the amount of data that needs to be copied in, and therefore reduce the computation and i/o activity required. This is the case, for example, when the object is to be copied in via the optimal way for data backup described previously.

Even if the sequence (a) includes sections that are largely unchanged from a predecessor, identifying the predecessor (b) allows the copy-in procedure to do quick checks as to whether the data has indeed changed and therefore to avoid data duplication at a finer level of granularity than might be possible for the difference engine in some other storage pool providing input to a CAS.

Implicitly then, the new object will be identical to the previous version except where the input data is provided and itself differs from the previous version. The algorithm for the copy-in operation is illustrated in a flowchart at FIG. 15.

The process starts at step 1500 as an arbitrarily-sized data object in the temporal store is provided, and proceeds to 1502, which enumerates any and all hashes (depth-0 through the highest level) referenced by the hash value in the predecessor object, if such is provided. This will be used as a quick check to avoid storing data that is already contained in the predecessor.

At step 1504, if a predecessor is input, create a reference to a clone of it in the content-addressable data store temporal data structure. This clone will be updated to become the new object. Thus the new object will become a copy of the predecessor modified by the differences copied into the CAS from the copying source pool.

At steps 1506, 1508, the Data Mover 502 pushes the data into the CAS. The data is accompanied by an object reference and an offset, which is the target location for the data. The data may be sparse, as only the differences from the predecessor need to be moved into the new object. At this point the incoming data is broken into depth-0 chunks sized small enough that each can be represented by a single depth-0 hash.

At step 1510, the data hash module generates a hash for each depth-0 chunk.

At step 1512, read the predecessor hash at the same offset. If the hash of the data matches the hash of the predecessor at the same offset, then no data needs to be stored and the depth-1 and higher objects do not need to be updated for this depth-0 chunk. In this case, return to accept the next depth-0 chunk of data. This achieves temporal deduplication without having to do expensive global lookups. Even though the source system is ideally sending only the differences from the data that has previously been stored in the CAS, this check may be necessary if the source system is performing differencing at a different level of granularity, or if the data is marked as changed but has been changed back to its previously-stored value. Differencing may be performed at a different level of granularity if, for example, the source system is a snapshot pool which creates deltas on a 32 KiB boundary and the CAS store creates hashes on 4 KiB chunks.

If a match is not found, the data may be hashed and stored. Data is written starting at the provided offset and ending once the new data has been exhausted. Once the data has been stored, at step 1516, if the offset is still contained within the same depth-1 object, then depth-1, depth-2 and all higher objects 1518 are updated, generating new hashes at each level, and the depth-0, depth-1 and all higher objects are stored at step 1514 to a local cache.

However, at step 1520, if the amount of data to be stored exceeds the depth-1 chunk size and the offset is to be contained in a new depth-1 object, the current depth-1 must be flushed to the store, unless it is determined to be stored there already. First look it up in the global index 1116. If it is found there, remove the depth-1 and all associated depth-0 objects from the local cache and proceed with the new chunk 1522.

At step 1524, as a quick check to avoid visiting the global index, for each depth-0, depth-1 and higher object in the local cache, lookup its hash in the local store established in 1502. Discard any that match.

At step 1526, for each depth-0, depth-1 and higher object in the local cache, lookup its hash in the global index 1116. Discard any that match. This ensures that data is deduplicated globally.

At step 1528: store all remaining content from the local cache into the persistent store, then continue to process the new chunk.

Reading an object out of the CAS is a simpler process and is common across many implementations of CAS. The handle for the object is mapped to a persistent data object via the global index, and the offset required is read from within this persistent data. In some cases it may be necessary to recurse through several depths in the object handle tree.

CAS Object Network Replication

As described under FIG. 11, the Replicator 1110 is a service to duplicate data objects between two different content addressable stores. The process of replication could be achieved through reading out of one store and writing back into another, but this architecture allows more efficient replication over a limited bandwidth connection such as a local- or wide-area network.

A replicating system operating on each CAS store uses the difference engine service described above together with the temporal relationship structure as described in FIG. 13, and additionally stores on a per-object basis in the temporal data structure used by the CAS store a record of what remote store the object has been replicated to. This provides definitive knowledge of object presence at a certain data store.

Using the temporal data structure, it is possible for the system to determine which objects exist on which data stores. This information is leveraged by the Data Mover and Difference Engine to determine a minimal subset of data to be sent over the network during a copy operation to bring a target data store up to date. For example, if data object O has been copied at time T3 from a server in Boston to a remote server in Seattle, Protection Catalog Store 908 will store that object O at time T3 exists both in Boston and Seattle. At time T5, during a subsequent copy from Boston to Seattle, the temporal data structure will be consulted to determine the previous state of object O in Seattle that should be used for differencing on the source server in Boston. The Boston server will then take the difference of T5 and T3, and send that difference to the Seattle server.

The process to replicate an object A is then as follows: Identify an object A0 that is recorded as having already been replicated to the target store and a near neighbor of A in the local store. If no such object A0 exists then send A to the remote store and record it locally as having been sent. To send a local object to the remote store, a typical method as embodied here is: send all the hashes and offsets of data chunks within the object; query the remote store as to which hashes represent data that is not present remotely; send the required data to the remote store (sending the data and hashes is implemented in this embodiment by encapsulating them in a TCP data stream).

Conversely, if A0 is identified, then run the difference engine to identify data chunks that are in A but not in A0. This should be a superset of the data that needs to be sent to the remote store. Send hashes and offsets for chunks that are in A but not in A0. Query the remote store as to which hashes represent data that is not present remotely; send the required data to the remote store.

Sample Deployment Architecture

Figure 16:
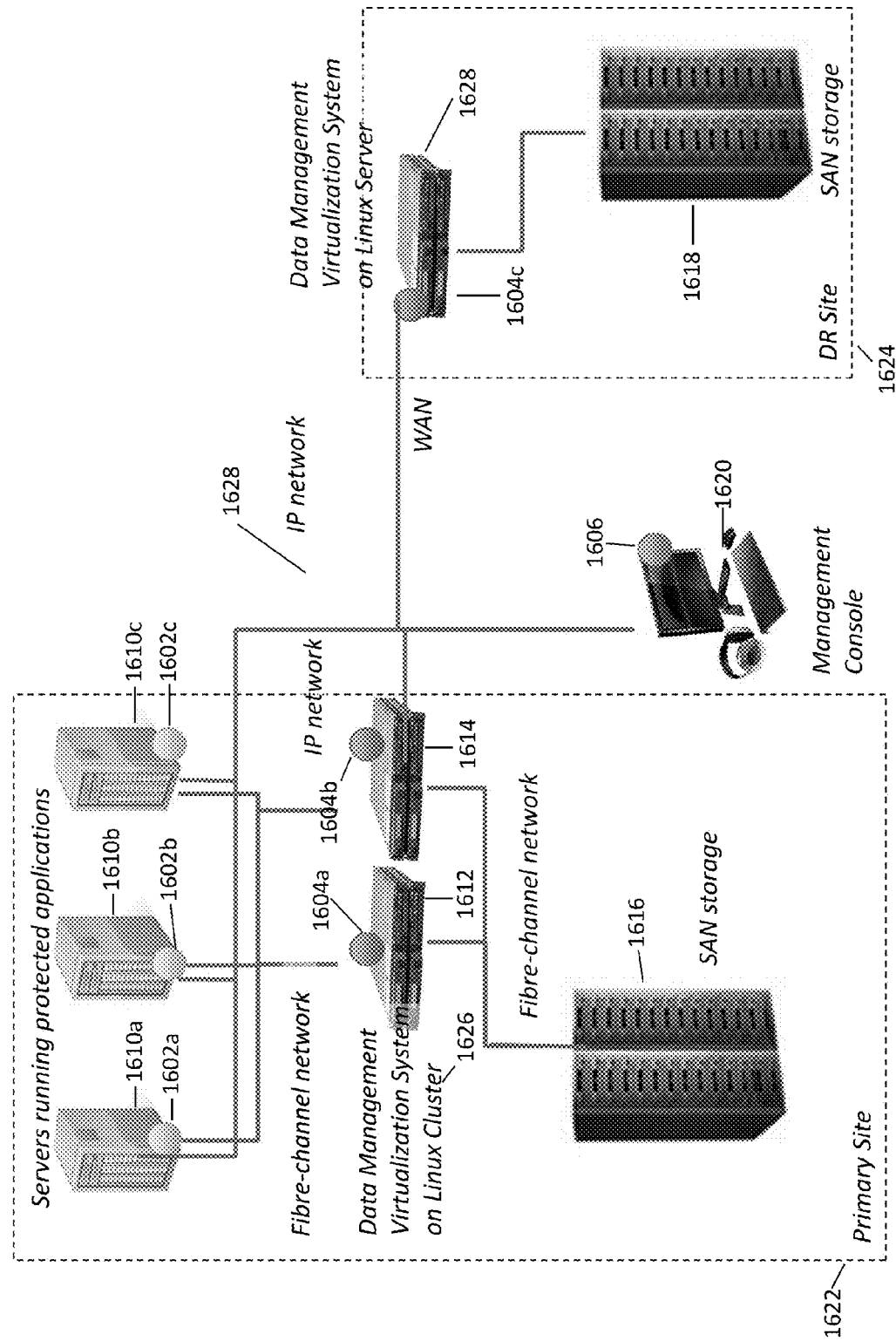
FIG. 16 is a system diagram of a typical deployment of the Data Management Virtualization system.

FIG. 16 shows the software and hardware components that comprise one embodiment of the Data Management Virtualization (DMV) system. The software that comprises the system executes as three distributed components:

The Host Agent software 1602*a*, 1602*b*, 1602*c* implements some of the application-specific module described above. It executes on the same servers 1610*a*, 1610*b*, 1610*c* as the application whose data is under management.

The DMV server software 1604*a*, 1604*b* implements the remainder of the system as described here. It runs on a set of Linux servers 1612, 1614 that also provide highly available virtualized storage services.

The system is controlled by Management Client software 1606 that runs on a desktop or laptop computer 1620.

These software components communicate with one another via network connections over an IP network 1628. Data Management Virtualization systems communicate with one another between primary site 1622 and data replication (DR) site 1624 over an IP network such as a public internet backbone.

The DMV systems at primary and DR sites access one or more SAN storage systems 1616, 1618 via a fibre-channel network 1626. The servers running primary applications access the storage virtualized by the DMV systems access the storage via fibre-channel over the fibre-channel network, or iSCSI over the IP network. The DMV system at the remote DR site runs a parallel instance of DMV server software 1604*c* on Linux server 1628. Linux server 1628 may also be an Amazon Web Services EC2 instance or other similar cloud computational resource.

VSS Requestor and VSS Provider in a Single Process Space

VSS (Volume Shadow Copy Service) is a framework that exists on versions of Microsoft Windows operating systems since 2003. This framework facilitates the cooperation among backup products, applications and storage components to create application-consistent backups. However, the VSS framework anticipates that each component will perform specific task independently, which can lead to unnecessary inefficiencies and overhead, as will be explained further below.

Figure 17:
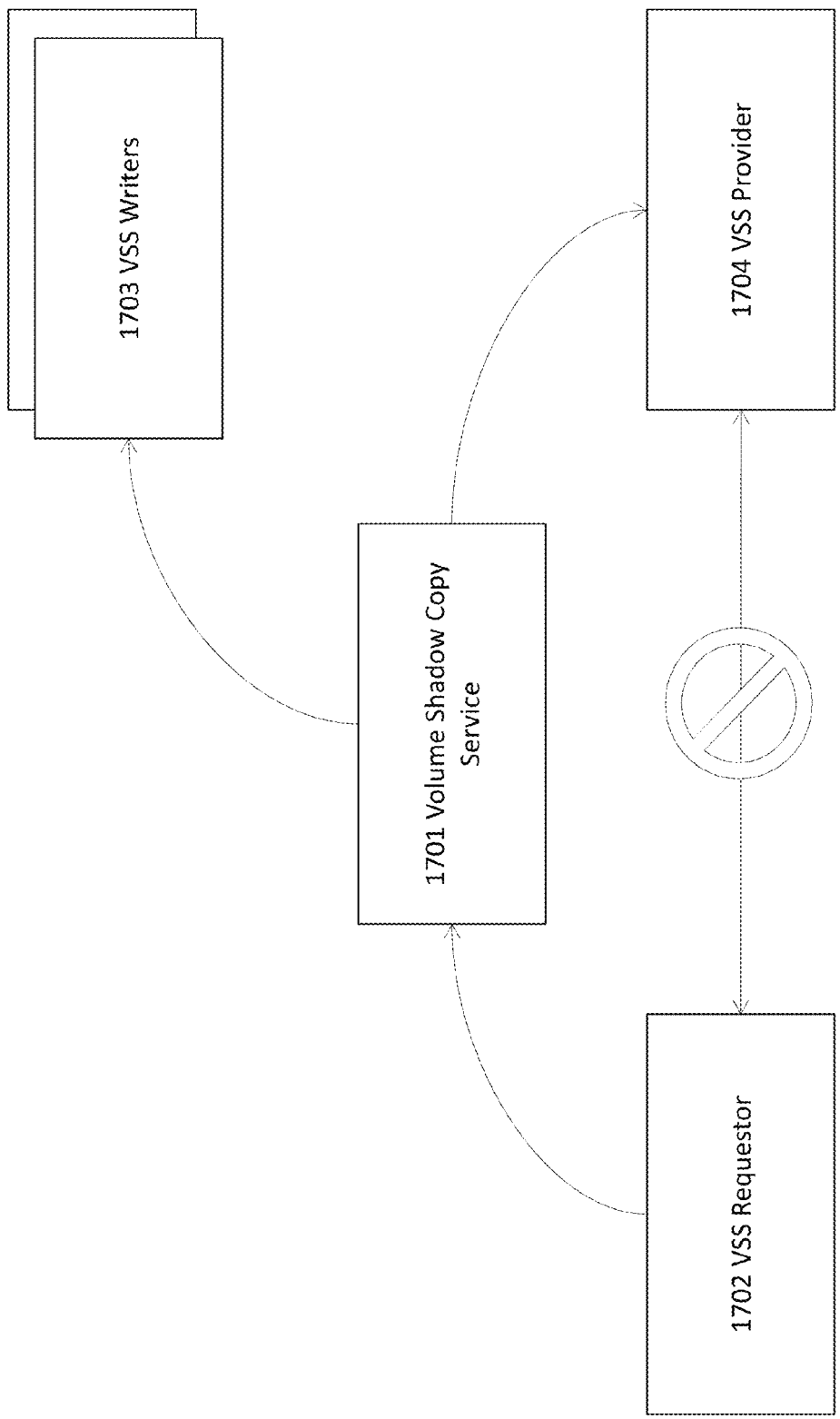
FIG. 17 is a schematic diagram of the VSS framework on a Microsoft Windows operating system in the prior art.

FIG. 17 is a schematic diagram of the VSS framework on a Microsoft Windows operating system. The VSS framework includes the Volume Shadow Copy Service 1701, the VSS requestor 1702, the VSS writers 1703, and the VSS provider 1704.

The Volume Shadow Copy Service 1701 coordinates communication between various VSS Framework components such as the VSS Requestor 1702, the VSS Writer 1703 and the VSS Provider 1704 and enables creation of application consistent snapshot. The Volume Shadow Copy Service Service 1701 is, for example, part of Microsoft Windows Operating System and is provided by Microsoft. The Volume Shadow Copy Service 1701 provides the system infrastructure for running VSS applications on Windows-based systems. The Volume Shadow Copy Service 1701 can be largely transparent to the user and developer. In some embodiments, the Volume Shadow Copy Service 1701 is configured to perform a number of different tasks, such as coordinating activities of providers (e.g., VSS Provider 1704), writers (e.g., VSS Writer 1703), and requesters (e.g., VSS Requestor 1702) in the creation and use of shadow copies (e.g., shadow copies are a snapshot of a volume that duplicates all of the data that is held on that volume at one well-defined instant in time); furnish the default system provider; and implement low-level driver functionality necessary for any provider to work Backup vendors develop VSS Requestor 1702. The VSS Requestor is a backup program or agent that may initiate backup operations. Typically, VSS Requestors are installed on the system that needs to be backed up and run as a separate process. A VSS Requester can be any application that uses the VSS API (e.g., the IVssBackupComponents interface) to request the services of the Volume Shadow Copy Service 1701 to create and manage shadow copies and shadow copy sets of one or more volumes. An illustrative example of a requester is a VSS-aware backup/restore application, which uses shadow-copied data as a stable source for its backup operations.

Applications developed by Microsoft and other vendors (e.g., SQL, Oracle, Microsoft Exchange applications) come with VSS Writers 1703 that are specific to the product that have the ability to freeze the application and make the application store on disk self-consistent and recoverable. Each VSS writer is built specifically for an application and is typically installed along with the application. For example, SQL Server VSS Writer coordinates I/O operations with VSS Service for SQL Server. The VSS writer freezes and thaws application I/O operations when requested by the VSS Service to allow VSS Providers to capture application consistent snapshot of the application data store. If no writers are present during a VSS backup operation, a shadow copy can still be created.

Storage technology vendors develop VSS Provider 1704, which is capable of capturing the state of the self-consistent image of the application at the moment the application is frozen by the VSS Requestor 1702, so that application can resume normal operation. The VSS Provider 1704 takes some sort of snapshot, e.g. either within the software on the system, or using hardware and/or software external to the system. The VSS Provider is installed on the system where application runs and typically runs as an independent process. As an illustrative example, in response to a request from a requester, a provider generates events to signal applications of a coming shadow copy, and then creates and maintains that copy until it is no longer needed. While a shadow copy is in existence, the provider can create an environment where there are effectively two independent copies of any volume that has been shadow copied: one the running disk being used and updated as normal, the other a copy that is disk fixed and stable for backup. A default provider can be supplied as part of the Windows operating system.

In the conventional use of the VSS Framework, the Requestor and Provider are independent processes, and do not communicate with each other directly. They are designed to be general purpose, and operate with other Providers and Requestors respectively. When a VSS requestor makes a request to the VSS service, the VSS service blocks the VSS requestor thread until it receives a response from the VSS provider. Further the VSS framework does not provide the VSS writer with any context about the VSS requestor that caused the VSS service to invoke the VSS provider.

The VSS application programming interface contains no means for the VSS Requestor and VSS Provider to communicate with each other, other than for the Requestor to learn of the existence of various Providers and to select one of them. All VSS Requestor and Provider actions are coordinated by VSS Service.

The techniques described herein provide for a VSS requestor and VSS provider that are implemented as separate threads as part of the same program. Therefore, for example, when the VSS service blocks the VSS requestor thread that called API to create snapshot, the VSS provider is still executing as part of the same program and can therefore use intra-process communication means to communicate with the VSS requestor. For example, the VSS provider can determine what is to be created (e.g., what kind of copy, for which program, etc.), how much storage space to use, where the storage space is to be allocated from, and/or other information that is not otherwise available to a VSS provider. In some examples, the mechanism used for communication between the VSS requester and the VSS provider is a callback handler, which provides for intra-process communication. For example, the VSS Provider communicates with the VSS Requestor using the callback handler and notifies the VSS Requestor when specific events occur such as Snapshot Commit Event.

The VSS provider can also be created as a stealth provider so that it does not show up as a provider for other VSS requestors. For example, the VSS Requestor can register the custom VSS Provider with the VSS framework when it starts a backup operation using VSS framework API and unregister the VSS Provider once the backup operation is complete. This can make the VSS Provider available on the system only during the backup operation.

There are benefits that can be realized by having the Requestor and Provider communicate with each other. For example, the Requestor can prime the Provider with configuration information from the backup job that it is about to run, which may be used by the Provider to choose the resource pool or other parameters in the creation of the snapshot. Other examples of functionality that may require communications messages include the coordination of snapshots across multiple hosts, the signaling at the exact moment of consistency to the external backup server, or many other use cases.

In the present disclosure, approaches are presented for communication between the Requestor and Provider and realize the benefits discussed above.

Figure 18A:
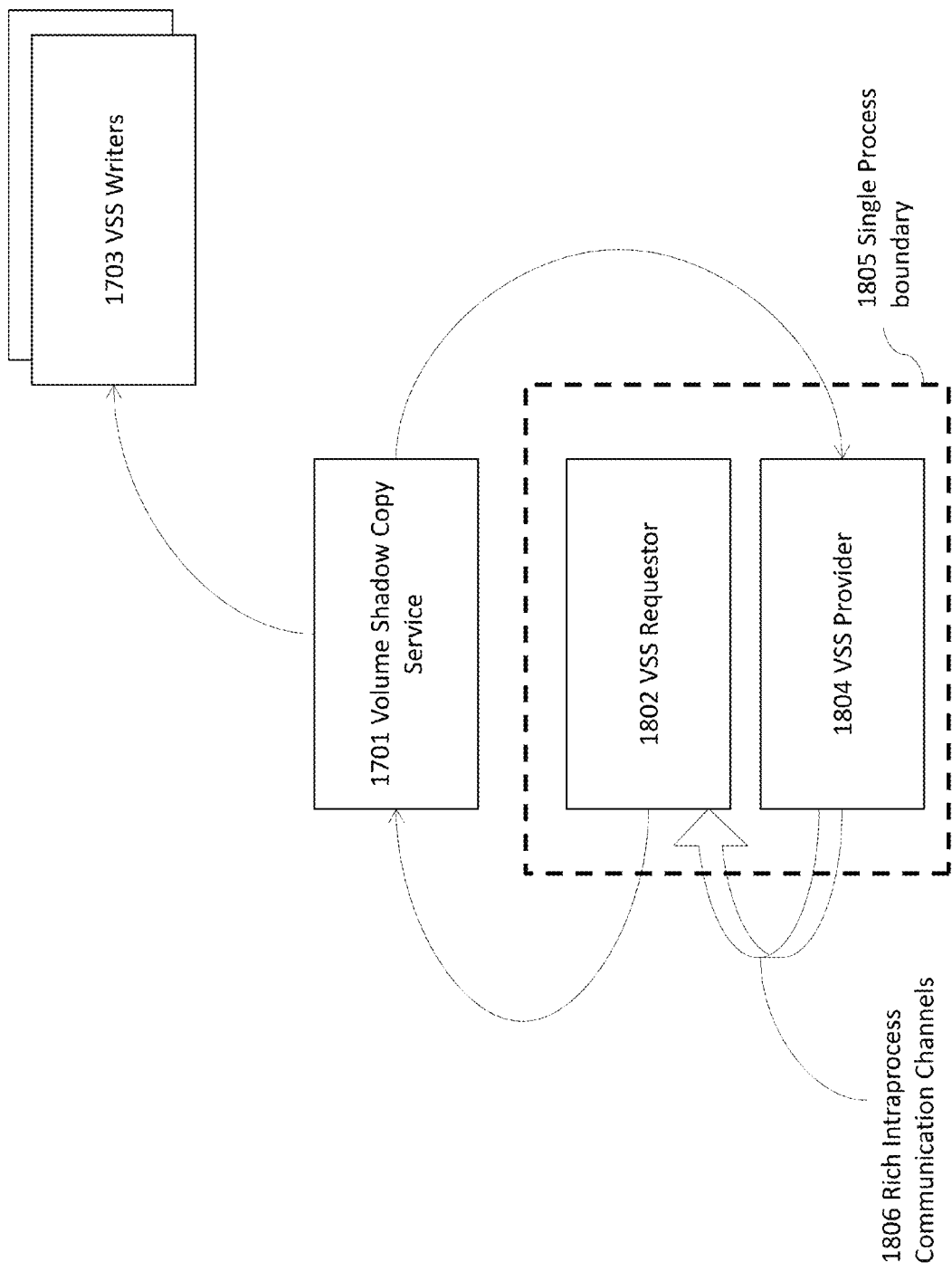
FIG. 18A illustrates a combined VSS requestor and VSS provider, in accordance with some embodiments.

FIG. 18A illustrates a combined VSS requestor and VSS provider, in accordance with some embodiments. As shown in FIG. 17, there is the Volume Shadow Copy Service 1701, and the VSS Writers 1703. In this embodiment, the VSS Requestor 1802 and the VSS Provider 1804 have been linked together as separate sets of threads in the same single process space 1805. This enables the Requestor and the Provider to use one or more of several intra-process communication channels 1806, such as global memory, pointer passing or thread signaling to synchronize and exchange information between the Requestor and Provider threads.

The custom VSS Provider 1804 can be a software or hardware snapshot provider. It can implement COM interfaces such as IVssSoftwareSnapshotProvider, IVssProviderCreateSnapshotSet, etc. prescribed by VSS framework. VSS Service 1701 invokes the custom VSS Provider using these interfaces. In addition, the VSS Provider 1804 is made aware of the presence of VSS Requestor 1802 by registering a callback handler with the VSS Provider 1804. The callback handler is registered by the VSS Requestor 1802 and it acts as a communication channel between the VSS Requestor 1802 and the VSS Provider 1804. The VSS Provider notifies the VSS Requestor when certain events occur using the callback handler.

The VSS Requestor 1802 invokes VSS framework functionality using VSS Framework API such as IVssBackupComponents interface. The VSS Requestor 1802 registers a callback handler with the custom VSS Provider to receive notifications from the Provider and processes callback notification messages received from the Provider.

This embodiment does not preclude the Requestor or the Provider from functioning in their conventional roles. It enables additional functionality that can provide more efficient and effective solutions to data protection and data recovery problems.

Figure 18B:
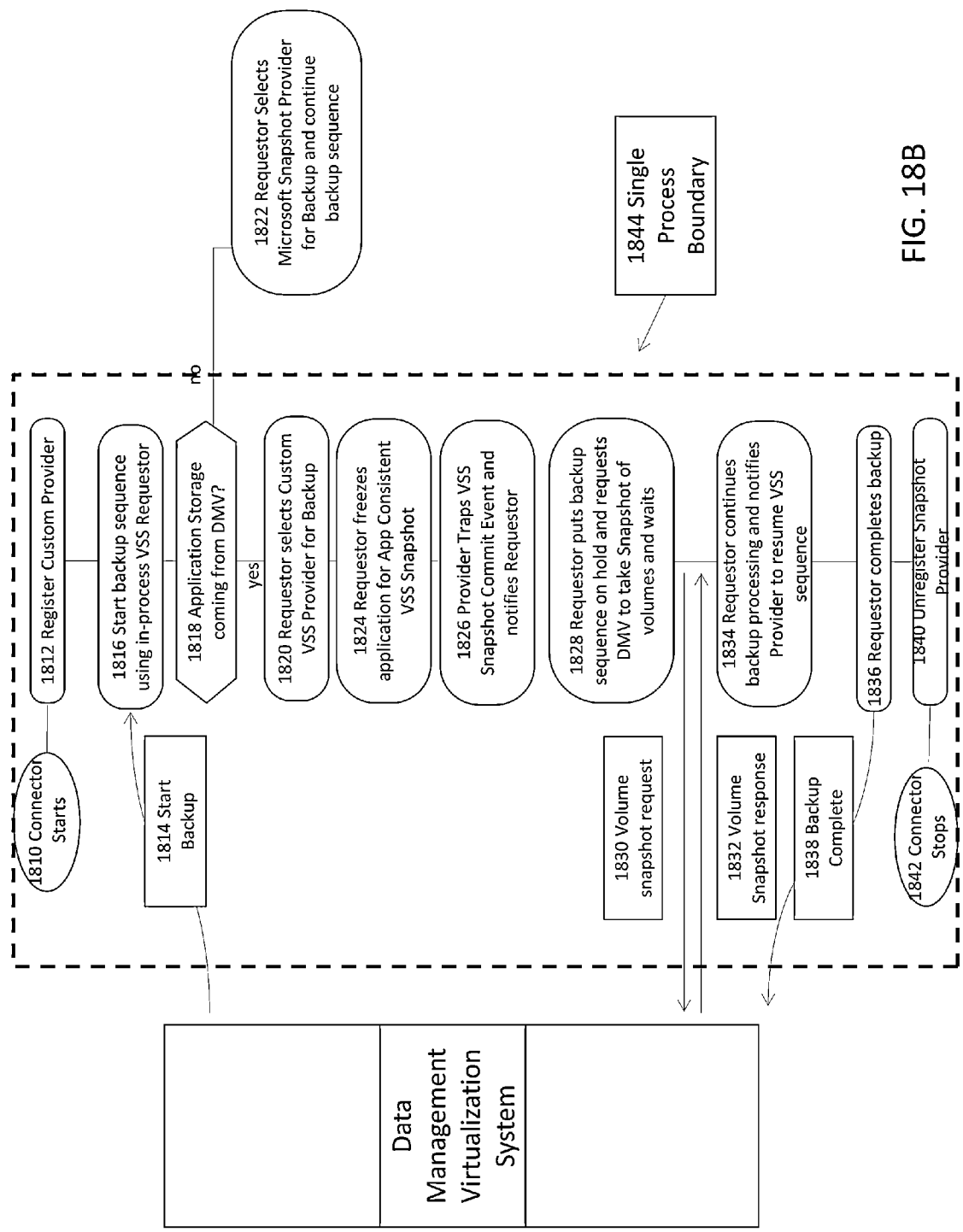
FIG. 18B illustrates an exemplary data flow for a combined VSS requestor and VSS provider, in accordance with some embodiments.

FIG. 18B illustrates an intra-process communication scheme between the VSS Requestor 1802 and the VSS Provider 1804 during an exemplary backup sequence. In this illustration, a single Connector process 1844 hosts both the VSS Provider and VSS Requestor. Connector 1844 is a backup program developed by backup vendor for backing up applications. It runs as a single process and all the resources consumed by the VSS Requestor and VSS Provider are owned by that process.

At step 1812, the Connector registers the custom VSS Provider 1804 with VSS framework when the connector starts running at step 1810. The connector starts listening for backup requests once it is fully up and running.

At step 1814, once a request to backup an application is received from the data management virtualization system, the connector starts the backup sequence at step 1816 using the VSS Requestor 1802. At step 1816, the VSS Requestor 1802 checks if the application is running and available for backup and the writer for the each of the application being backed up is in healthy state At step 1818, if the storage used by the application is exported from the Data Management Virtualization System ("DMV"), the VSS Requestor 1802 selects the custom VSS Provider 1804 for backup sequence 1820, primes the VSS Provider 1804 with application specific information and registers a callback handler with the VSS Provider. For example, the VSS Requestor 1802 can select the VSS provider using the VSS API (e.g., IVssBackupComponents::AddToSnapshotSet). The determination to use the custom VSS Provider is made by comparing the LUN (Logical Unit Number) id of storage volume used the application with the LUN id of volumes exported by DMV.

For each application that needs to be backed up, the VSS Requestor 1802 selects the volumes used by that application's data store for VSS snapshot. After selecting volumes for snapshot, the VSS Requestor 1802 requests creation of snapshot (e.g., by using the IVssBackupComponents interface) at step 1824. The request to create a snapshot is made using a separate thread, as the VSS Service will block the calling thread until the snapshot either succeeds or fails. This allows the VSS Requestor 1802 to continue to receive callback messages using the callback handler previously registered from the VSS Provider 1804 while the snapshot creation is still in progress. As part of snapshot creation, the VSS Service 1701 requests VSS Writer 1803 to freeze the applications that are being backed up. Once the applications are frozen, the VSS Service 1701 requests the VSS Provider 1804 to create snapshot of volumes used by application. In response to the request to create snapshot, the VSS Provider notifies the VSS Requestor 1802 using a previously registered callback handler that VSS framework is ready for creating snapshot and suspends itself at step 1826.

Upon receiving notification from the VSS Provider at step 1826, the VSS Requestor 1802 requests the DMV to create a snapshot of volume used by the application data store and waits for response at step 1828. DMV then creates a copy-on-write snapshot of requested volumes at step 1830 and responds to the VSS Requestor 1802 with the status of request at step 1832. After the snapshot is successfully created, the VSS Requestor 1802 notifies the VSS Provider 1804 to resume VSS processing so that application can resume normal processing at step 1834. For example, the application is un-frozen by the VSS Service after the snapshot creation is completed successfully or when the snapshot creation fails.

It is required for the entire processing between step 1824 and step 1834 to be completed within a certain timeframe (e.g., 10 seconds) otherwise the VSS Writer 1803 rejects the application freeze requests. Having both the VSS Requestor and the VSS Provider within the same process can reduce the communication overheads associated with inter-process communication and helps complete snapshot processing within the time interval.

VSS Requestor 1802 completes the backup at step 1836 and notifies the DMV the status of backup request at step 1838.

The Connector unregisters the VSS Provider 1804 at step 1840, and the Connector stops running at step 1842.

In some embodiments, the Requestor and Provider are not within the same process space. For example, the Requestor and Provider can be multi-threaded within their own process spaces, and communicate with each other through a side channel using an inter-process communications channel such as shared memory, sockets or even disk based files.

SmartCopy Protection for Out-of-Band Data

This disclosure describes an extension to the Virtual Data Pipeline (VDP) technology to cover protection of data that is on internal or networked drives. Out-of-band (OOB) refers to the fact that the storage is not presented to the host by the VDP system. For example, the out-of-band storage can be storage that cannot be physically accessed by the VDP system, such as a local drive (e.g., "C" drive) of a desktop/laptop or network storage provided from a private network. The storage is visible to the host through some other path, not provided for use by the VDP system in a way that the VDP system can directly access the storage. Such out-of-band storage can be, for example, data stored in a file system (e.g., a Window's file system, Linux file system, etc.).

Prior to this disclosure, there was no means to use the VDP technology, which is located from the host system to be backed up, to capture and protect data that resided on out-of-band drives that cannot be accessed directly by the VDP system, such as direct attached drives within a host system (e.g., within a laptop or a desktop), or Network attached storage served by an external File Server with its own storage (e.g., in a private network, such as a company network).

With the present disclosure, it becomes possible to protect the data with all of the benefits of the VDP system. Images are captured incrementally, and yet are available as virtual full images. The data is temporally organized, making it easier to capture time ordered dependencies and to derive benefits in smaller storage space, more effective deduplication and more efficient data management. The virtual full images also enable easy presentation to hosts without a need to layer incremental upon incremental upon full, reducing the time to restore or clone, and enabling the mount capability.

The data can be protected using a smart copy agent that executes on the host to be protected. The smart copy agent can be presented with storage from the VDP system and use the presented storage to copy the data that is only visible to the host. For subsequent copies after the first copy, the smart copy agent can copy only the new data that has changed since the last copy. For example, the smart copy agent can compares the data with the copy to update only data that has changed. For example, rather than using timestamps, the smart copy agent can walk the file structure to see if there are any new files, if any of the metadata for a file has changed (e.g., which indicates the file has been modified since the last copy), or if any files were deleted since the last copy.

Figure 19A:
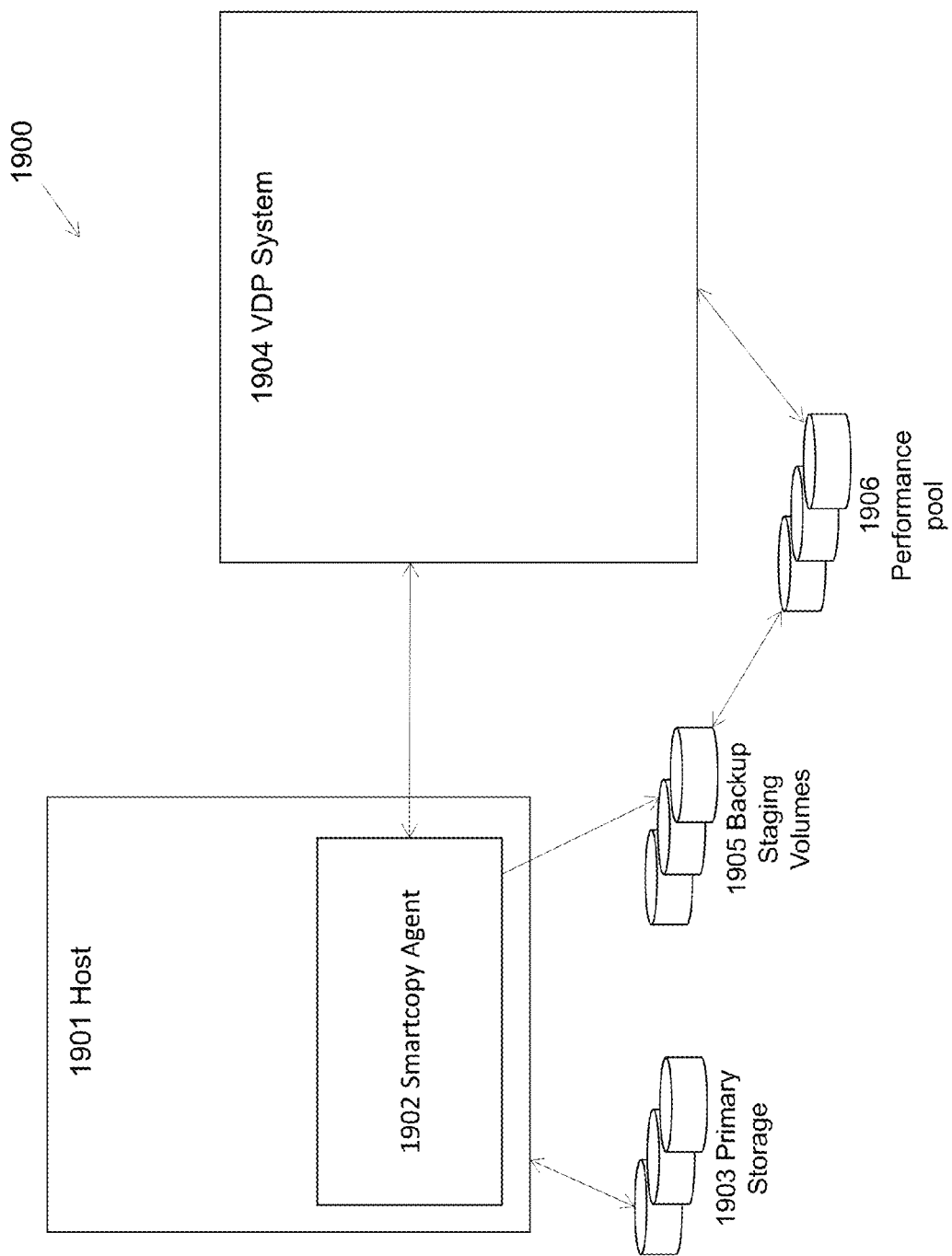
FIG. 19A is a schematic diagram of a system providing out-of-band protection, in accordance with some embodiments.

FIG. 19A is a schematic diagram of a system 1900 providing out-of-band protection, in accordance with some embodiments. The system 1900 includes the host 1901, which runs the Smartcopy agent 1902. The smartcopy agent 1902 is a process that runs in the background on the host 1901, which is described in further detail herein. The system 1900 also includes primary database storage 1903 in communication with the Host 1901, which cannot be directly accessed by the VDP system 1904. The data to be protected lives on direct attached or out-of-band or networked attached storage 1903. The Smartcopy agent 1902 is in communication with the VDP system 1904. The VDP system 1904 is in communication with performance pool 1906, which is directly accessible to the VDP system 1904. The system 1900 also includes backup staging volumes 1905 (e.g., also referred to herein as a "staging disk") that are allocated from the performance pool 1906 such that the performance pool 1906 is in communication with the host 1901, the Smartcopy agent 1902, and the performance pool 1906.

Referring to the host 1901, this can be, for example, a computer or virtual machine running a Microsoft Windows, Linux, AIX, Solaris, or HP-UX operating system that is supported by Smartcopy agent 1902. The host 1901 can be connected to the VDP 1904 via a network connection (e.g., and optionally via fibre channel).

Referring to the Smartcopy agent 1902, this can be, for example, the smartcopy program executable for the specific operating system running on host 1901. This program can be installed on the host using standard package installation procedures for the specific operating system. For example, on Windows the user runs a setup program that installs the Smartcopy agent to run as a service. As another example, on a Linux host the user installs an RPM package that installs the Smartcopy agent as a daemon process. In some embodiments, the Smartcopy agent runs continually in the background and communicates with the VDP system using TCP/IP.

Referring to the Primary Storage 1903, this can be, for example, a disk system that is usable by host 1901, such as an installed SATA, SCSI, or SAS hard disk, or a SAN-provided disk that is attached by fibre channel or other high-speed disk interconnects, such as a NetApp or EMC SAN device. Protected host 1901 uses the primary storage 1903 to read and write files on a file system.

Referring to the VDP System 1904, this can be, for example, the VDP system described herein.

Referring to the Backup Staging Volumes 1905, this can be, for example, a virtual disk device that is provisioned from free space available in Performance pool 1906.

Referring to the Performance pool 1906, this can be, for example, a disk system that is attached to VDP system 1904 via fibre channel, such as a NetApp or EMC SAN device.

Figure 19B:
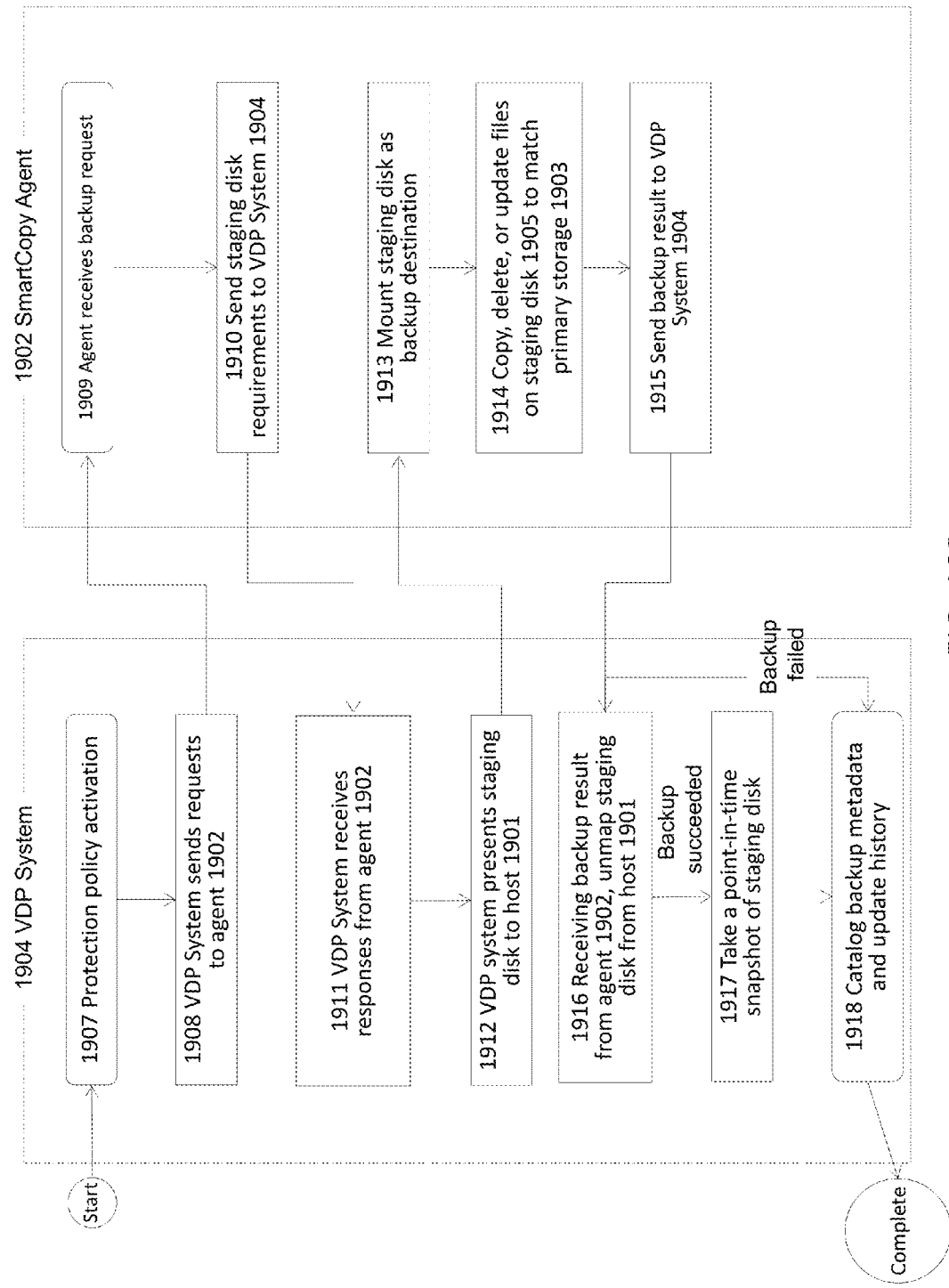
FIG. 19B is an exemplary computerized method for providing out-of-band protection, in accordance with some embodiments.

FIG. 19B describes message and data flows of a system providing out-of-band protection. The VDP system 1904 activates the protection policy 1907 (e.g., according to a SLA). In step 1908 the VDP system then sends a backup request to agent 1902. Smartcopy agent 1902 receives the backup request in step 1909. Smartcopy agent 1902 then sends a staging disk requirement request back to the VDP system in step 1910. VDP System 1904 receives the response from the Smartcopy agent 1902. VDP System 1904 then presents a staging disk to protected host 1902. Smartcopy agent 1902 mounts the presented staging disk in step 1913. Smartcopy agent 1902 then copies, deletes, or updates files on staging disk 1905 so that the contents match primary storage 1903 in step 1914. In step 1915 Smartcopy agent 1902 sends the results of the backup to VDP System 1904. VDP System 1904 receives the backup results in step 1916 and unmaps the staging disk from protected host 1901. If the backup was successful, then VDP System 1904 takes a point-in-time snapshot of the staging disk 1905. VDP System 1904 then catalogs the backup metadata.

Referring to step 1907, this is a protection policy being activated. This can be started by, for example, a user manually running a protection policy, or it was run as part of a schedule defined for the protection policy. This protection policy can be previously created by a user to protect a specific piece of data on the protected host 1901, in this case primary storage 1903.

Referring to step 1908, the VDP System 1904 sends a request, such as a string containing XML describing which volume should be backed up, to Smartcopy agent 1902.

Referring to step 1909, the Smartcopy agent 1902 receives the request, for example a string containing XML describing which volume to be backed up. The volume to be backed up is identified using operating system specific names. For example, on Windows the volume can be referred to as C:, D:, E:, etc. On Linux the volume can be referred to as /,/usr, /mnt/volume1, etc. If sent using XML, for example, the XML can also contain any other data required to back up the volume, such as credentials for authenticating on the host, options specified by the user to control other backup features. A job identifier can also be included in the XML so that the job can be tracked by the VDP. This XML is parsed and the results are used in step 1910.

Referring to step 1910, the Smartcopy agent 1902 calculates the size of the staging disk that is required for this backup. For example, if the request is to back up a volume that is 40 gigabytes in size, it will determine that the staging disk must be at least 40 gigabytes in size as well. This requirement is sent to the VDP System 1904 as a string containing XML describing the requirement.

Referring to step 1911, the VDP System 1904 receives the response containing the required size for the staging disk (e.g., the XML response string). The VDP System finds any existing staging disk for the protection policy that is currently running. If the existing staging disk is at least as large as the required staging disk size, the existing staging disk can be used as the staging disk. If no existing staging disk was found (e.g. this is the first backup for this protection policy or previous staging disks have been expired) or the existing staging disk is smaller than the required size, a new staging disk can be allocated from the Performance Pool 1906. Once a staging disk has been allocated for a backup, that same staging disk can be used for all subsequent backups of the same protection policy, unless the size of the disk must be increased, in which case a larger staging disk is created and used for future backups. If a user expires all backups for a protection policy, the staging disk is deleted, and a new staging disk must be allocated for subsequent backups of the same protection policy. The point-in-time snapshots in step 1917 depend on the staging disk they were created from, but they are not used as staging disks, and changes to the staging disk do not affect the point-in-time snapshot, nor do changes to a point-in-time snapshot change the contents of the staging disk on which they depend.

Referring to step 1912, the VDP system 1904 presents the staging disk to the protected host 1901. This can be done for example, via iSCSI, or fibre channel if 1901 is a physical computer. For example, the staging disk can be presented using standard techniques for making a disk visible over iSCSI or fibre channel. The VDP System is the target and the protected host is the initiator using SCSI terminology. In some embodiments, if 1902 is a virtual machine, then the disk is first presented to the virtual machine hypervisor, such as VMware ESXi, and then the staging disk is added to the virtual machine 1901. In some embodiments, the VDP System sends an XML string to the Smartcopy agent containing the LUN identifier of the staging disk which is used in step 1913.

Referring to step 1913, the Smartcopy agent 1902 scans its storage bus to find the iSCSI or fibre channel disk for a physical machine. If 1901 is a virtual machine, the disk will appear as a SCSI disk presented by the hypervisor and the SCSI bus is scanned to find the staging disk. The Smartcopy agent continues to scan the bus until it finds a disk with the same LUN identifier that the VDP System sent in step 1912. Once the staging disk has been found on the storage bus, it is partitioned and formatted if the staging disk is not already formatted. The disk is formatted with a file system that is the same as primary storage 1903. If the primary storage 1903's file system cannot be determined or is not supported, the staging disk is formatted with the standard file system for the type of operating system that protected host 1901 runs. For example, Microsoft Windows systems can use NTFS and Linux can use ext3. The staging disk is then mounted at a mount point on the protected host 1901. For example, on a Linux system it can be mounted under a directory located at /act/mnt, and the specific directory can be named based on the current job identifier and time. As another example, on a Windows system, it can be mounted under a directory located at C:\Windows\act, and the specific directory can be named based on the current job identifier and time.

Referring to step 1914, the Smartcopy agent 1902 will copy any files or directories from the primary storage 1903 to the staging volume 1905 if the file exists on the primary storage and not on the staging volume. Any files or directories that do not exist on the primary storage but exist on the staging volume will be deleted from the staging volume. In some embodiments, any files or directories that have different content or metadata, such as timestamps, file attributes, or security descriptors, will be updated on the staging volume to match the primary storage. When this step is complete, the staging volume will be a replica of the primary storage. The only differences, if any, may be a result of filesystem incompatibilities or file system metadata that is specific to the disk, such as the volume identifier. The staging volume is unmounted from the host after the copying and deleting have completed.

Referring to step 1915, the result of the backup is sent from the Smartcopy agent 192 to the VDP System 1904. This is a string containing XML describing the results of the backup, such as whether or not it was successful, and if it was not successful, the error code describing the error that occurred.

Referring to step 1916, the VDP System 1904 receives the backup result, which is a string containing XML. This is parsed to determine if the backup was successful or not. The staging disk is then unmapped from the protected host 1901.

Referring to step 1917, this step is only reached if the result of step 1916 indicates that the backup was successful. A point-in-time snapshot of the staging disk is created using the VDP Systems' flashcopy feature. This snapshot of the staging disk is a virtual full copy of the filesystem on the staging disk and is stored in the Performance Pool 1906. It has the same characteristics of an in-band backup within the VDP System. These snapshots can be mounted as fully independent disks, they can be cloned, restored, duplicated for long-term storage, or transported across a WAN for disaster recovery and business continuity.

Referring to step 1918, the new point-in-time snapshot, if any, is cataloged as the most recent backup of the host filesystem. When the next time the same filesystem on the same protected host 1901 needs to be protected, the staging disk will be reused, substantially reducing the amount of data that must be copied by the Smartcopy agent in future backups.

Smart Copy for Database Backup

This disclosure describes extensions to the Virtual Data Pipeline (VDP) system to support protection and replication of database systems that are not otherwise accessible to the VDP system. For example, the extensions allow the VDP system protect a database that the VDP system cannot communicate with directly (e.g., the database is stored on a local drive of the system, or it is stored in network storage provided by a private network that is not accessible to the VDP system).

With the embodiment described in this disclosure, relational database systems (RDBMS) such as Oracle, SQL Server and Sybase can be protected and replicated with all of the benefits of the workflow of the Virtual Data Pipeline system. Data capture may be done efficiently and incrementally, and the backups may be virtual full backups, which can be mounted, cloned and restored quickly and efficiently.

Prior to this disclosure, there was no means to use the Virtual Data Pipeline (VDP) technology, which is located on a different host from the host system to be backed up, to capture and protect data that resided in relational databases on direct attached drives within a host system, or network attached storage served up by an external file server with its own storage. There is no way for the VDP system to communicate with such databases directly to manage the databases; the database is visible to the host through some other path.

With the present disclosure, it becomes possible to protect the database data with all of the benefits of the VDP system. Backup images are captured incrementally, and yet are available as virtual full images. The data is temporally organized, making it easier to capture time ordered dependencies and to derive benefits in smaller storage space, more effective deduplication and more efficient data management. The virtual full images also enable easy presentation to hosts without a need to layer incremental copies upon incremental copies upon full copies (and so on), reducing the time to restore or clone, and enabling the instant mount capability.

The data can be protected using a RDBMS agent that executes on the host to be protected. The RDBMS agent can be presented with storage from the VDP system and use the presented storage to copy the database, which is only visible to the host. The RDBMS agent can be configured to use a database copy tool such that the database copy can be loaded and used by a database system, even after subsequent incremental copies.

Figure 20A:
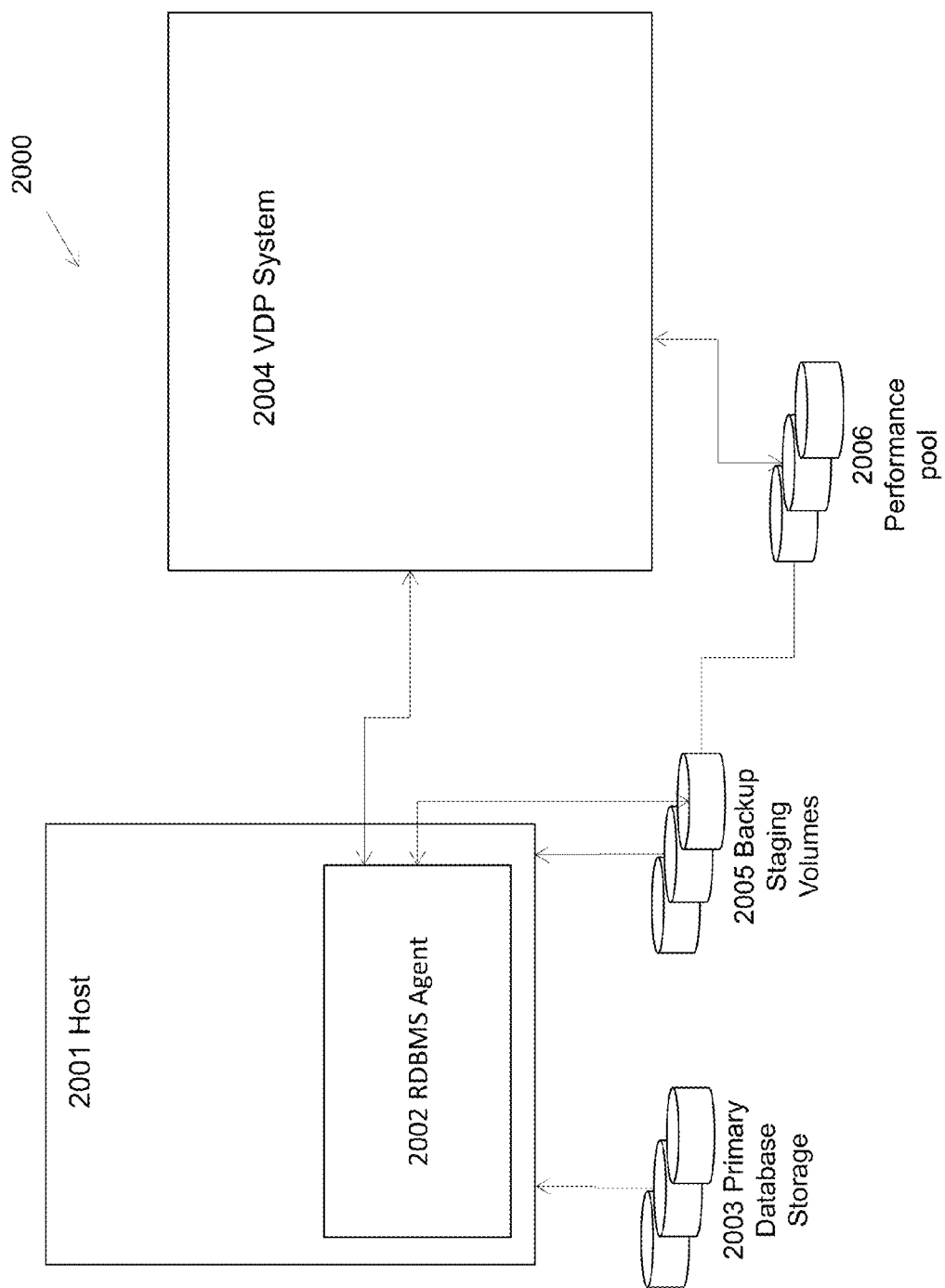
FIG. 20A is a schematic diagram for protection of a database in accordance with some embodiments.

FIG. 20A depicts a configuration 2000 for protection of a database in accordance with some embodiments. The configuration 2000 includes the host 2001, which runs the RDBMS-enabled agent 2002. The RDBMS agent 2002 is a process that runs in the background on the host 2001, which is described in further detail herein. The configuration 2000 also includes primary database storage 2003 mounted on the host 2001, which cannot be directly accessed by the VDP system 2004. The database data to be protected lives on direct attached or out-of-band or networked attached storage 2003. The RDBMS agent 2002 is in communication with the VDP system 2004. The VDP system 2004 is in communication with performance pool 2006, which is directly accessible to the VDP system 2004. The configuration 2000 also includes backup staging volumes 2005 that are mounted on the host 2001 during backup and allocated from the performance pool 2006, and in communication with the RDBMS agent 2002; the staging volumes are created out of the performance pool 2006.

The host 2001 is a server with running RDBMS, which is the actual database that needs backup protection. The RDBMS running on the host 2001 uses primary database storage which is considered Out-of-Band to the VDP System 2004. For example, an Oracle database runs on Linux server with database storage supplied from an array other than the performance pool 2006. This database server lives in a data center and serves as persistent data repository for various applications.

The RDBMS agent 2002 is a software component running on the host 2001. The RDBMS agent 2002 is deployed on the host 2001 and communicates with VDP System 2004, primary database storage 2003 and backup staging volumes 2005 during database backup. The RDBMS agent 2002 communicates with RDBMS and utilizes available conventional method for incremental forever methodology.

The primary database storage 2003 is data storage of RDBMS running on the host 2001. The primary database storage 2003 can either be locally attached disk drives or network attached storage consumed by RDBMS running on the host 2001.

The VDP system 2004 can be an embodiment of the Virtualization Data Protection system described herein.

The backup staging volumes 2005 is a backup destination provisioned out of the performance pool 2006 and managed by VDP system 2004. The backup staging volumes 2005 is mounted to the host 2001, thus allowing read and write operations to be performed. The RDBMS agent 2002 writes RDBMS backup artifacts onto the backup staging volume 2005.

The performance pool 2006 is a storage pool used by the VDP system 2004 to perform protection operations. Protection operation requests storage from the performance pool 2006 to be used for backups, for example the backup staging volume 2005 is provisioned out of the performance pool 2006 and mapped to the host 2001.

Figure 20B:
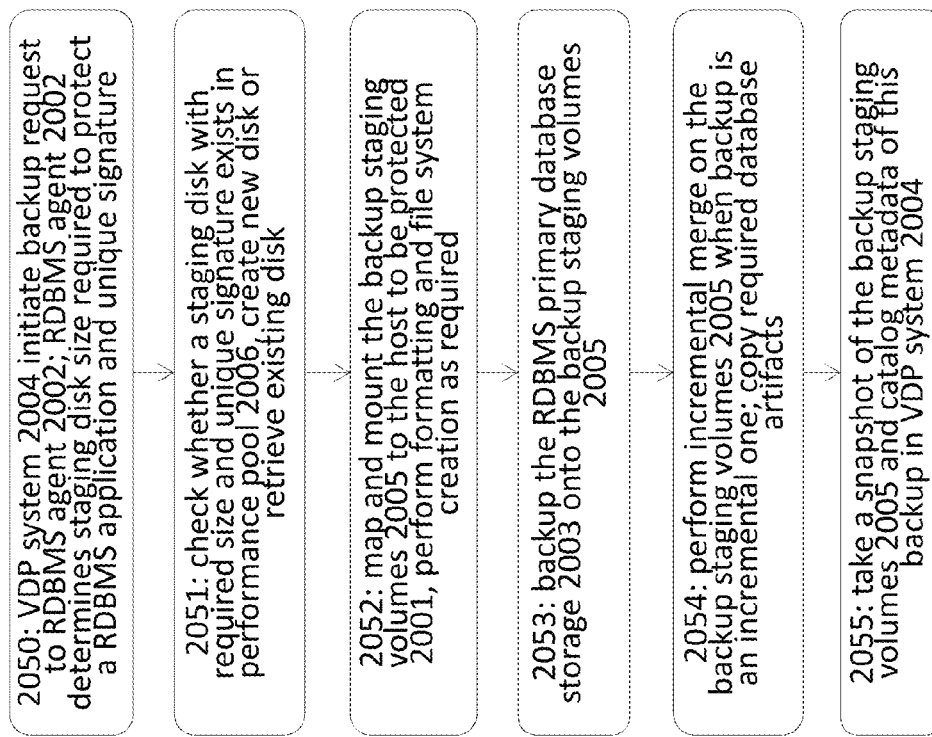
FIG. 20B depicts a computerized method for protection of a database in accordance with some embodiments.

FIG. 20B illustrates an exemplary process of configuring a database for use with the VDP system. At step 2050, the backup request is sent from the VDP system 2004 to the RDBMS agent 2002 for backup staging volume 2005 requirements. Step 2050 is explained in further detail below with respect to steps 2007-2012 of FIG. 20B. At step 2051 the VDP system 2004 processes the backup staging volume 2005 requirements message and prepares the backup staging volumes 2005. Step 2051 is explained in further detail below with respect to steps 2013-2015 of FIG. 20B. At step 2052 the VDP system 2004 maps the backup staging volumes 2005 to the host 2001; the RDBMS agent 2002 makes the backup staging volumes 2005 ready to be receiving backup I/Os. Step 2052 is explained in further detail below with respect to step 2016-2017 of FIG. 20B. At step 2053 the RDBMS agent 2002 performs backup of the primary database storage 2003. Step 2053 is explained in further detail below with respect to steps 2018-2020 of FIG. 20B. At step 2054 the RDBMS agent 2002 merges the incremental changes with last backup to make it up to date and copies required database artifacts onto the backup stage volumes 2005. Step 2054 is explained in further detail below with respect to steps 2021-2024 of FIG. 20B. At step 2055 the VDP system 2004 creates a snapshot of the backup staging volumes 2005 and catalog the metadata. Step 2055 is explained in further detail below with respect to steps 2025-2027 of FIG. 20B.

Figure 20C:
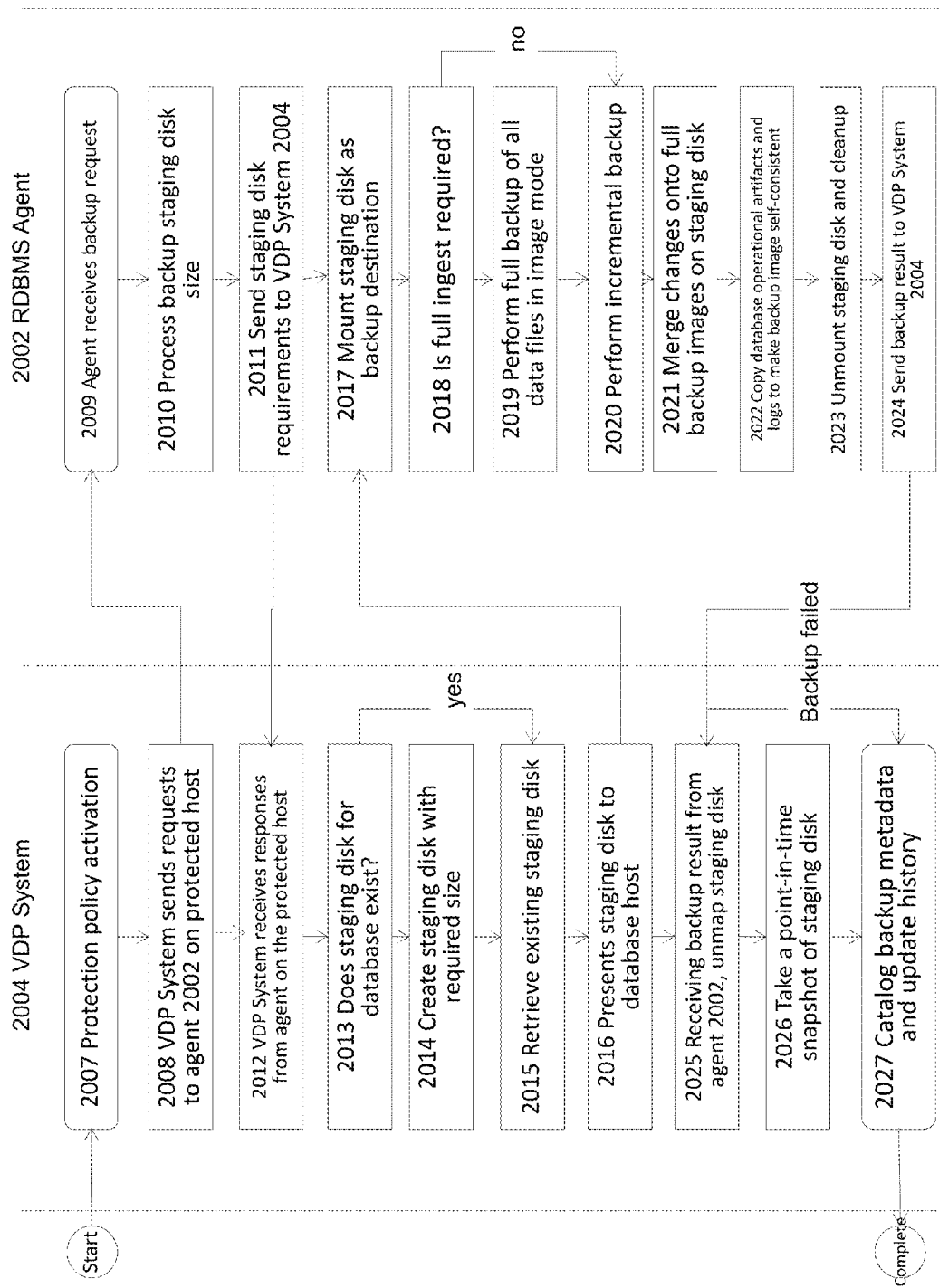
FIG. 20C depicts a computerized method for protection of a database in accordance with some embodiments.

FIG. 20C illustrates an exemplary detailed message and data flow of the incremental-forever backup protection. FIG. 20A, FIG. 20B detail communications between VDP System 2004 and RDBMS Agent 2002, and execution steps of VDP System 2004 and RDBMS Agent 2002.

A protection policy is activated in step 2007 by scheduler of the VDP system 2004. A protection policy is part of SLA (service level agreement) which is defined by end user and stored by the VDP system 2004 and applied to RDBMS on the Host to be protected 2001. SLA has a schedule defined and being evaluated by scheduler of VDP system 2004. The policy is activated by the schedule once it is determined that the defined criteria are met.

At step 2008 the VDP system 2004 sends requests to the RDBMS agent 2002 on the protected host 2001. The requests of step 2008 consist of instructions for backup operations to be consumed by the RDBMS agent 2002.

At step 2009, after receiving a backup instruction from the VDP system 2004, the RDBMS agent 2002 processes the backup instructions.

At step 2010, the RDBMS agent 2002 communicates with RDBMS to determine the configured size of the RDBMS to be used as the size for the backup staging volume 2005. In some examples, the end user has option to use a user specified size to override the calculated size. The size of the backup staging volume 2005 is calculated in such a way to allow the incremental backup to execute forever without running out of space for backups.

At step 2011, the RDBMS agent 2002 sends the size requirement and unique signature for the backup staging volume 2005 to the VDP system 2004. The unique signature is a string that can be used to uniquely identify a backup staging volume in the performance storage pool 2006. For example, for an Oracle database, its SID (Oracle System ID) can be used as the unique signature for the backup staging volume 2005.

At step 2012, the VDP system 2004 received the size requirement and unique signature for the backup staging volume 2005 from the RDBMS agent 2002.

At step 2013, the VDP system 2004 checks existing staging disks in the performance pool 2006 to determine whether a disk with this unique signature and the required size already exists. The method moves to step 2014 if the staging disk is not found, or forward to step 2015 if staging disk is found in the performance pool 2006.

At step 2014, the VDP system 2004 creates a backup staging disk with required size and signature from the performance pool 2006.

At step 2015, the VDP system 2004 retrieves the backup staging disk found in step 2013 from the performance pool 2006.

At step 2016, the VDP system 2004 presents the staging disks either created in step 2014 or retrieved in step 2015 as the backup staging volumes 2005 to the Host to be protected 2001. The presentation is to map the staging disk to the Host to be protected 2001, an unique disk signature is sent to the Host to be protected 2001.

The RDBMS agent scans the buses to find the presented backup staging volumes 2005, and if they are uninitialized volumes, formats them and creates a file system to receive the data in step 2017. Any file system type that is natively supported on the host operating system, and is compatible with the database software is acceptable. In the preferred embodiment, the NTFS file system is used for Windows systems, and the ext3 file system is used for Linux systems.

At step 2018, the RDBMS agent 2002 first determines whether a full ingest is required for backup of the RDBMS by examining the backup staging volume 2005. The RDBMS agent 2002 will move to step 2020 if previous backup artifacts are found and it is determined no full ingest is needed. Otherwise the RDBMS agent 2002 will move to step 2018 for a full ingest.

At step 2019, the RDBMS agent 2002 copies the logical contents of the database to be protected onto the staging volumes 2005. The purpose of this copy is to create an image of the database data in a format in which it can be started up on a similar host machine. The contents of the captured image of the database are an exact copy of the original database at a particular point in time.

The methodology for creating the image copy may vary from one database application to another. It will be clear to someone skilled in the art how to create an image of the particular database system using the database vendor's conventional methodology. For example, vendors often provide backup tools for database systems that allow the database to be copied in a manner such that it can be loaded as an operational database. For example, for an Oracle database, the preferred method of creating the image is to use the Oracle RMAN command "Backup incremental level 0 as copy database with tag 'xyz'". Otherwise, using conventional backup methodologies that are not designed for the database may not preserve the database structure, and therefore a database backed up using conventional backup methodologies may not result in an operational database (e.g., the backed up database cannot be loaded and used by the database utilities).

At step 2020, the RDBMS agent 2002 performs an incremental backup of the primary database storage 2003, writes backup artifacts onto the backup staging volume 2005.

At step 2021, the RDBMS agent 2002 merges the changes with the image copies of data files to make these image copies up to date on the backup staging volumes 2005.

Once the image creation on the staging disk is complete, the RDBMS agent may copy additional artifacts to the staging disk as required to make the backup image self-consistent in step 2022. A person skilled in the art may recognize backup control files, archive log files, database configuration files, and VSS writer metadata documents as artifacts that may be copied on to backup staging volumes 2005.

In step 2023, the RDBMS Agent 2002 unmounts the staging volumes 2005 to prevent the image copies and other backup artifacts being overwritten or damaged to keep the backup data integrity.

At step 2024, the RDBMS agent 2002 sends backup result messages containing metadata of the backup to the VDP system 2004 to finalize the backup operation. Now the involvement of the RDBMS agent 2002 is completed.

At step 2025 the VDP system 2004 unmaps the backup staging volumes 2005 from the host to be protected 2001. End user has choice to keep the backup staging volumes 2005 mapped to the host 2001 to override default behavior.

At step 2026 the VDP system 2004 creates a point in time snapshot of the backup staging volumes 2005. This step is to create point-in-time flash copy of the backup staging volumes 2005. The flash copy can be purposed for multiple uses with the data contents having the state at the time the snapshot was taken. For example, a flash copy image of the backup staging volumes 2005 can be mounted to a host in quality assurance department for testing.

At step 2027 the snapshot of the backup staging volumes 2005 is cataloged as the most recent backup of the RDBMS application.

The next time the protection policy is activated on schedule to the same database under protection, the same image mode disks representing staging volumes 2005 may be reused, reducing the amount of data movement that may potentially be required. In this situation, as done in step 2015, the VDP system 2004 presents the same backup staging volumes 2005 to the host 2001. The RDBMS agent 2002 scans these volumes and mounts the file system, making the previously created image visible to the host in step 2017. The RDBMS Agent 2002 now updates the image on the staging disks, bringing it up to a more recent point in time in steps 2020 and 2021. Once again, the detailed methodology may vary according to the database vendor's conventional methodology. For an Oracle database, as an example, the procedure is to run the RMAN command "backup incremental level 1 for recover of copy with tag 'xyz' database", followed by the command "recover copy of database with tag 'xyz'". In step 2022 is once again to copy artifacts for self-consistency to the staging volume before unmount the staging volumes in step 2023 and send messages to VDP System 2004. VDP system 2004 unmaps the staging disks from the host 2001, and creates a latest point in time snapshot of the staging volumes in step 2026. This set of snapshots is cataloged in step 2027 as the most recent backup of the database application.

The snapshots of the staging disks are virtual full backups of the database under protection and have all of the characteristics of in-band backups within the VDP system. These backup images can be mounted and started as full independent instances; they can be cloned or restored, deduplicated for long term storage, or transported across the WAN for disaster recovery and business continuance.

When the copy is performed from the RDBMS device, the initial copy is performed on the host 2001. The copy operation is performed by the RDBMS Agent 2002. The copy is done to a set of volumes 2005 that is presented by the VDP system 2004.

Quick-Linking Services in the User Interface

This disclosure relates to user interfaces for products in the Data Management Virtualization space. More specifically, it describes the systems and methods for Quick-linking across data management, data protection, disaster recovery and business continuity services running on top of storage management stack from the data management provider as described herein. Quick links can be defined for actions that span across a number of different services defined by the service objects by sharing data and information across the services using a shared services cache. The Quick-linking service can be used to automatically perform steps in a workflow based on context information for subsystems of a system implementation (e.g., data management, data protection, disaster recovery and business continuity services), whereas without the context information the steps would need to be performed manually (e.g., by a system user). For example, the roles and rights of the user are inherently represented in the views and functionality available within a service is scoped accordingly. Quick-linking can resolve the problem of context awareness and user initiated job identification while simplifying the end-to-end workflow. Access to the underlying subsystems of the data management virtualization display can allow the data management virtualization display to use the persona of the particular data management virtualization implementation, coupled with data and other information that can be gleaned from the underlying subsystems, to automatically perform steps of jobs that would otherwise need to be manually controlled and manipulated by the user.

Data Management Provider Desktop

FIG. 21 depicts the Data Management Provider Desktop in accordance with some embodiments. The Data Management Provider Desktop is the user interface that implements systems and methods for the Data Management Virtualization Engine 306. The Data Management Provider Desktop allows users to manage, monitor, configure and report on managed data, applications and their associated storage as viewable from the Data Management Virtualization Engine 306. Within the Data Management Provider Desktop, each of the primary use cases is broken down into a group of actions that a user persona may be interested in performing with the system. Each persona based logical grouping constitutes a 'Service.'

In some embodiments, the supported services can include a Dashboard. The Dashboard can include, but is not limited to, aggregate views of current and historical data and performance for the system components. It can also include point of time state of the major components that make up the Data Management Virtualization Engine, any critical events requiring immediate user intervention.

In some embodiments, the supported services can include a Domain Manager. Domain Manager can include a group of functions, which are traditionally performed by a user responsible for Configuration Management, Host Management and Security Management within their organization.

In some embodiments, the supported services can include a Service Level Agreement (SLA) Architect. This allows a user to create and manage SLAs that specify the business requirements of an application for its data lifecycle. As described further herein, a SLA is a detailed specification that captures the detailed business requirements related to the creation, retention and deletion of copies of the application data.

Figure 23:
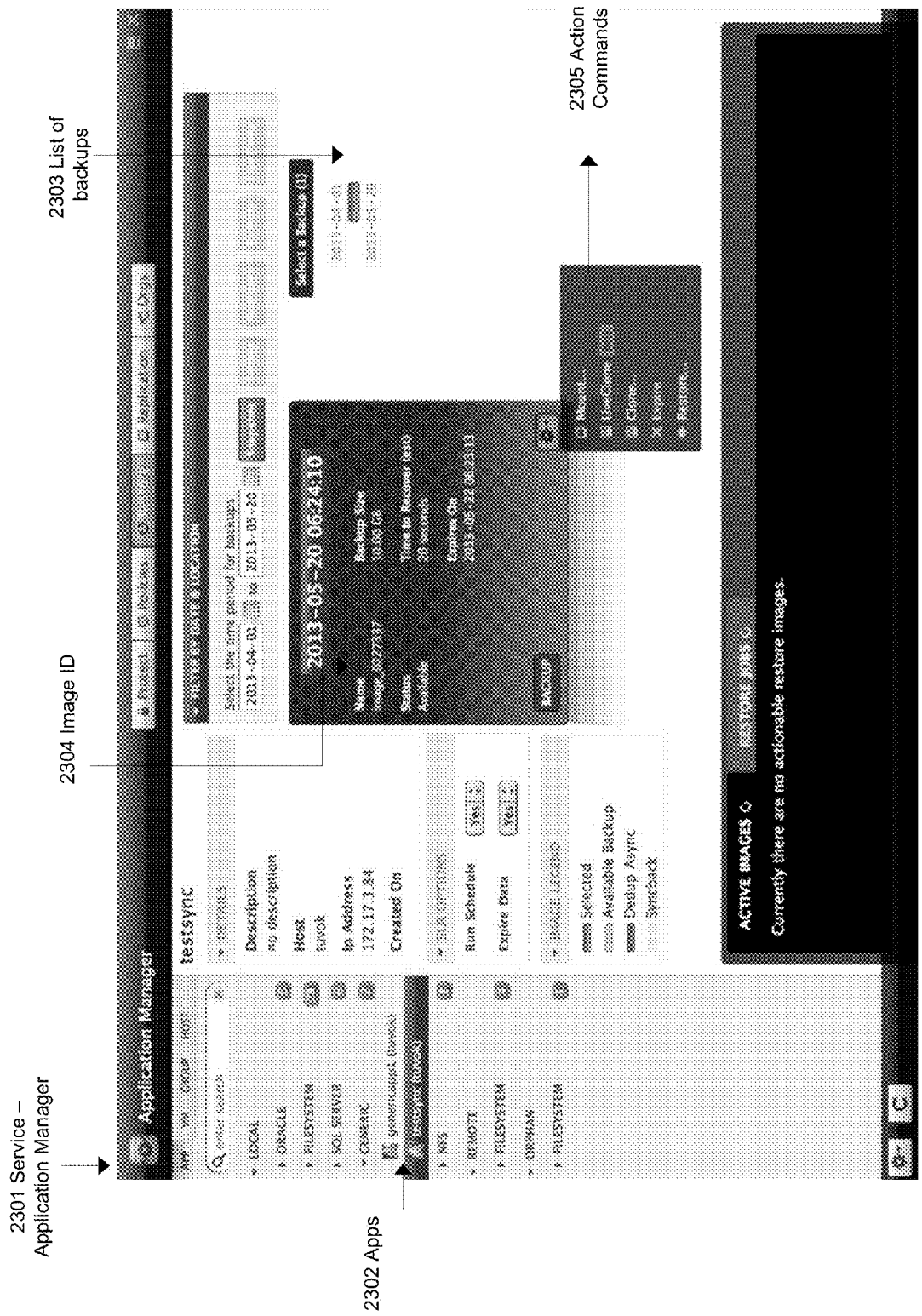
FIG. 23 depicts an Application Manager Service, in accordance with some embodiments.

In some embodiments, the supported services can include an Application Manager, which is described in further detail referring to FIG. 23.

In some embodiments, the supported services can include a Report Manager. A Report Manager provides for basic reporting and business analytics based on data integration and connectivity with the underlying platform subsystem.

Figure 24:
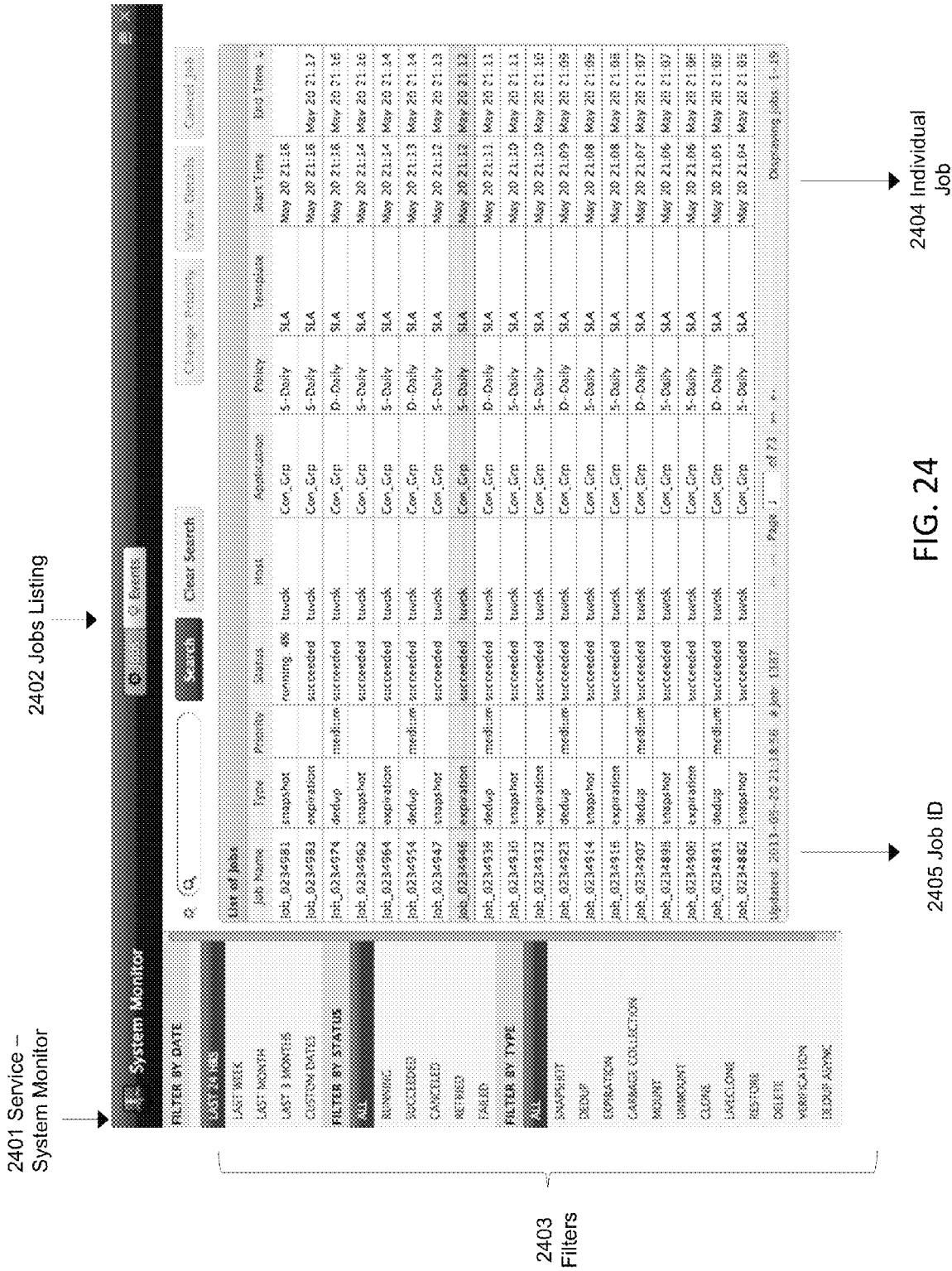
FIG. 24 depicts a System Monitor service, which in the Desktop is responsible for handling all user visible activities related to jobs, including monitoring and management, in accordance with some embodiments.

In some embodiments, the supported services can include a System Monitor, which is described in further detail with respect to FIG. 24.

The Data Management Provider Desktop 2100 runs on a client PC (e.g., running Windows or a Mac OS), and communicates over IP Network 2101 with the Data Management Virtualization Engine 306 (e.g., described in reference to FIG. 3). In some embodiments, the communications use secure HTTPS protocol. In some embodiments, the API is REST based. The Data Management Virtualization Engine is connected to Hosts 2103 and Storage Resources 2102 via either IP or fiber channel (FC) networks 2104. The Host 2103 can be, for example, a physical or virtual machine where programs, applications, and file systems of interest reside. The Storage Resources 20102 can be the locations where actual data is stored.

Figure 22:
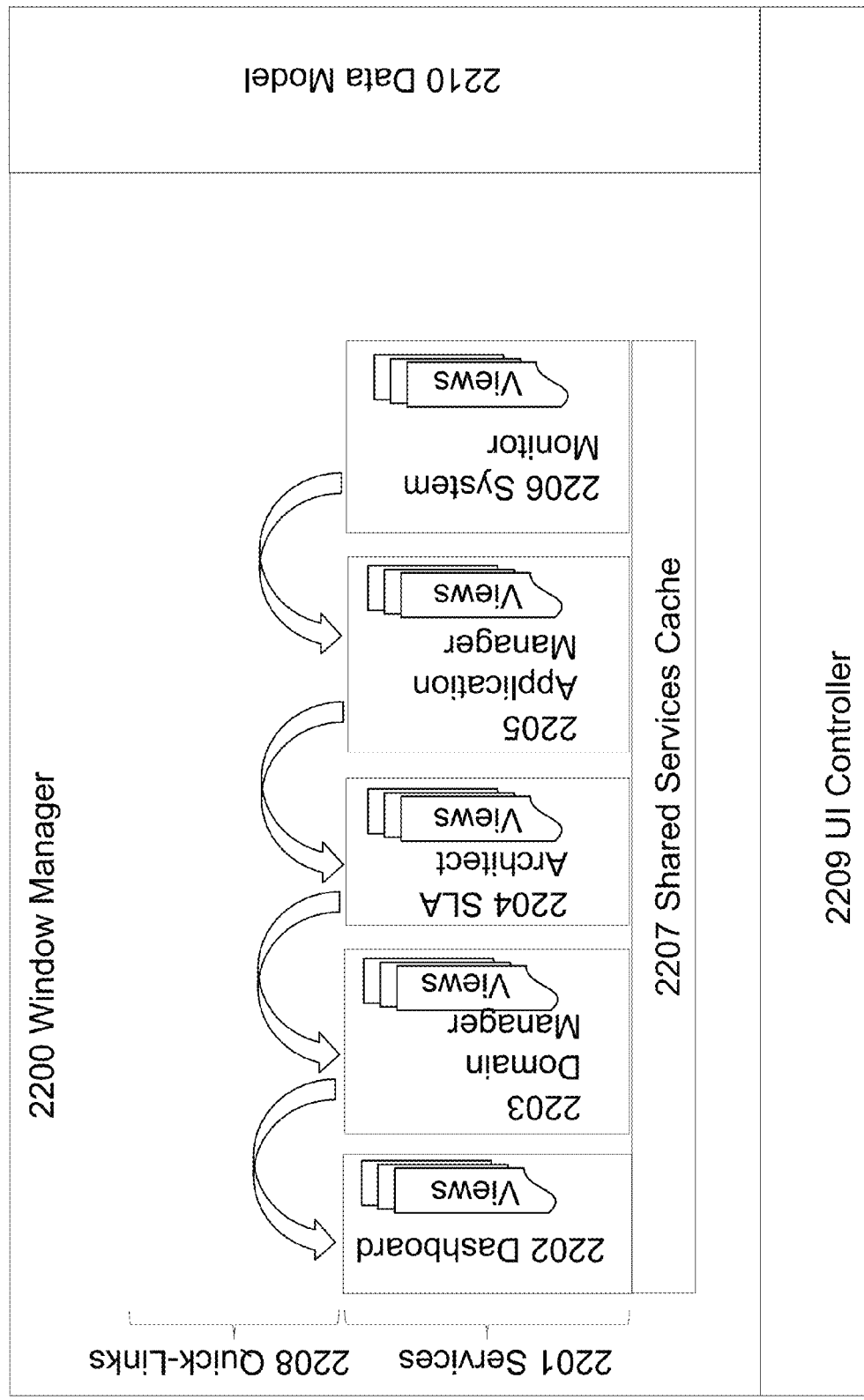
FIG. 22 depicts a schematic diagram of a service manager interface with quick links, in accordance with some embodiments.

FIG. 22 depicts a schematic diagram of a service manager interface within the Data Management Provider Desktop UI with quick links, in accordance with some embodiments. The service manager runs within the Desktop UI. A group of services 2201 resides within the window manager 2200.

Each of these services the dashboard 2202, the domain manager 2203, the SLA architect 2204, the application manager 2205 and the system monitor 2206 is connected to each other via Quick links 2208. Each service resides on top of a shared cache 2207, is managed by the UI Controller 2209 and follows the Model View Controller architecture. Data Models 2210 hold objects for the services in question. Quick links in addition to providing an entry point to these services also allow for sharing data between services Referring to the window manager 2200, the window manager can be a shell inside which the views and services are built and visualized. Window manager abstracts the underlying OS underneath and provides the facility to work with the windowing framework (e.g. resizing, styling, and layouts).

Referring to the quick links 2208, the quick links 2208 tie the services 2201 together to seamlessly guide the user through their user cases. For example, the quick-linking mechanism can be used for various job initiating user actions related to backup data management, including but not limited to mount, clone, restore, unmount, unmount and delete, expire, failover, test failover, syncback, and/or the like. The quick links 2208 provide a visual and intuitive approach of switching context between the services 2201 while providing users with real time status and feedback on their existing subsystems.

Quick link is a process by which the services can communicate with each other, update their context, and ultimately resolve use cases tied to customer needs. Quick links are implemented using the facilities and capabilities of the Service Object; they can be invoked and managed by any combination of services. The underlying API on the platform plays an important part with the process of switching the context, it provides facilities for lookups and complex quires based on the quick link use cases.

Referring to the shared services cache 2207, this can be a data structure that holds data in name/value pairs. These data sets are accessible to all the services via public methods. There are multiple ways of implementing the shared services cache, such as, for example, a hashmap.

Referring to the UI controller 2209, the UI controller 2209 can be implemented similar to a model view controller (MVC) based architecture where the business knowledge resides in the UI controller 2209 and separates the UI views in the Window Manager 2200 from the data model 2210. The UI controller 2209 can be configured to listen to changes in both the UI views and/or the data models.

Referring to the data model 2210, this is where most of the service centric data is stored. Each of the services can be configured with its own data model and the controller gets the events from the views, converting them into entities to update the model.

Figure 22A:
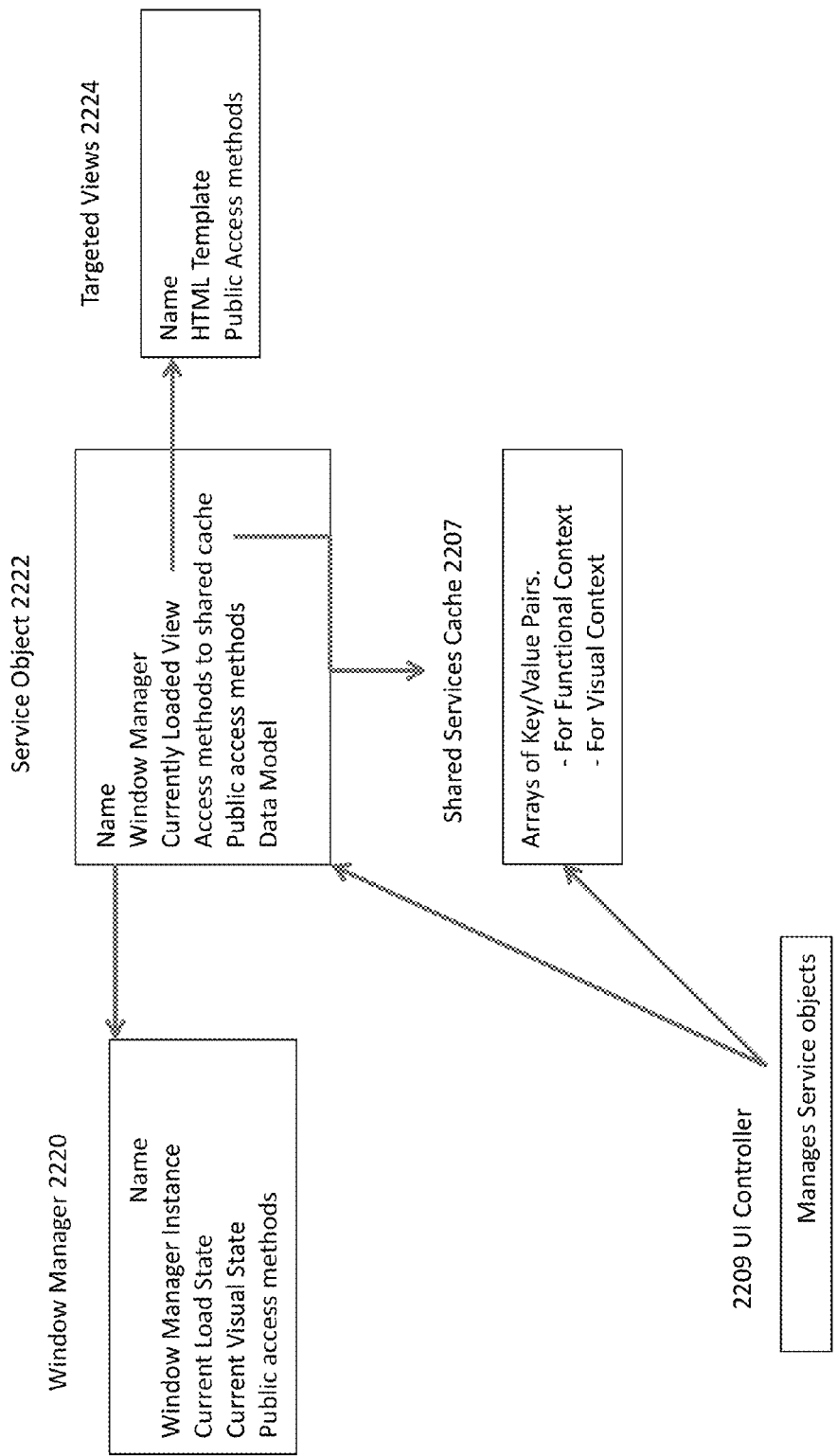
FIG. 22A depicts a schematic diagram of a service object, in accordance with some embodiments.

FIG. 22A shows the implementation and architecture of the service and their linkages. Service Object 2222 implements a window manager 2220 and several targeted views 2224. It also has pointers to the shared services cache 2207. The UI controller 2209 exercises most of the functionality within the service object.

According to the systems and methods disclosed herein, the various views for the data management virtualization system are grouped together logically into a set of services 2201. The architecture provides the shared services cache 2207 to allow all of the services to access, transport, and save data across the services 2201. The architecture also provides service objects 2222 that can be used to define the components of a particular service (e.g., including a particular window manager for the service, the targeted views for the service, how the service interacts with the shared cache, and methods for the controller to manage the service). The service object 2222 includes a name for the service object, a reference to a window manager 2220, an indication of the currently loaded view for the service object 2222, a set of access methods to the shared services cache 2207, public access methods for other service objects to use to access the service object, and a data model (e.g., data model 2210).

The window manager 2220 can be implemented for a particular service object 2222. As described herein, the window manager is a shell inside which the views are built and visualized to the user. The window manager 2220 includes a name for the window manager 2220, a window manager instance, a current load state, a current visual state, and public access methods for the window manager 2220.

The targeted views 2224 are the views for the service object 2222. Each targeted view 2224 includes a name for the targeted view 2224, an HTML template for the targeted view 2224, and public access methods for the targeted view 2224.

The UI controller 2209 is configured to manage the service objects 2222. In some embodiments, the UI controller 2209 manages data transfer among the service objects 2222 via the shared services cache 2207. As described above, the shared services caches 2207 can be used to share data in arrays of key/value pairs. The data can be shared, for example, for functional context, visual context, and/or the like.

Jobs

In Data Management domain there are numerous user-initiated operations that can affect the state of the system, these often require careful monitoring and reporting. Each one of these user driven end-to-end tasks triggers a system level activity (e.g., a process in the Data Management Virtualization Engine 306), which henceforth is referred to as a 'Job.' A job may include multiple sub jobs with their own state and lifecycle. Managing and monitoring of jobs within the Data Management Virtualization subsystem is a significant activity and performed from within the System Monitor service.

In some embodiments, a Service Policy Engine is responsible for managing jobs. The Data Management Virtualization Engine 306 performs several jobs, such as backup, recovery, etc. that span multiple storage pools. If, for example, there are multiple volumes that the operation relates to, then each job instantiates other sub-jobs.

Services 2201

Referring to the services 2201, each service is implemented as an independent application within its own window manager. Each service shares a framework of libraries and code written for handling common functional behaviors and visual components. An array of service objects is stored within the base window manager and is instantiated when the desktop application is launched.

Application Manager 2205

FIG. 23 depicts an exemplary Application Manager Service. The Application Manager Service provides a graphical user interface for discovering, protecting and managing application lifecycle. All applications protected by Service Level Agreements (SLAs) are displayed and organized logically inside its framework. Backup, restore and other Data Management Virtualization Engine 306 operations are initiated from this service.

A visualization of the Application Manager service 2301, which includes a navigation listing 2302 for elements of Application manager which includes all the applications under management by the Data Management Virtualization Subsystem. A list of backups 2303 for the selected application, an image ID 2304 is used to identify the images and 2305 are the supported actions on the image. The image is a sample visual of a service and where the user could trigger an action to initiate a quick link.

System Monitor 2206

FIG. 24 depicts an exemplary System Monitor service, which in the Data Management Provider Desktop is responsible for handling all user visible activities related to jobs, including monitoring and management. FIG. 24 also identifies the layout of System Monitor.

The System Monitor service 2401 lists the jobs and events in the subsystem. Jobs listing 2402 lets the user select the context for the data grids. Filters 2403 allows one to narrow down the data set in the grid based on pre-determined filters. Individual jobs 2404 are listed in a grid, each with a corresponding Job ID 2405.

Figure 25:
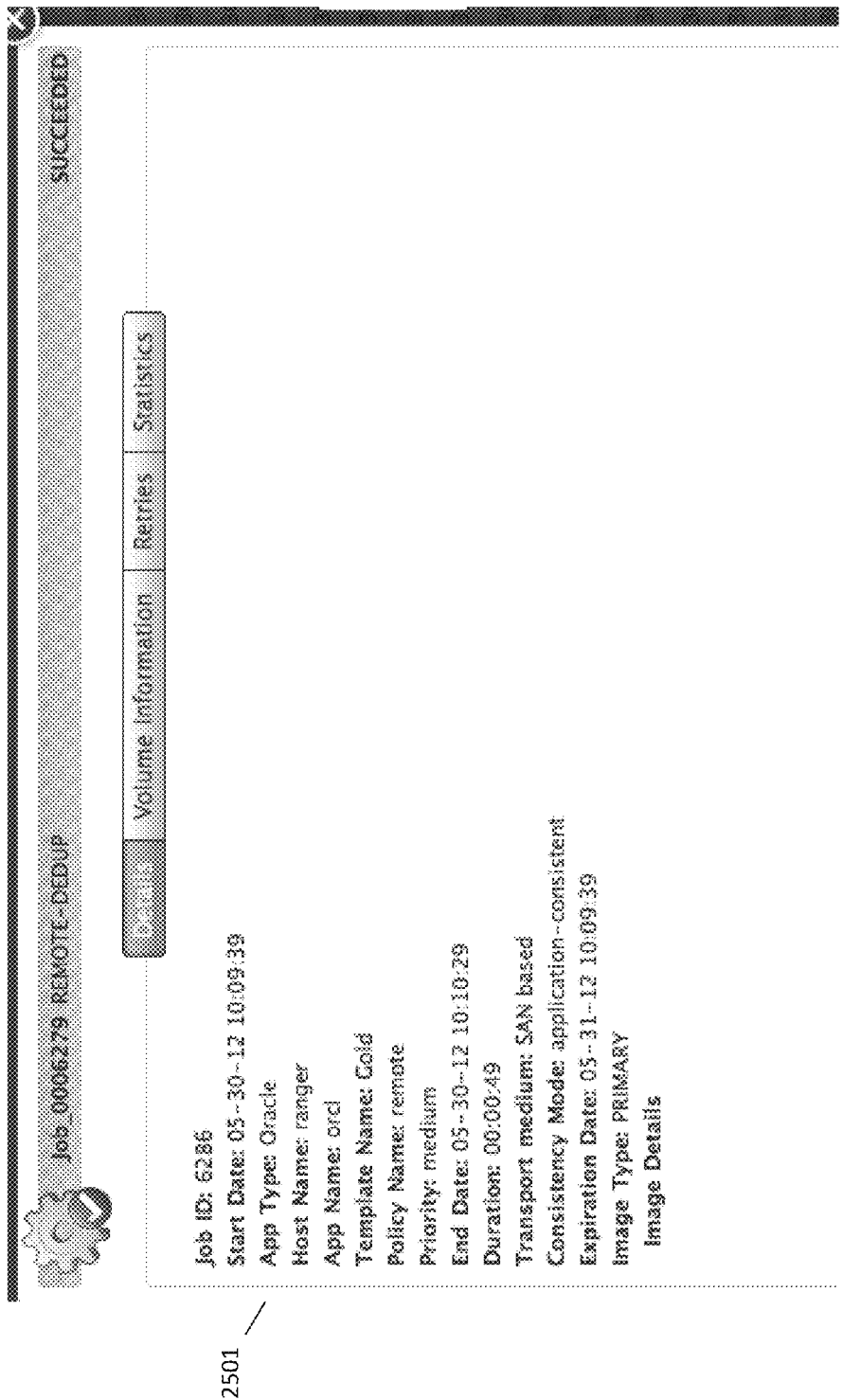
FIG. 25 depicts the display of specific details of a particular job from within a System Monitor service, in accordance with some embodiments.

FIG. 25 depicts the display of specific details of a particular job from within a System Monitor service. A user can choose an individual job by either double clicking a row or choosing 'View Details' option brings up the details as displayed in FIG. 25.

Service Manager

Service Manager is a framework that allows for managing of individual service instances. It provides for several service related operations including adding new service, remove existing service, displaying and hiding of services and managing their visual states.

Quick-Linking

As described above, the quick links 2208 tie the services 2201 together to seamlessly to guide the user through their user cases. To illustrate these techniques a sample task of backup mount operation is used. The services used for a backup mount operation include the Application Manager 2205 and System Monitor 2206. A user initiates the mount operation from within the Application Manager 2205. The system identifies the application and its associated backup that may be mounted, takes in the input from user regarding the mount point and individual backup volumes desired to be mounted. Once user inputs have been validated, the Data Management Virtualization Engine 306 system initiates a mount request which instantiates a corresponding job and/or required sub-jobs.

An association between jobs is maintained within the platform subsystem of Data Management Virtualization Engine 306. The request to instantiate the job and/or required sub-jobs is sent from the Data Management Provider Desktop 2100 to the Data Management Virtualization Engine 306. On successful instantiation of the job, the Data Management Virtualization Engine 306 returns the unique ID of the job (or parent job when there are required sub-jobs) back to the Data Management Provider Desktop 2100. In some examples, the request can be transmitted to the Data Management Virtualization Engine 306 via a Web Service application programming interface (API). The Web Service can be a Java based service custom implementation of representational state transfer (REST) architectural principals. The communication between platform and the user interface can use JavaScript Object Notation (JSON)-formatted strings over the Hypertext Transfer Protocol-Secure (HTTPS) protocol. Data Management Provider Desktop 2100 then uses this ID to walk through the list of all available jobs.

FIG. 25 depicts the display of specific details of a particular job from within a System Monitor service 2206, in accordance with some embodiments. Once a match with a job is identified, the job details are requested from the Data Management Virtualization Engine 306. These details are appropriately formatted, visualized and made available to the user in the appropriate service. In this example, the service context is switched to System Monitor 2206 and the Job Details window is presented to the user. If the job in is running state, the details of the job are dynamically updated. The status information is retrieved from a query initiated by the Data Management Provider Desktop 2100 as part of a client-side polling loop every 5 seconds. The poll starts as soon as the job platform confirms that a job has been successfully launched.

In graphical context, the Application Manager 2205 view (FIG. 23) switches to the Job Details view (FIG. 25) and the background service switches to the System Monitor 2206 view (FIG. 24).

Service Context Switching

An array of currently loaded services is maintained on a Data Management Provider Desktop 2100 instance level and it also stores the state of each service, including whether it is user visible. When a switching context occurs, it updates the stored states in the array of loaded services and uses the Window Manager 2200 to change the visual context. It also involves instantiating the service instance if one has not been loaded previously (e.g., is not in the array of currently loaded services).

Figure 26:
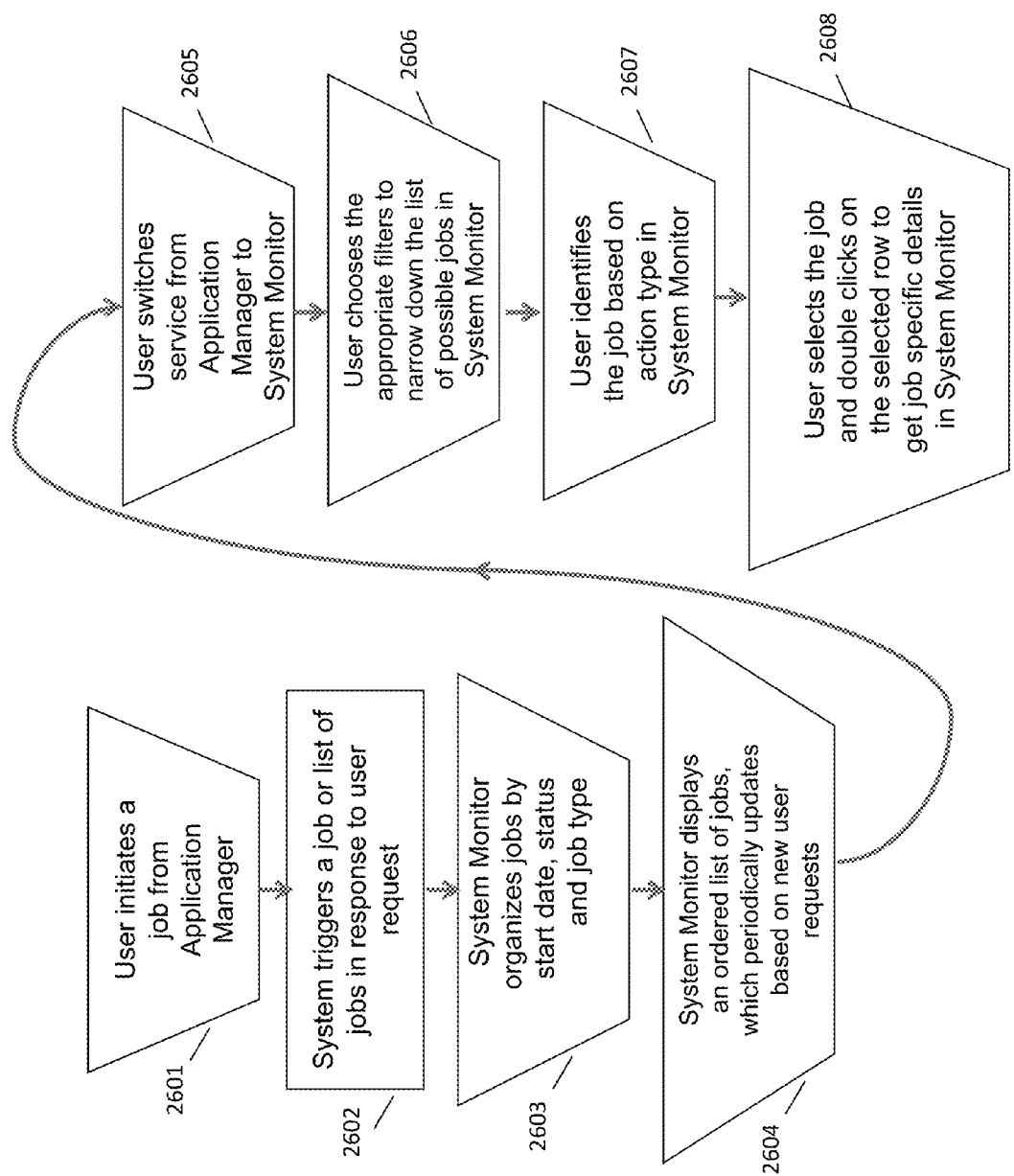
FIG. 26 describes the user flow without Quick-linking, in accordance with some embodiments.

FIG. 26 describes the user flow without Quick-linking. At step 2601, the user initiates a job from the Application Manager 2205. At step 2602, the system triggers a job or list of jobs in response to user request. At step 2603, the System Monitor 2206 organizes jobs by start date, status and job type. At step 2604, the System Monitor 2206 displays an ordered list of jobs, which periodically updates based on new user requests. At step 2605, the user switches service from Application Manager 2205 to System Monitor 2206. At step 2606, the user chooses the appropriate filters to narrow down the list of possible jobs in System Monitor 2206. At step 2607, the user identifies the job based on action type in System Monitor 2206. At step 2608, the user selects the job and double clicks on the selected row to get job specific details in System Monitor 2206. This process may require several complex steps.

Figure 27:
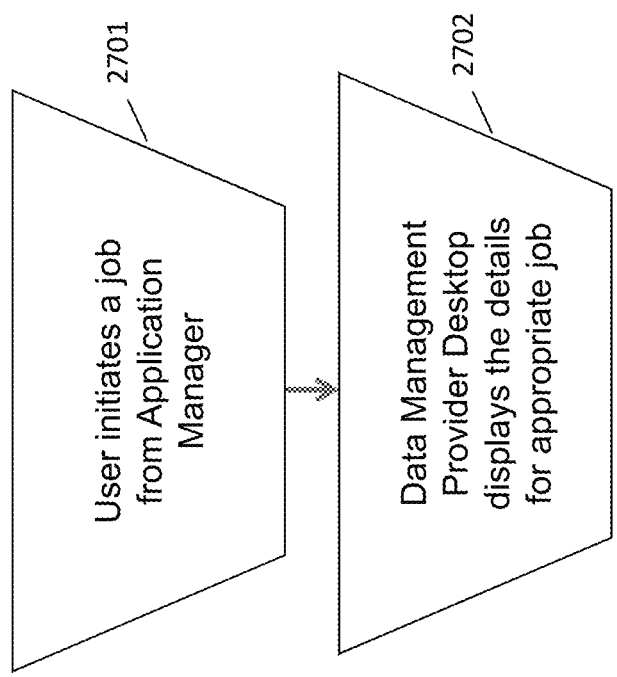
FIG. 27 describes the user flow with Quick-linking, in accordance with some embodiments.

FIG. 27 describes the user flow with Quick-linking. The user initiates a job from the Application Manager 2205 at step 2701. In step 2702, the Data Management Provider Desktop 2100 displays the details for appropriate job using quick linking. The process is complete without additional interaction from the user.

Smart Data Synchronization

The following section deals with operational data within the data management system. As data is stored within the system, metadata regarding the time of snapshots, content-addressable handles, and other such metadata accumulates in the system. This data is called operational data. Operational data also includes policies, schedules and system configurations. The platform server is a centralized data management system that collects and maintains a copy of operational data from each sub-system locally for each sub-system that the platform server is managing. As well, remote site replication requires one system for each site. If the two sites are close, a single management console may be used for both.

In some situations, the use of multiple data management systems may afford advantages. This may occur, for instance, when the amount of user data stored in the system exceeds a maximum threshold, such as 127 terabytes (TB). The use of multiple data management systems may be facilitated by the use of a central management server that synchronizes operational data for each of the multiple data management systems. Approaches for replicating and synchronizing operational data are discussed below. In some embodiments, a different synchronization strategy can be deployed for data based on the data itself. In some embodiments, a different synchronization strategy can be deployed for data based on the number of data records (e.g., a small number of records, a medium size set of records, or a large size set of records). Synchronizing operational data can, for example, eliminate the need for a user of the central management server to go to each data management system to manage each system; instead they can simply manage all data management systems through the central management server. Users can easily get a global view of all data management systems they are responsible for with the help of a central management server.

Traditionally, operational data is synchronized by comparing data from source and target, adding data to target that exists only in source, deleting data that only exists in target, and update target data with data from source if they are different. Techniques are disclosed herein to replicate operational data. Different techniques can be used based on the number of operational data records. For example, a small set can simply be replaced each time synchronization occurs; as the data often changes and can be done quickly. For a medium set, both timestamps and record IDs can be used to synchronize the data (e.g., since the number of IDs is manageable, and can be used to indicate deletion information. For a large set, record IDs alone can be used to synchronize the data in conjunction with a tolerance number to account for a simultaneous processing window (e.g., since some operations cannot be guaranteed to occur prior to other operations). This is possible because large sets of data typically do not change once they are created, and is typically deleted based on some retention policy.

Figure 28:
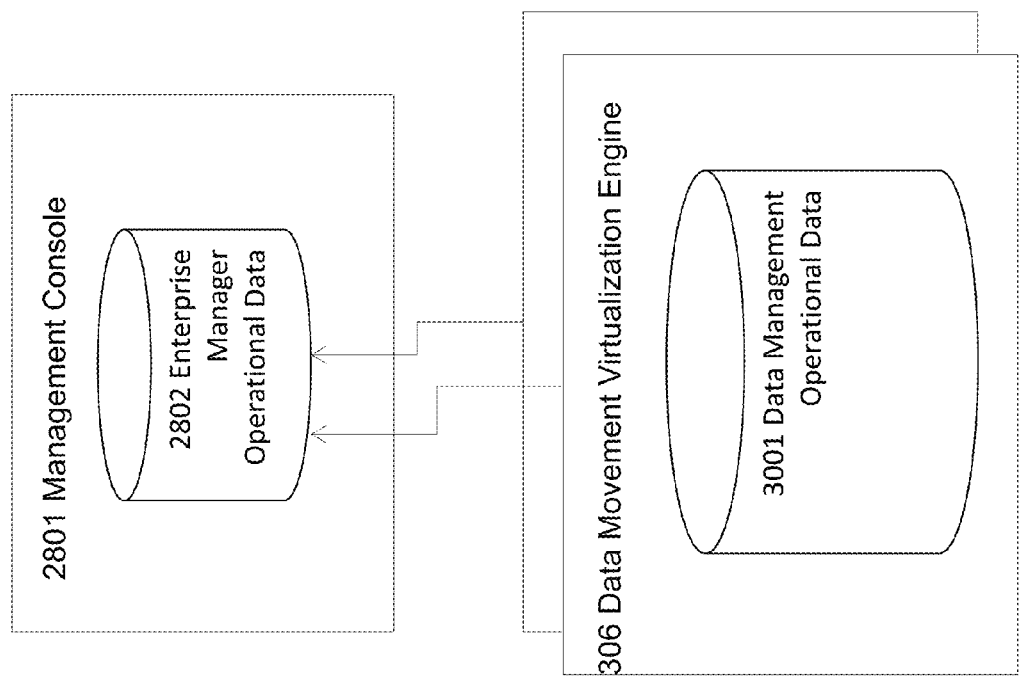
FIG. 28 depicts a Management Console, in accordance with some embodiments.

FIG. 28 depicts a Management Console, 2801, that can manage multiple Data Movement Virtualization Engines, 306, in accordance with some embodiments. This depicts a scenario when data on multiple Data Movement Virtualization Engines 306 is synchronized to a single Management Console 2801. Management console 2801 may include a database of enterprise manager operational data 2802, which includes a replicated copy of the data management operational data 3001 for each of the multiple Data Movement Virtualization Engines 306 synchronized to the Management Console 2801. These Data Management Operational Data 3001 maintain regular operation, or are generated through normal operations. They are typically stored in a Relational Database System, although other types of storage are also possible.

Figure 29:
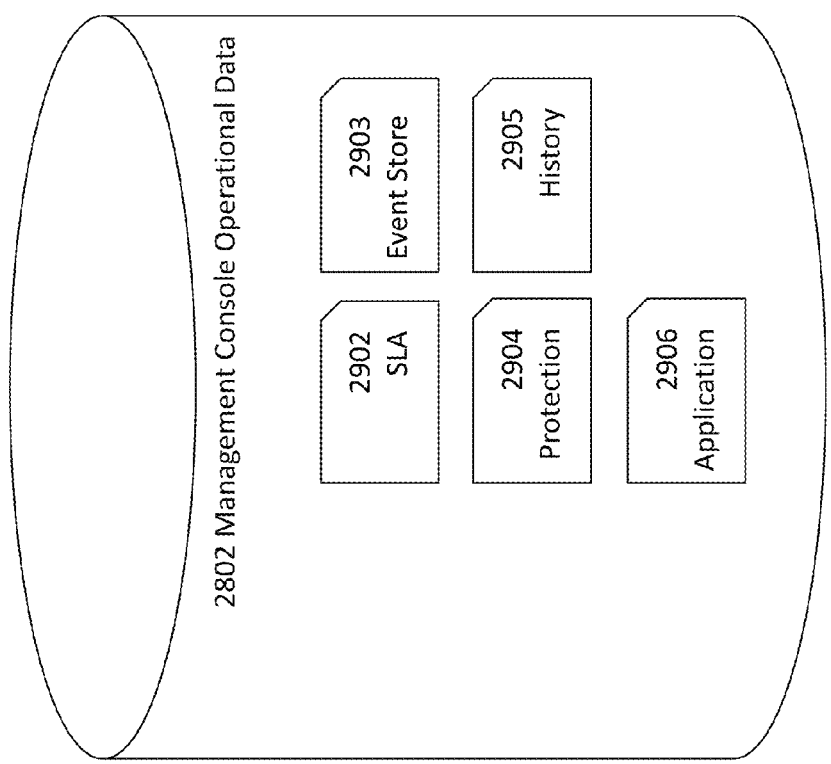
FIG. 29 depicts Enterprise Manager Operational Data, in accordance with some embodiments.

FIG. 29 depicts a database of Enterprise Manager Operational Data 2802, in accordance with some embodiments. This database can store, for example, operational data related to data required to perform operations, and the results of these operations. The operational data stored in the database include service level agreement (SLA) data 2902, Protection data 2904, History data 2905, Event Store data 2903 and Application data. A unique ID within a Data Movement Virtualization Engine can be used to uniquely identify each record stored in the database.

For Management Console 2801 to manage multiple Data Movement Virtualization Engines 306, these operational data may be synchronized to the Management Console 2801, which also resides in a relational database. Each Data Movement Virtualization Engine 306 is also associated with a unique ID. The combination of the unique record ID and Data Movement Virtualization Engine ID uniquely identifies a record in the Management Console, and the origin of the records.

Figure 30A:
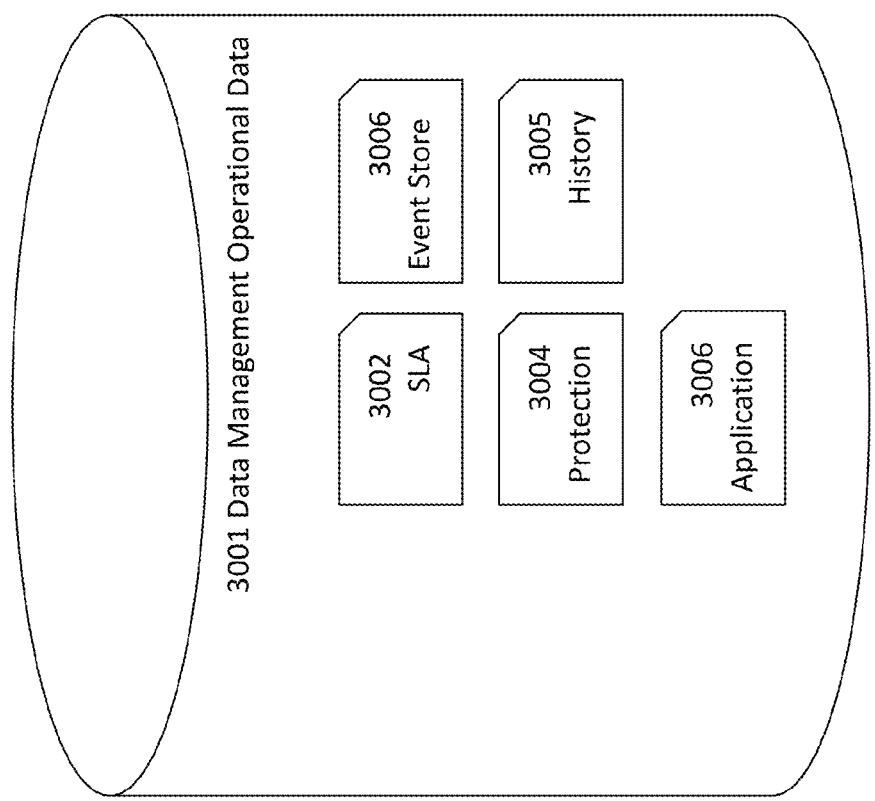
FIG. 30A depicts examples of data management operational data, in accordance with some embodiments.

FIG. 29 depicts examples of Management Console Operational Data 2802, which contains data that are replicated from Data Movement Virtualization Engines. FIG. 30A depicts examples of Data Management Operational Data 3001, in accordance with some embodiments. These data may include SLA data 3002, Protection data 3004, and History data 3005. Event Store data 3006 and Application data 3306 may also be co-located with the operational data 3001. Application data represent applications that the data management system manages. SLA data represent the policies that are used to protect the applications. Protection data represent policies that are used to protect various applications. History data represent all protection operations performed on the system, whether it is successful or not. Event data collect all events occurred on the data management system.

In general Operational Data can be divided into small-size sets of data, typically less than a few hundred records, such as SLA 3002; or medium-size sets of data, usually in the thousands, such as Protection Data 3004; or large-size sets of data, which can be into hundreds of thousands or even more, such as History Data 3005. In some embodiments, the size of a record does not matter, but rather just the number of records. For the large-size sets of data, as they are generated in such a high rate, they are typically not modified, and are only deleted in bulk. History Data 3005 fit this criterion, as they represent historical records of all of the operations performed in Data Management Operational Data 3001. Another example is Event Data 3003.

Synchronization of Small Sets of Data (or Frequently Changing Sets of Data)

For tables (sets of records) that contain small sets of records, traditional comparison of all records is sufficient. This involves copying all data from source to target and comparing them. As the data sets is small, network bandwidth consumption and CPU to process them is typically be minimal. A small set of data can include less than 1,000 operational data records.

Synchronization of Medium-Size Sets of Data

As the total size of a set of records increases, the cost of fetching all records and comparing them increases also. A different strategy can be used to more efficiently synchronize the data. A medium-size set of data can include over 1,000 operational data records but less than 100,000 operational data records.

In some embodiments, the current timestamp when each time a record is changed (e.g., an update or a create) is included. As each record contains a last modified date, it is possible to examine only records that have changed since the last synchronization. Each synchronization request is accompanied with a last synchronization time, so only new changes are sent from source to target.

Since saving changes in a relational database does not happen instantaneously, the use of last synchronization time may not be enough to distinguish between two simultaneously-saved changes. As well, records may be missed if the timestamp of a record falls right between the assigned timestamp and synchronization time. This problem can be avoided by adding (or rolling back) a tolerance adjustment to the synchronization time. This may result in more data being sent, but may guarantee correctness, as each record is still compared and updated if changes is made, or discarded if no changes are made. The tolerance can be calculated, as maximum duration required committing changes.

There is often a lag between the time a timestamp is set on a record and the time it is actually saved, such that if a first record was saved before a second record, concurrent transactions running in the system may result in time stamping the second record before the first record. The tolerance can be calculated to be more than enough to cover that period, and more. While a larger tolerance results in more records to be examined, it can better guarantee correctness. By examining concurrent transactions allowed and maximum delay due to actual saving of the data, a reasonable tolerance can be chosen. Then an additional factor can be added for safety (e.g., doubling the calculated tolerance does not affect the performance too much, but ensures data is properly synchronized). A tolerance of 2 minutes, for example, can be used as the additional factor.

This synchronization procedure works well if data are never deleted. In the case of records that can be deleted, however, there is no place to store the timestamp within the record, as the record no longer exists. To account for data being deleted from the source, a different strategy can be applied. As each record is tagged with a unique ID, in addition to sending last synchronization time, all known IDs in the target system can be sent to the source side. Source side can then examine the source IDs, and send back a list of IDs that is no longer in the source side. Target side can then delete the data that are tagged by the source to be deleted.

FIG. 30B depicts Protection Data 3004 in Data Management Operational Data 3001, which has Protection Data records with ID 10002 that was modified on January 1 (1-1; the year is not necessary for this example), ID 10004 that was modified on January 13 (1-13), ID 10012 that was modified on January 12 (1-12), ID 10015 that was modified on January 16 (1-16), and ID 10020 that was modified on January 20 (1-20). The ellipses for each entry in Protection Data 3004 indicate that other fields can be included, as well as the data for the record itself During previous synchronization, ID 10002 that was modified on January 1 (1-1), ID 10004 that was modified on January 13 (1-13), ID 10007 that was modified on January 2 (1-2), ID 10012 that was modified on January 12 (1-12), and ID 10015 that was modified on January 12 (1-12) were synchronized to Protection Data 2904 in Management Console 2801. In this example, the last synchronization of Protection Data 3004 to Protection Data 20904 happened on January 15 (1-15), so the 1-16 modification to record ID 10015, and the 1-20 modification to record ID 10020 in Protection Data 3004 has not been synchronized to Management Console 2801 (Protection Data 2904), and record 10007 was deleted from Protection Data 3004, which is not reflected in Management Console 2801. The last synchronization time (e.g., 1-15 for this example) is recorded for easy calculation for next synchronization.

Figure 30C:
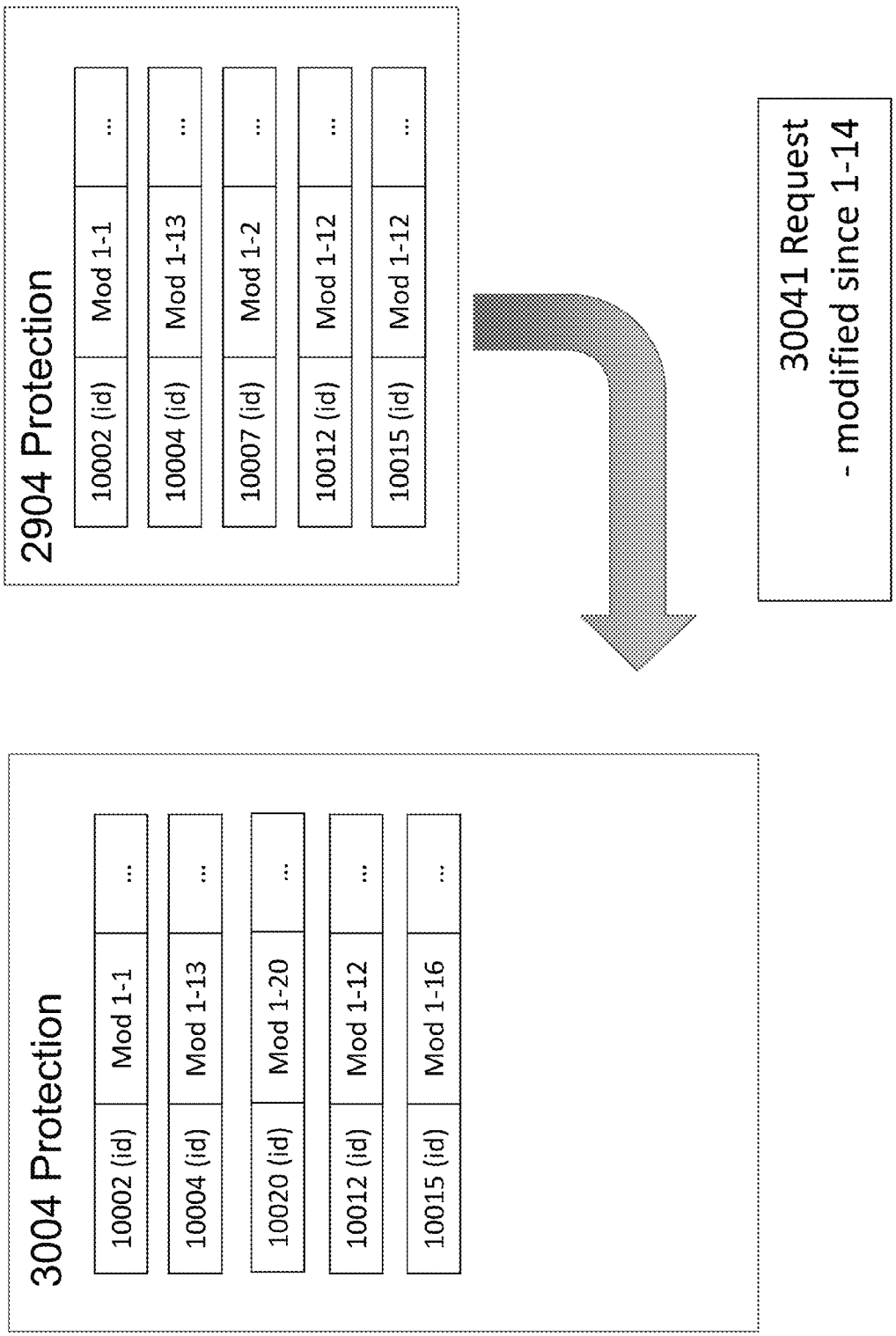
FIG. 30C depicts an example of a synchronization request for medium-sized data in data management operational data, in accordance with some embodiments.

During the next synchronization, Management Console 2801 can send a request to Data Management Virtualization Engine 306 to synchronize Protection Data, as shown in FIG. 30C. The request 30041 contains timestamp from which the system subtracts a tolerance (we will use 1 day for this example), as described above. So in Request 30041, a request for all data from 1-14 onwards is sent, instead of 1-15, after subtracting the tolerance of one day, by Management Console 2801 to Data Management Virtualization Engine 306. As another example, the timestamps can include minute information, second information, etc. For example, if the tolerance is 60 seconds, if the timestamp of the last backup was 1-15 at 1:00 pm, then Management Console

2801 would request data from 1-15 at 12:59 pm from the Data Management Virtualization Engine 306.

When Data Management Virtualization Engine 306 receives the request 30041, the Data Management Virtualization Engine 306 retrieves Protection Data that have been created/modified since 1-14, namely ID 10015 modified at 1-16, ID 10020 modified at 1-20. Contents for ID 10015 (1-16) and ID 10020 (1-20) are sent back to the management console 2801, with all known IDs in Protection Data 3004 (ID 10002, ID 10004, ID 10012, ID 10015, ID 10020), are sent back to Management Console 2801 in reply 30042, shown in FIG. 30D. Management Console 2801 can just update ID 10015, and create ID 10020. Record 10007 is then deleted as it no longer exists in the known IDs list in the reply 30042, which means it is deleted from the Protection Data 3004 since the last synchronization to Protection Data 2904. This process can be repeated for each of the Data Management Virtualization Engines 306 that the Management Console 2802 needs to manage (e.g., each with its own modified data and list of IDs for each Data Management Virtualization Engine 306).

Synchronization of Large Sets of Data (Data that does not Change at all, Only Bulk Delete Old Data)

The use of last modified time incurs the cost of retrieving current time and tagging a record with the time. As each record is tagged with a unique ID, by using an ID generation strategy, it can further improve the efficiency of synchronizing large sets of data, if the data is not modified after it is created. A large set of data can be, for example, a set with over 100,000 operational data records.

One strategy is to assign ID in an ever-increasing manner, and the same ID is not reused. These IDs may have gaps in their order, but in general larger IDs indicate that the record is created later. With this system or method, there is no need to tag each record with a creation time.

To efficiently assign ever-increasing ID numbers, the following strategy can be employed. A chunk of IDs are reserved to be dished out (e.g., 1024 IDs, 2048 IDs, etc.), and the last possible assigned ID is recorded in the database (e.g., ID 1024, ID 2048, etc.). Each time an ID is needed, one is used. When all IDs are used, another chunk of IDs are reserved, and the largest ID possible is again recorded. If the system crashes, those that are not given out can be discarded, and the process can start from the recorded largest ID again. This way the ID can be assigned efficiently, and the ID is in general in the same order as time such that a larger ID is generally assigned to data that occurs later in time. Using a predetermined size, such as 64 bits, for an ID can guarantee that the ID does not loop around.

During synchronization, the largest ID in the target system (and subtracting some tolerance number as in the case of timestamp) is sent to the source system, instead of the synchronization timestamp. Only records with IDs that is larger are sent to the target system. In addition, those known IDs within the tolerance are also sent from the target to the source. So the source only needs to send those that are larger than the ID sent from target and not in the list of IDs that are during the tolerance period. Using this system or method, a target system can take records sent from source as is, without having to compare records.

Figure 30E:
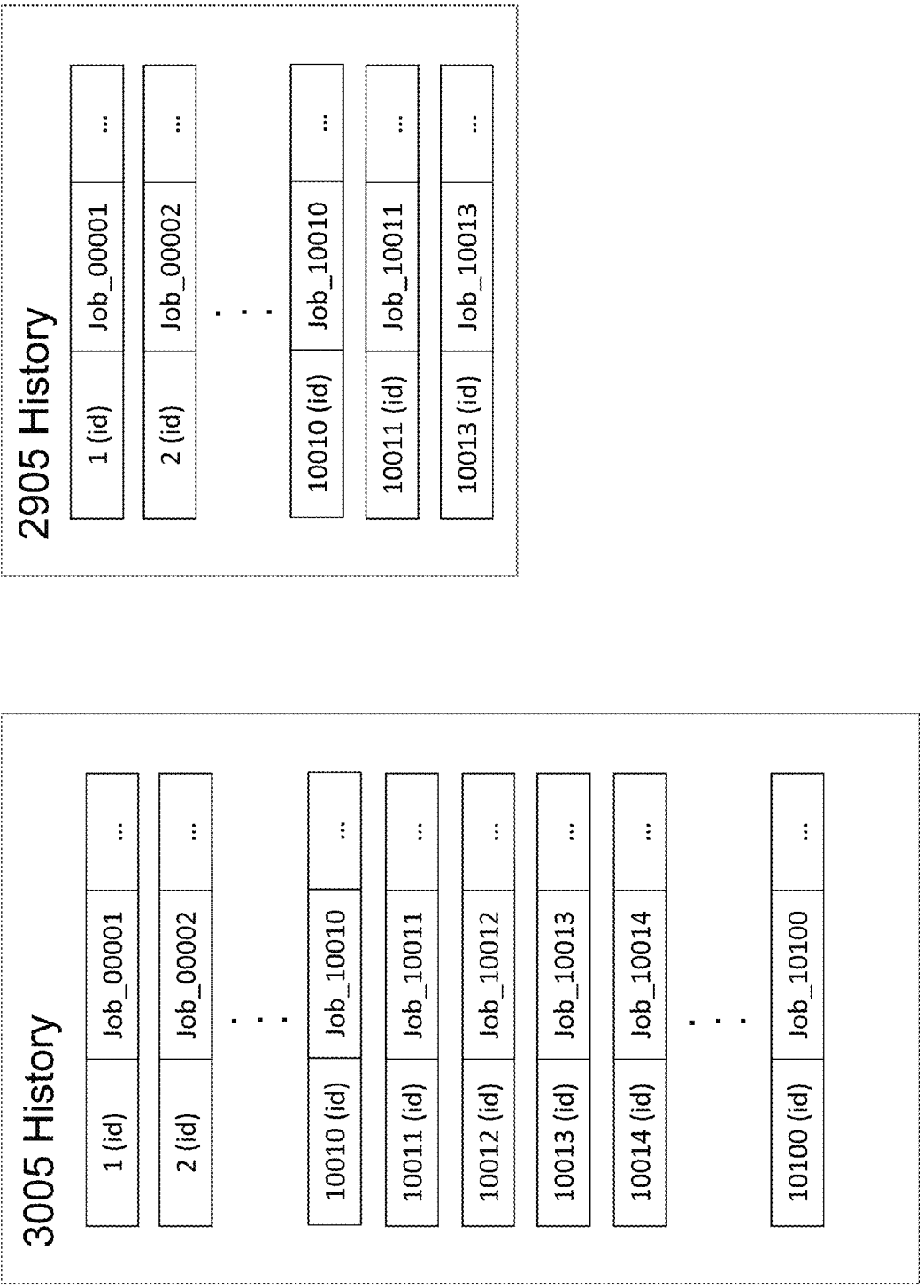
FIG. 30E depicts an example of history data for large-sized data in data management operational data, in accordance with some embodiments.

FIG. 30E depicts History Data 3005 in Data Management Operational Data 3001, with records with IDs 1, 2, and so on up to 10010, 10011, 10012, 10013, 10014, and again up to 10100. Each ID is associated with a job (e.g., ID 1 is associated with Job_00001). The ellipses for each entry in Protection Data 3004 indicate that other fields can be included, as well as the data for the record itself. During a previous synchronization of the history data 3005 to the history data 2905, IDs 1, 2, . . . , 10010, 10011, and 10013 are already synchronized to History Data 2905 in Management Console 2801.

Figure 30F:
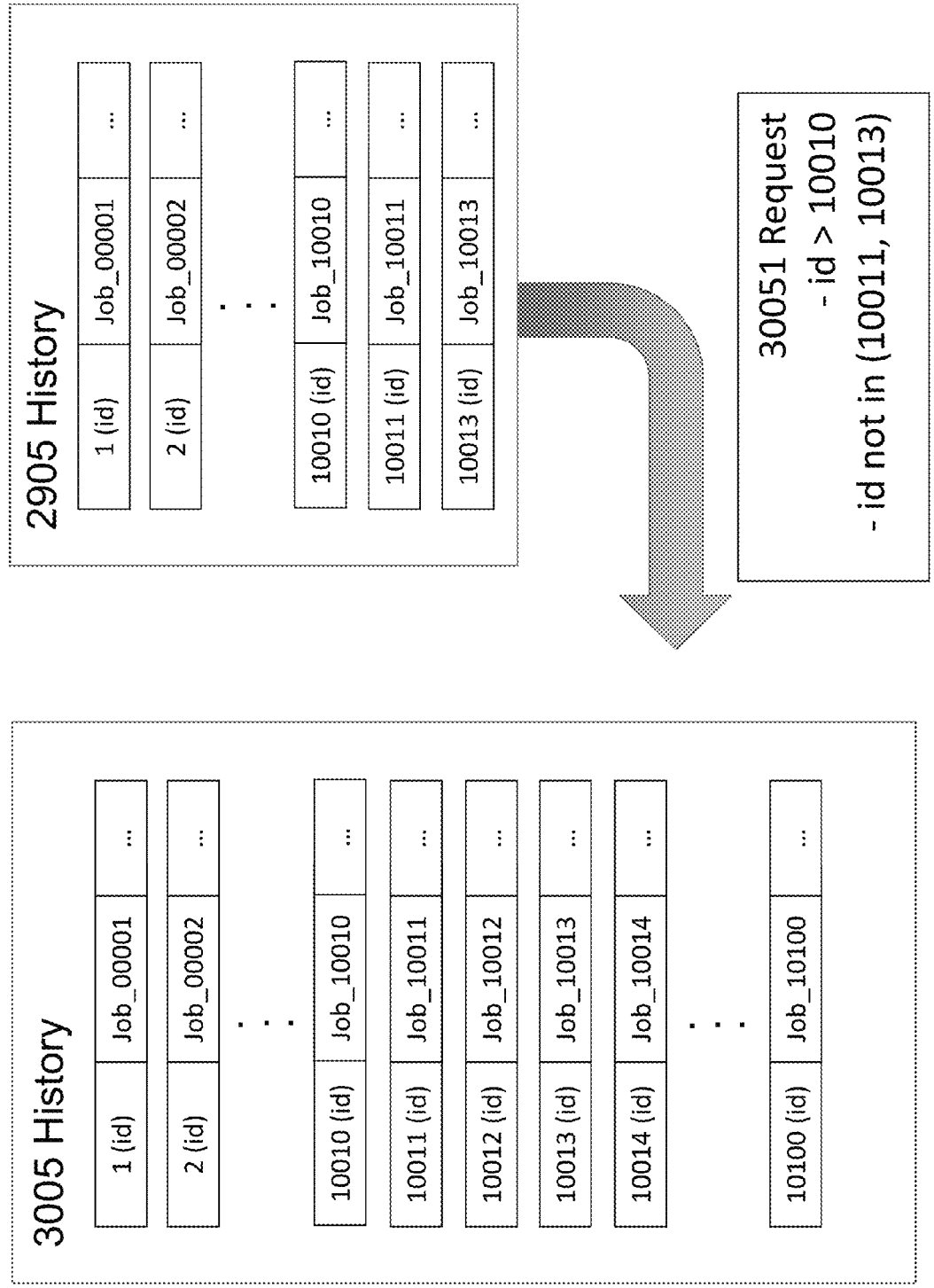
FIG. 30F depicts an example of a synchronization request for history data for large-sized data in data management operational data, in accordance with some embodiments.

During the next synchronization, Management Console 2801 sends a request, 30051 to Data Management Virtualization Engine 306 to synchronize History Data, shown in FIG. 30F. To generate the request, the Management Console 2801 first examines the largest ID that it owns, which is 10013. The Management Console 2801 then subtracts a tolerance number of records from the largest ID. In this example, we can use a tolerance number of 3. Counting backwards for 3 records from 10013 results in an ID of 10010. So the request 30051 is for all history data that is larger than 10010. As another example, a tolerance of 200 can be used, such that counting backwards for 200 records from the largest ID 10013 record results in ID which may be ID 9801. The tolerance can be chosen by examining the concurrent transactions and maximum delays in committing a transaction, with some factor for safety.

The Management Console 2801 also determines if it already has any records between the calculated ID 10010 and the largest ID 1014. The Management Console 2801 determines that History Data 2905 includes IDs 10011 and 10013, and therefore it does not need to receive another copy of this data. So the Management Console 2801 generates request 30051 for all data greater than ID 10010, but do not include (10011, 10013). The request 30051 is then sent to Data Management Virtualization Engine 306.

FIG. 30G depicts Data Management Virtualization Engine 306 after receiving the request 3051; it retrieves data with IDs larger than 10010, but excludes data with IDs 10011 and 10013. The Data Management Virtualization Engine 306 sends the results back to Management Console 2801 in reply 3052. Management Console 2801 can then just add the History Data as reply 30052 will only contain data that the History Data 2905 does not already have. This process can be repeated for each of the Data Management Virtualization Engines 306 that the Management Console 2801 needs to manage (e.g., each with its own modified data and list of IDs for each Data Management Virtualization Engine 306).

As described above, different strategies may be applied to different types of data in the system, depends on the properties of the data. As data accumulate in the system, the properties of the data may be known in advance, and different strategies can be applied to achieve increased performance based on these properties.

Synchronization of data from Data Movement Virtualization Engine 306, to Management Console 2800, may be accomplished through a combination of these strategies. Examples of such combinations include:

SLA, 2902, on Data Movement Virtualization Engine, 306, is synchronized to SLA, 3002, on Management Console, 2800, with the small sets of data strategy.

Protection, 2904, on Data Movement Virtualization Engine, 306, is synchronized to Protection, 3004, on Management Console, 2800, with the medium sets of data strategy.

History, 2905, on Data Movement Virtualization Engine, 306, is synchronized to History, 3005, on Management Console, 2800, with the large sets of data strategy.

Location-Based Hash Index Caching

The disclosed data storage and deduplication engine converts an arbitrarily-sized computer file or disk image source to one or more fixed sized blocks of data. These blocks of data may be written into a capacity-optimized storage pool (CAS), as described above at step 1528. As data is read into the CAS, data blocks are written, or persisted, to the file system in batches in the order they were received. Each batch is preceded by a persist header block. The persist header contains information about each data block that follows it, including size, location, and hash code. A batch persist operation contains about two thousand data blocks from only one source at a time.

The systems and methods described herein improve the performance of reading data from a deduplicated data store. Reading data from a deduplicated data store is often time consuming because by its very nature data stored in a deduplicated data store is often spread out through the data store by various pointers (and/or the like) to avoid duplicate data. Therefore, reading from the deduplicated data store requires reading data spread throughout the data store (e.g., rather than sequentially, such as reading a single file stored on disk). For example, each hash for the data must first be located, then used to look up an index of where the associated data is stored on disk, and then the data can be read from the system (e.g., which often requires many time consuming mechanical movements of hard drives). The hash information is often stored using a B-tree, which is a data structure that keeps data sorted and allows searches, sequential access, insertions, and deletions in logarithmic time. However, using B-trees is often not fast enough when reading from a deduplicated data store.

The systems and computerized methods described herein provide for a custom persist header data structure that is used to store new data as it is written to the deduplication data store. The persist header includes a set of hashes for the data represented by the persist header. The systems and computerized methods also provide for a degrading hash table (also referred to as a "scoreboard") that is used to cache recently-accessed hashes, as well as hashes that are near the recently-accessed hashes. For example, if a hash is read for data stored in a persist header, the remaining hashes associated with the persist header can be pre-cached into memory to improve the speed of the read (e.g., because there is a high likelihood that data after the looked up hash will also be read, since it was written during a same write operation to the deduplicated data store). If the next data request is for a hash pre-loaded in the degrading hash table, the pre-loaded data avoids needing to look up the data in the master hash index (which can be time consuming).

Figure 31:
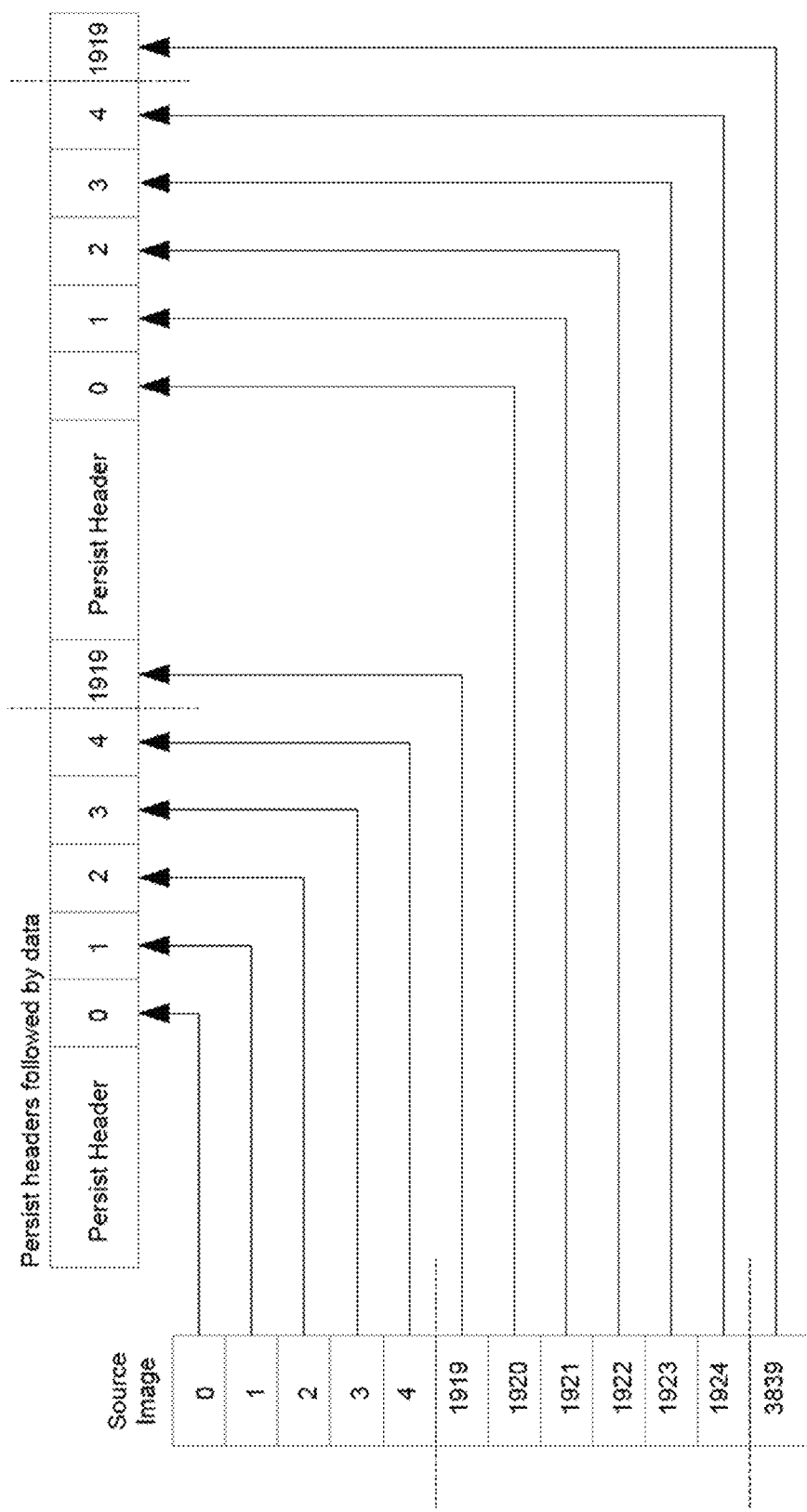
FIG. 31 is a schematic diagram of a persist header in accordance with some embodiments.

FIG. 31 is a schematic diagram of the persist header and subsequent data on disk in accordance with some embodiments. The persist header 3100 precedes a number of data blocks 0, 1, 2, 3, 4 . . . 1919 to be written to disk as a logically single operation. For the persist header 3100, blocks 0-1919 represent the first blocks 0-1919 from the source image 3102. Persist header 3104 also precedes 1920 blocks (0, 1, 2, 3, 4 . . . 1919). For the persist header 3104, blocks 0-1919 represent the second 1920 blocks, or blocks 1920-3839 from the source image 3102. As data is stored, a persist header is written to disk first and then followed by up to 1920 individual data bocks. The persist header maintains the identifying hash information about each of the ensuing data blocks.

While the data stored in each persist header is shown as corresponding linearly to data stored on the source image, this is for illustrative purposes only. For example, for deduplicated data storage, only new data (and not duplicate data) is written from the source image to the deduplicated data store. Therefore, in these embodiments the persist header only stores the new data for each write, so the data stored by each persist header may not necessarily correspond to a linear relationship with the data stored in the source image. But by arranging the data in persist headers in this manner, the persist header stores potentially related content, nearby content, and/or the like.

Figure 32:
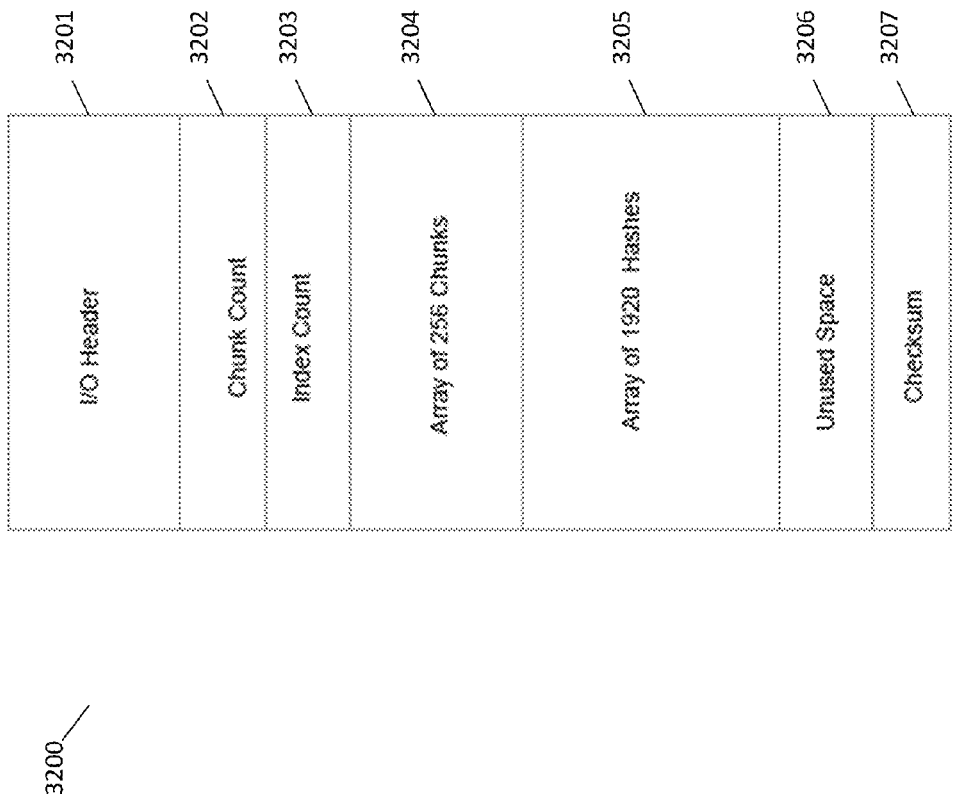
FIG. 32 is a schematic diagram of a hash index in accordance with some embodiments.

FIG. 32 is a schematic diagram of the persist header data structure. The array of 1920 hashes 3205 contains the hash value of each of the succeeding blocks of data following the persist header as documented in FIG.31. The array of 256 chunks 3204 contains information about the exact location, format, and validation checksum of a "chunk" of up to 16 hash values.

I/O Header 3201 is a data structure (e.g., C Language structure) that is shared for all system metadata stored on disk. This structure can include, for example, data for error checking, a page identification number, a page version, a timestamp of when it was written, and a data type identifier.

Chunk Count 3202 is an integer that contains the number of chunks of user data that follow this persist header. A "chunk" contains up to sixteen 4K (4096 bytes) of data.

Index count 3203 is an integer that contains the number of hashes that are contained in the subsequent previously mentioned chunks that follow the persist header.

Array of 256 Chunks 3204 is an array of structures (e.g., C Language structures) that describe the subsequent chunks of user data including, for example: location, compression, check sum, number of hashes (up to 16), and encryption.

Array of 1920 Hashes 3205 is an array of structures (e.g., C Language structures) that contain the SHA1 hash values for all the 4K data blocks described by this persist header.

Unused space 3206 is a filler to 64K (65536 bytes) to align the whole persist header structure.

Checksum 3207 is an integer checksum of the structure to be used to verify data integrity.

Figure 33:
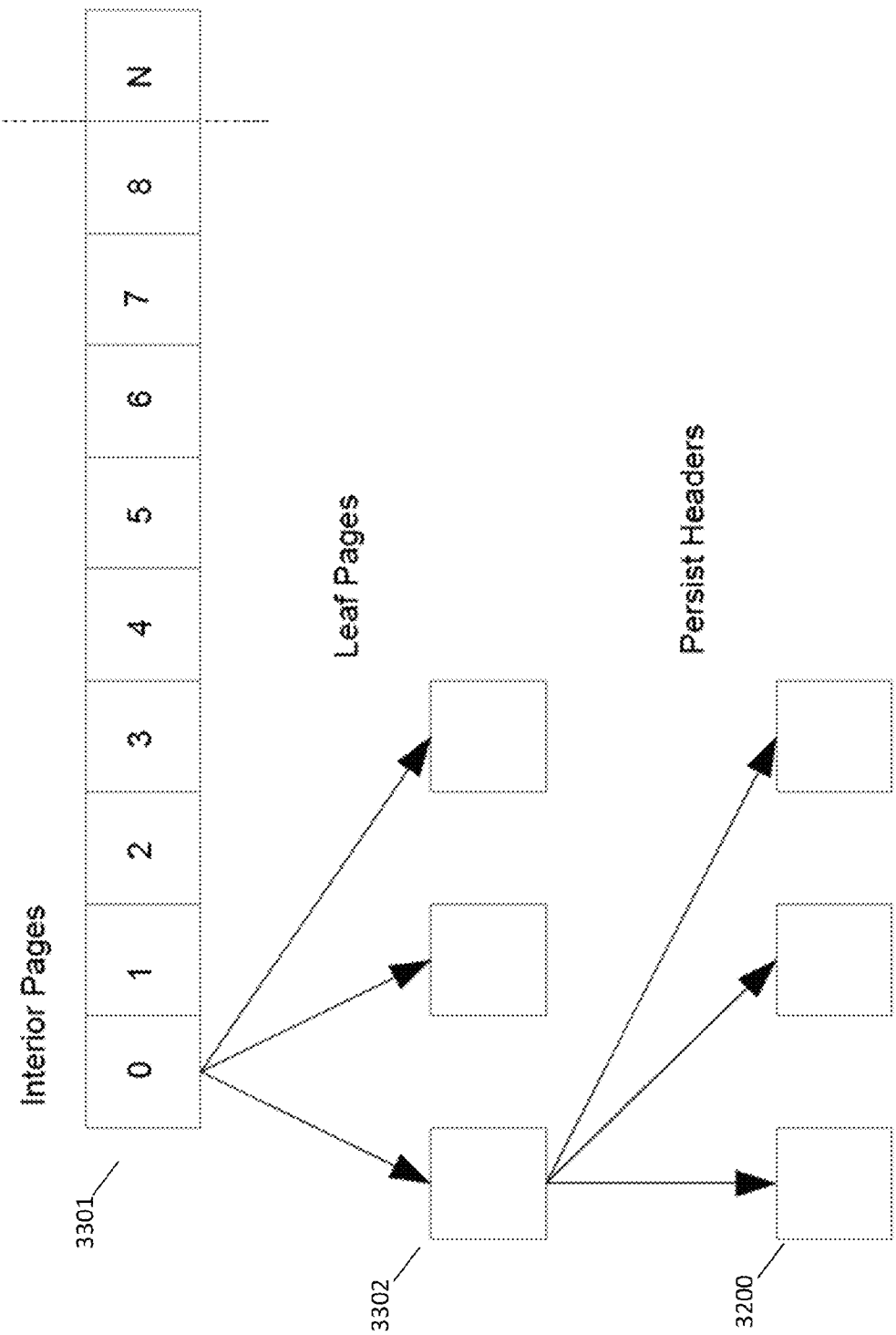
FIG. 33 is a schematic diagram of index pages in a storage system in accordance with some embodiments.

FIG. 33 is an exemplary schematic diagram of a deduplication hash index. For example, the deduplication has index can be implemented in a B-tree. Interior pages form an indexed array of references to leaf pages which in turn are an indexed array reference to the hash values contained in the persist header (FIG. 32). A portion of the hash value is used as an index into the interior pages. In a hierarchical fashion, more of the hash value is then used to identify the appropriate leaf page. Lastly, the persist header is used to find the relevant data block.

Referring to "Interior Pages," 3301 this is an array of structures (e.g., C Language structures) that is stored on disk and describes the location of block of references to "Leaf Pages." 3302 Each interior page structure contains, for example, an array of disk locations in which to find leaf pages.

Referring to "Leaf Pages," 3302 this a structure (e.g., C Language structure) that is stored on disk and cross references hash values to "Persist Headers."3200

Referring to "Persist Headers," see FIG. 32.

The hash index is a mechanism by which the data stored in the system is found based on its hash value. The three levels shown in FIG. 32 (interior page 3301, leaf page 3302, and persist header 3200) create a three tier hierarchy which provides the ability to locate any specific datum by its hash without requiring the entirety of the index to be located in system RAM. For example, the interior pages can reside in RAM while the leaf pages are loaded and unloaded as needed. Similarly, persist headers are loaded as needed as referenced by leaf pages.

Figure 34:
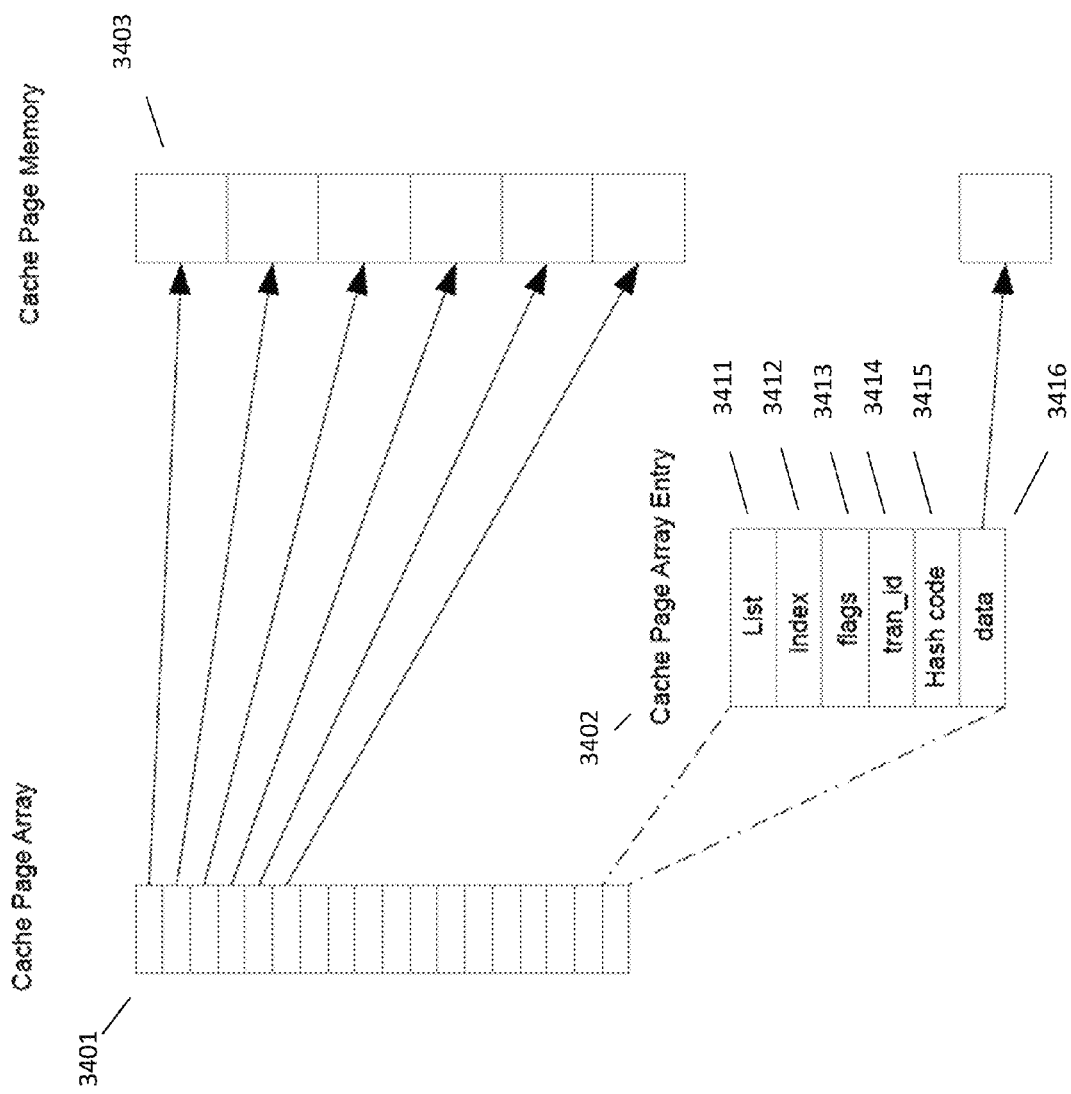
FIG. 34 is a schematic diagram of a page cache in accordance with some embodiments.

FIG. 34 is a schematic diagram of the "page cache" in accordance with some embodiments. The page cache is an array of pre-allocated memory pages in the system; each memory page is referred to as a "cache page." The cache pages are managed within the "page cache" as an LRU (Least Recently Used) list. The page cache can be used as the central repository for memory within the system. For example, most dynamic memory used by the application can be obtained from the page cache.

When specific datum is required, the page cache LRU list is searched in a linear fashion from most recently used to least and, if found, the appropriate cache page 3403 is removed from the LRU list and returned. If the datum is not found, the least recently used cache page is returned. When a cache page is released, it is placed in the front of the LRU list so that it may be found quickly if needed again.

Referring to "Cache Page Array" 3401, this is an array of Cache Page Array Entry 3402 structures (e.g., C Language structures) that describe a number of pre-allocated 64K (65536 bytes) memory blocks. All cache pages are sized to be 64K (65536 bytes). Interior pages 3301, leaf pages 3302, persist headers 3200 as well as all internal structures within the system are sized to fit into one cache page.

Referring to "Cache Page Array Entry" 3402 this is a structure (e.g., C Language structure) that describes a single cache page entry in the cache page array. Where "list" 3411 is a structure (e.g., C Language structure) for managing linked list inclusion (e.g., this is used to manage the LRU). The "Index" 3412 is an index value. The "flags" 3413 value is used to describe how the page is being used within the application, for instance, the flags may indicate whether or not the cache page is in use or whether or not it contains data that needs to be saved. The "tran_id" 3414 field is used to identify the current task using the cache page. The "hash code" 3415 field is a C language structure that typically contains a SHA1 hash code for the cache page identified by this entry. The cache page 3403 may be used for any number of purposes; interior page 3301, leaf page 3302, persist header 3200, or other system data. The hash identifier is used find a specific cache page in the page cache. The "data" 3416 field is a pointer (e.g., C Language pointer) to the memory described by this entry. In some embodiments, the data points to a persist header as shown in FIG. 32.

Figure 35:
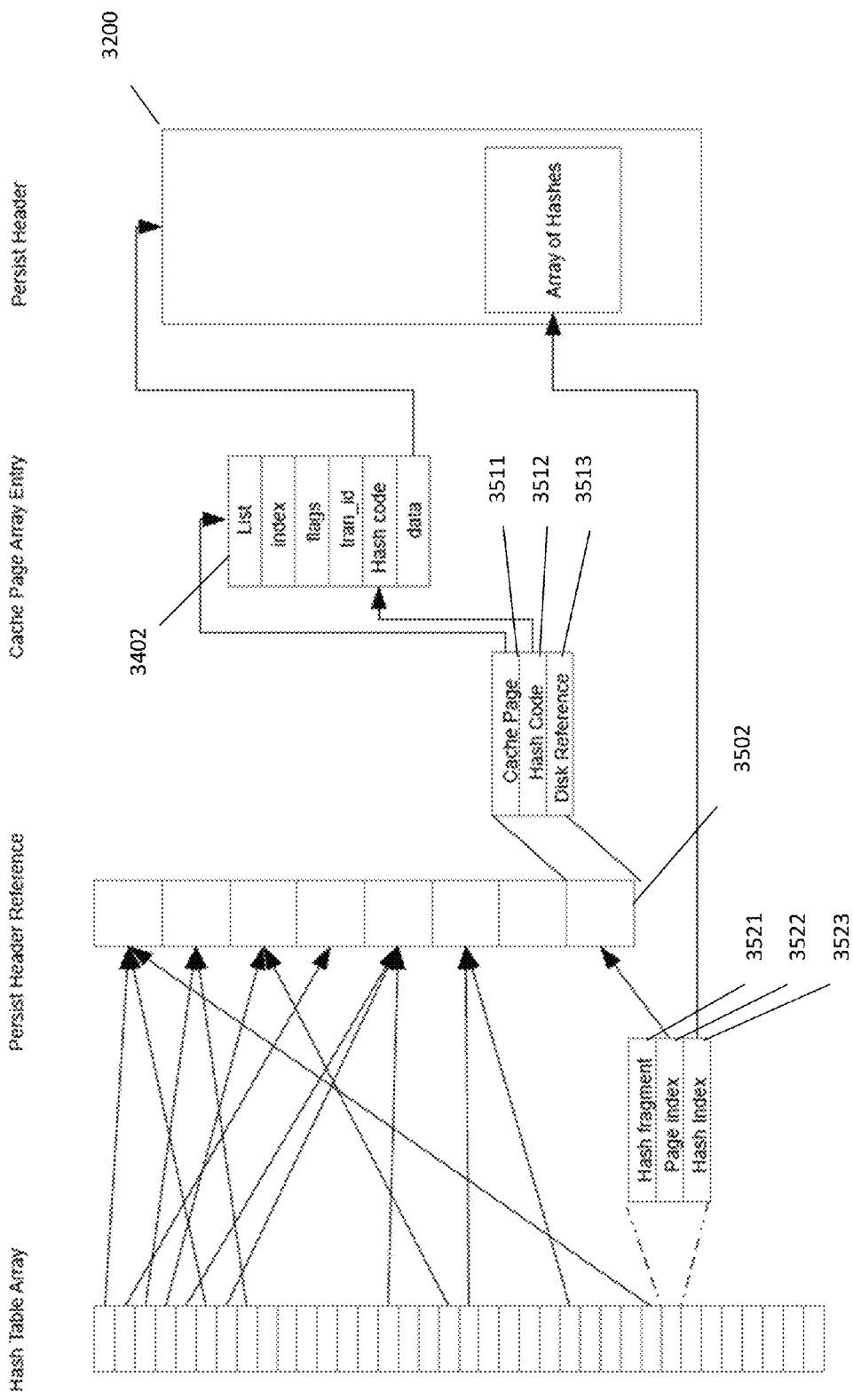
FIG. 35 is a schematic diagram of a key/value hash table in accordance with some embodiments.

FIG. 35 is a schematic diagram of the degenerating scoreboard system. The "Hash Table Array" 3501 is an array of data structures which contain a pair of numbers: an index into the "Persist Header Reference" 3502 array and an index into a persist header "array of 1920 hashes" (FIG. 3205). The persist header reference is an MRU (most recently used) array of persist header hash codes. The persist header hash codes are used to retrieve a "persist header" (FIG. 32) from the "page cache" (FIG. 34). Data is found by using a portion of its identifying hash value as an index into the "Hash Table Array" 3501 which results in a persist header reference index and an index into the persist header "array of 1920 hashes" 3205. The page header reference index is used to obtain the persist header (FIG. 32) hash code from the "persist header reference" 3502. The hash code 3512 is then used to retrieve the persist header data from the page cache (FIG. 34). The index to the persist header "array of 1920 hashes" 3204 is used to locate the specific identifying hash code.

Referring to "Hash Table Array" 3501 this is an array of structures (e.g., C Language structures) that link a hash value to an entry in the "Persist Header Reference" 3502. Each entry contains three fields: "Hash Fragment" 3521, "Page Index" 3522, and "Hash Index" 3523. "Hash Fragment" is a part of a SHA1 that is used to check that the entry found matches the hash value referenced. "Page Index" is a numerical index into the "Persist Header Reference." "Hash Index" is an index into a "Persist Header" "array of 1920 hashes" (FIG. 32).

Referring to the "Persist Header Reference" 3502 this is an array of structures (e.g., C Language structures) that reference "Persist Headers" (FIG. 32) as contained within the "Page Cache" (FIG. 34). Each entry in the Persist Header Reference includes a reference to a cache page entry 3402, a hash code, and a disk reference. The cache page 3511 is used as an index into the cache page array (see FIG. 3401). The hash code is used to verify the proper cache page array entry was identified when searching the cache page array for the cache page.

The hash table array is used as a degrading hash table (or "scoreboard"). For example, as data is read from a deduplicated data store, the first hash is retrieved (e.g., as described in FIG. 36, such as in a B-tree), and the array of 1920 hashes 3205 from the persist header 3200 that includes the first hash is loaded into the hash table array. If a subsequent request is for data with a hash stored in the hash table array, then the request can be processed using just the degrading hash table (e.g., as described in FIG. 37). If a subsequent request is a request for data with a new hash not stored in the hash table array, then the request is processed using the main tree (e.g., as described in FIG. 36), and the array of 1920 hashes 3205 from the new persist header 3200 that includes the new hash is loaded into the hash table array.

The hash table array degrades as new arrays of hashes are added because the hash table array has a fixed size. For example, the hash table array can be configured such that it is approximately 10 times the size of the array of 1920 hashes 3205. Therefore, once the hash table array fills up with hashes from various persist headers, as new hashes are added, the previous hashes are overwritten. This process can be achieved as a function of adding the hashes to the hash table array without using other strategies for managing the hash table array (e.g., LRU aging algorithms).

Figure 36:
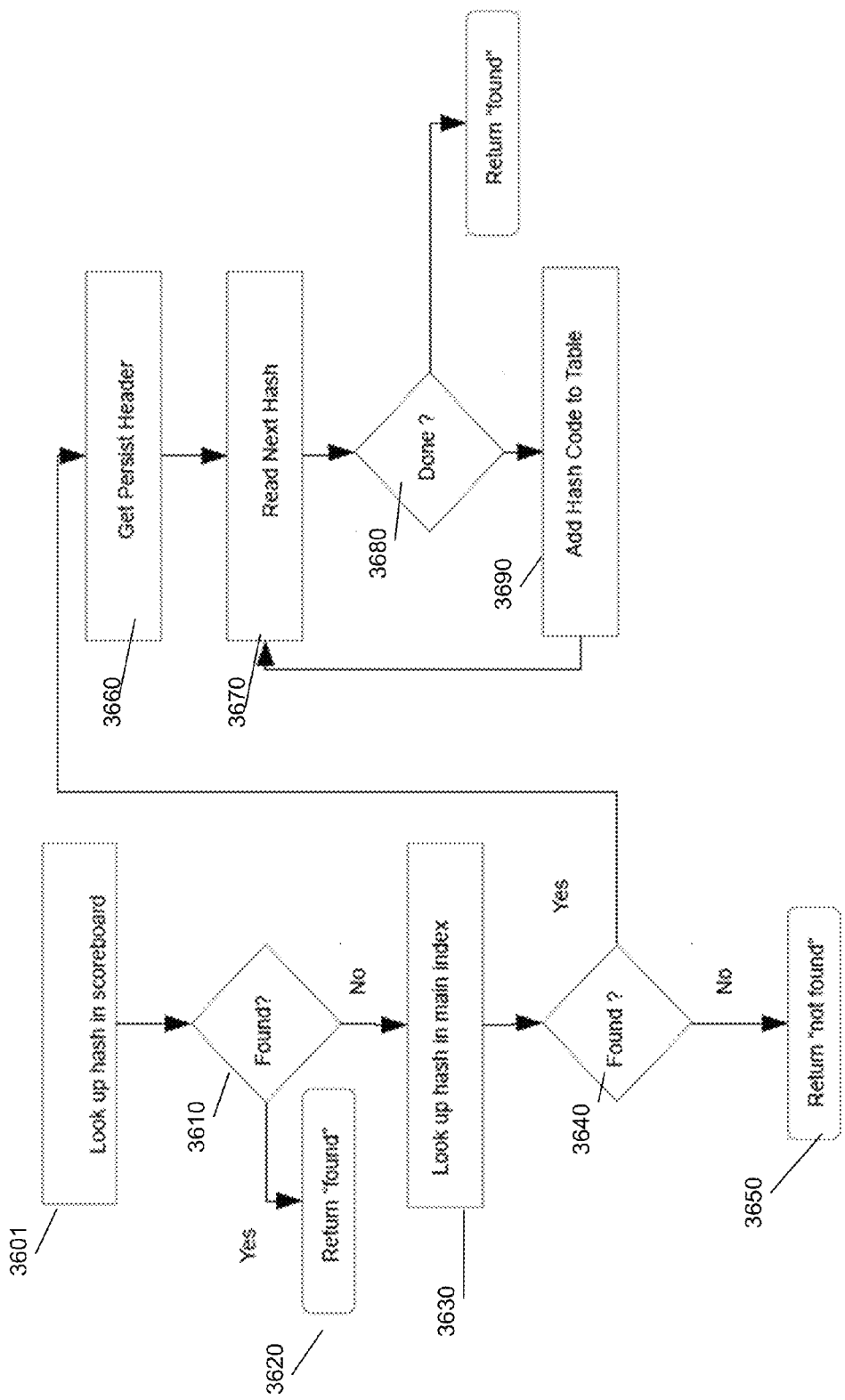
FIG. 36 is a flowchart depicting the operation of a system that uses a scoreboard to find a hash, in accordance with some embodiments.

FIG. 36 is a flowchart depicting the operational flow of a system that uses scoreboard to find a hash which is not referenced by the scoreboard shown in FIG. 35. Upon a failure, the hash is found in the larger deduplication indexing system (e.g., shown in FIG. 33) and added to the scoreboard. At step 3601 we lookup data in the scoreboard. At step 3610 we test if it is found in the hash table array. At step 3620, if the hash is found, it is returned. At step 3630, if the hash was not found we look it up in the main index (e.g., shown in FIG. 33). At step 3640 we test if it was found. At step 3650, if the hash is not found we return. At step 3660, if step 3640 found the hash in the main index, we retrieve it's persist header (FIG. 32). At step 3670, 3680, and 3690, we iterate through the persist header's "Array of Hashes" and populate the scoreboard with data from the persist header.

Figure 37:
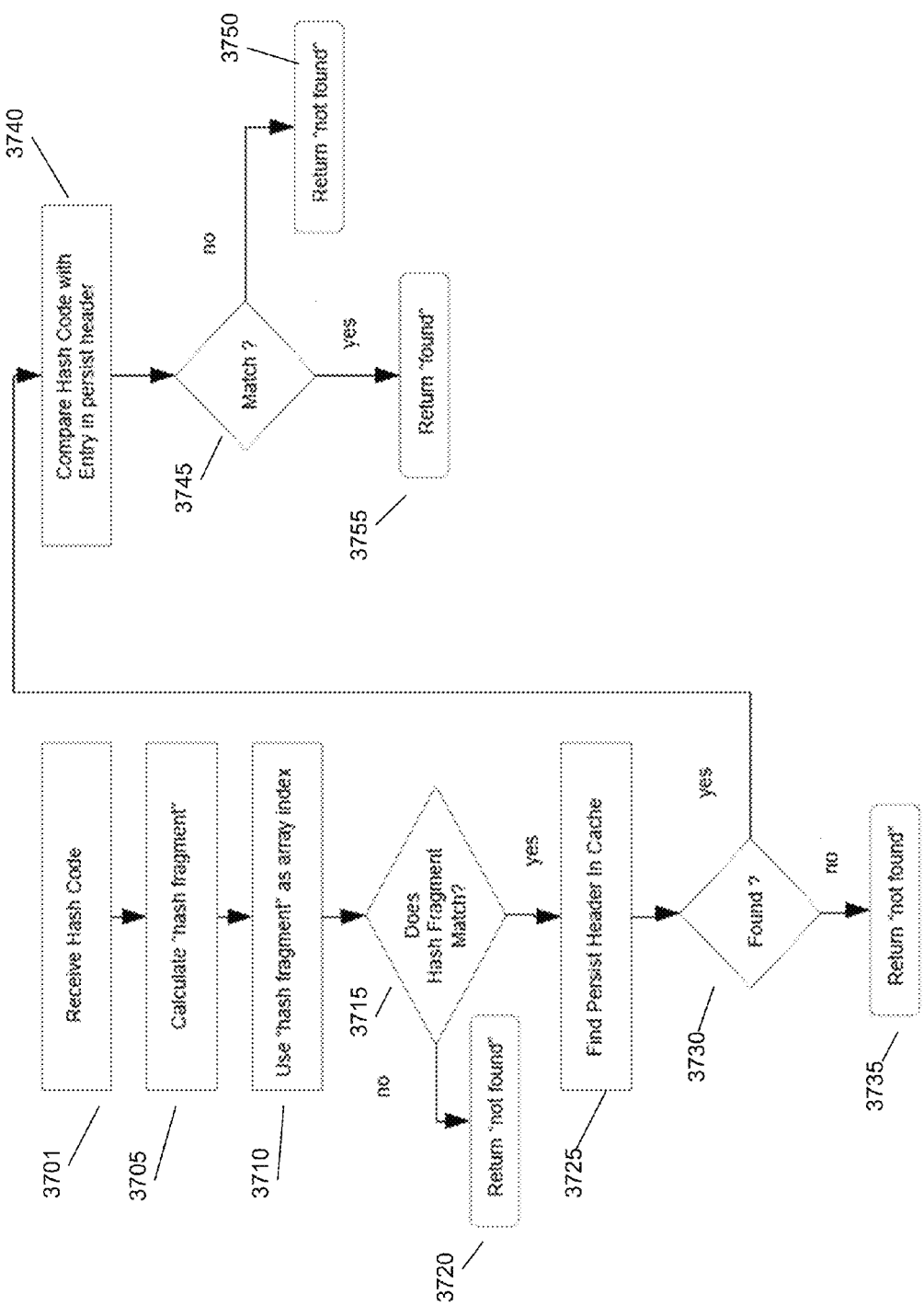
FIG. 37 is a flowchart depicting the operation of a scoreboard when finding a hash in accordance with some embodiments.

FIG. 37 is a flowchart depicting the operational flow of a system that uses scoreboard to find a hash which is referenced by the scoreboard. At step 3701 the scoreboard receives the hash code. At step 3705 a small portion of the hash code is used to create a "hash fragment." At step 3710 the "hash fragment" is used as an index in to the scoreboard "Hash Table Array" (FIG. 35). At step 3715 we test if the "hash fragment" matches the fragment within the "Hash Table Array" entry (FIG. 35). At step 3720 we exit the routine with "not found" if the hash does not match. At step 3725 we use the "Page Index" from the "Hash Table Array" entry to retrieve the cache page reference of the persist header (FIG. 32) which should be in the "Page Cache" (FIG. 34). At step 3730 we test if the correct persist header page could be found in the page cache. In step 3735 we exit with "not found" if it is not. At step 3740 we compare hash code received in step 3701 with the entry in the persist header. At step 3745 we test the result of the comparison. At step 3750 we exit with "not found" if the hash values do not match. At step 3755 return with "found."

The systems and methods described herein can speed up locating data by using data locality to augment a generalized index system. Cryptographic hash codes such as SHA1, by design, do not provide a way of predicting subsequent hash values. The scoreboard described herein is a process of using the characteristics of data locality to find data without going to the main hash index (FIG. 33). Further, the degenerating nature of the scoreboard, where there is no active maintenance of the system, reduces the overhead of managing a more conventional cache system.

System Implementation

Figure 38:
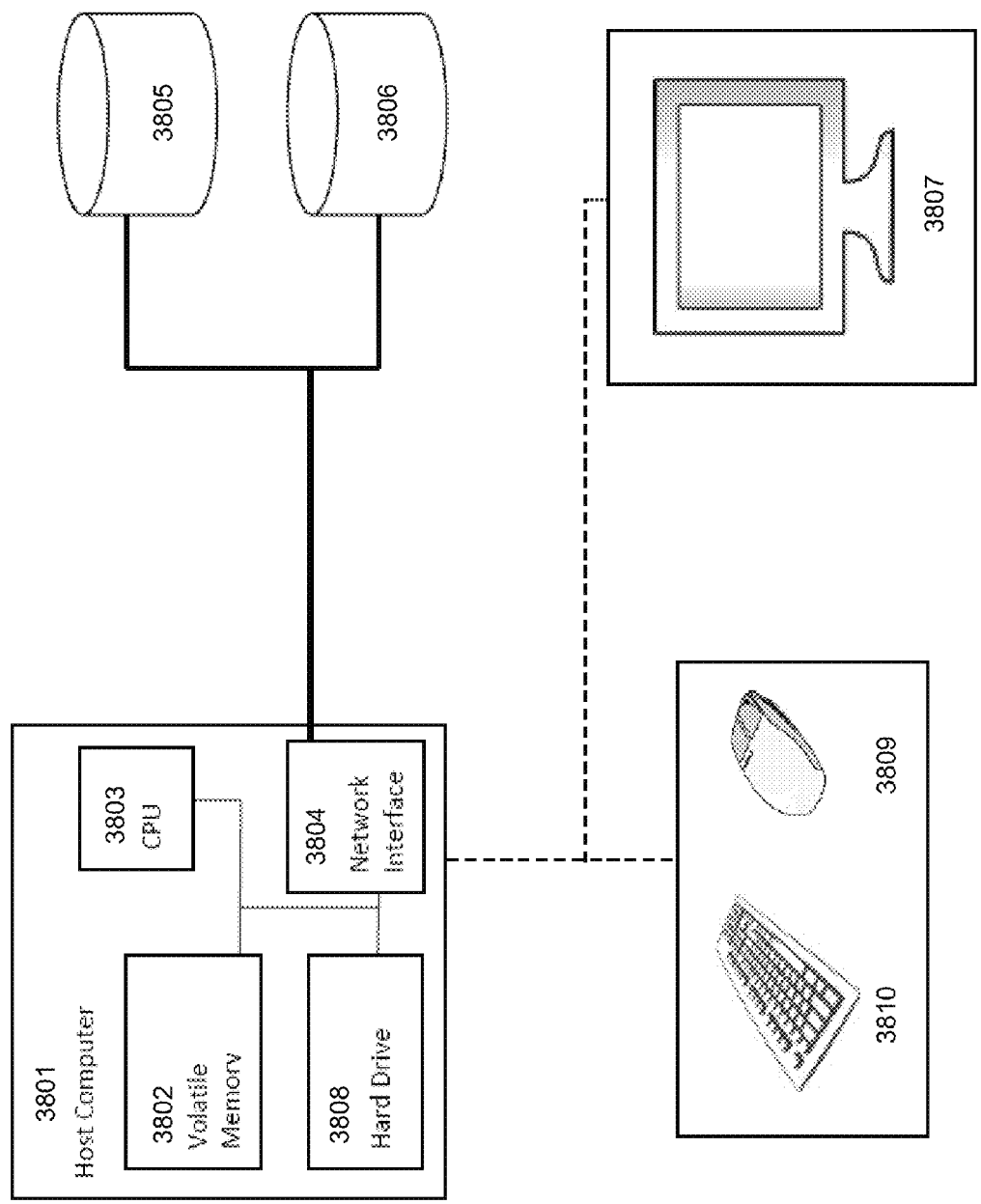
FIG. 38 is a diagram that depicts the various components of a computerized system upon which certain elements may be implemented, according to certain embodiments.

FIG. 38 is a diagram that depicts the various components of a computerized system upon which certain elements may be implemented, according to certain embodiments of the disclosure. The logical modules described may be implemented on a host computer 3801 that contains volatile memory 3802, a persistent storage device such as a hard drive, 3808, a processor, 3803, and a network interface, 3804. Using the network interface, the system computer can interact with storage pools 3805, 3806 over a SAN or Fibre Channel device, among other embodiments. Although FIG. 38 illustrates a system in which the system computer is separate from the various storage pools, some or all of the storage pools may be housed within the host computer, eliminating the need for a network interface. The programmatic processes may be executed on a single host, as shown in FIG. 38, or they may be distributed across multiple hosts.

The host computer shown in FIG. 38 may serve as an administrative workstation, or may implement the application and Application Specific Agent 402, or may implement any and all logical modules described in this specification, including the Data Virtualization System itself, or may serve as a storage controller for exposing storage pools of physical media to the system. Workstations may be connected to a graphical display device, 3807, and to input devices such as a mouse 3809 and a keyboard 3810. Alternately, the active user's workstation may include a handheld device.

Throughout this specification reference is made to software components, but all references to software components are intended to apply to software running on hardware. Likewise, objects and data structures referred to in the specification are intended to apply to data structures actually stored in memory, either volatile or non-volatile. Likewise, servers are intended to apply to software, and engines are intended to apply to software, all running on hardware such as the computer systems described in FIG. 38.

The foregoing has outlined some of the more pertinent features of the subject matter. These features should be construed to be merely illustrative. Many other beneficial results can be attained by applying the disclosed subject matter in a different manner or by modifying the subject matter as will be described.

The invention claimed is:

1. A computerized method for backing up remote database storage such that a volume on the remote database storage can be incrementally backed up to create a series of incremental point-in-time images of the volume over time, such that each point-in-time image that can be individually loaded as an operational database, comprising:

activating, by a computing device, a protection policy for database storage at a remote host;

transmitting, by the computing device, a first backup request at a first time to the remote host comprising data indicative of a volume on the database storage to back up according to the protection policy;

presenting, by the computing device, a staging disk to the remote host so that the remote host can perform a full backup of the volume to the staging disk using a database backup tool provided by a vendor of the database storage in response to the first backup request;

generating, by the computing device, a first point-in-time image of the staging disk for the first time, wherein the first point-in-time image preserves the database structure such that the first point-in-time image can be loaded as an operational database;

transmitting, by the computing device, a second backup request at a second time to the remote host comprising data indicative of the volume on the database storage to back up according to the protection policy;

presenting, by the computing device, the staging disk to the remote host so that the remote host can use the database backup tool to perform an incremental backup of the volume to the staging disk using the full backup to generate an incrementally updated backup of the volume from the first time to the second time; and generating, by the computing device, a second point-in-time image of the staging disk for the second time, wherein the second point-in-time image backup preserves the database structure such that the second point-in-time image can be loaded as an operational database, thereby allowing the computing device to generate incremental point-in-time images for the volume over time.

2. The method of claim 1 further comprising:

receiving a backup result from the remote host comprising data indicative of whether the full backup of the volume to the staging disk succeeded or whether the full backup of the volume to the staging disk failed;

determining, based on the backup result, that the full backup failed; and identifying an error code in the backup result and storing the error code.

3. The method of claim 1 further comprising:

receiving a backup result from the remote host comprising data indicative of whether the full backup of the volume to the staging disk succeeded or whether the full backup of the volume to the staging disk failed;

determining, based on the backup result, that the full backup succeeded;

creating the point-in-time image of the staging disk; and cataloging the point-in-time image of the staging disk as a most recent backup of the volume.

4. The method of claim 1, further comprising:

receiving a response to the first backup request comprising data indicative of staging disk requirements for the volume, the staging disk requirements comprising a required size for a staging disk to back up the volume;

determining, by the computing device, the staging disk based on the response, wherein determining the staging disk based on the response comprises:

determining there is no previously cataloged point-in-time image for the volume; and allocating the staging disk from data storage of the computing device with a size based on the required size from the staging disk requirements.

5. The method of claim 4, wherein the size is calculated based on a predetermined threshold that specifies a size of the staging disk that allows repeated back-ups to the staging disk without running out of storage.

6. The method of claim 1, further comprising:
determining that a previously cataloged point-in-time image for the volume expired; and
deleting the previously cataloged point-in-time image.

7. The method of claim 1, further comprising:
receiving a response to the first backup request comprising data indicative of staging disk requirements for the volume, the staging disk requirements comprising a required size for a staging disk to back up the volume;
determining that a previously cataloged point-in-time image for the volume is associated with a previous staging disk comprising a size below the required size from the staging disk requirements; and
allocating the staging disk from data storage of the computing device with a size based on the required size from the staging disk requirements, wherein the staging disk does not comprise the previously cataloged point-in-time image.

8. The method of claim 1, wherein the database storage stored on the remote host comprises a database on an internal disk to the remote device, on a networked drive, or any combination thereof.

9. The method of claim 1, wherein the database storage is an Oracle database, and the database backup tool is the Oracle RMAN command.

10. A computing device for backing up remote database storage such that a volume on the remote database storage can be incrementally backed up to create a series of incremental point-in-time images of the volume over time, such that each point-in-time image that can be individually loaded as an operational database, the server comprising:
a storage pool; and
a processor in communication with the database, and configured to run a module stored in memory that is configured to cause the processor to:
activate a protection policy for database storage at a remote host;
transmit a first backup request at a first time to the remote host comprising data indicative of a volume on the database storage to back up according to the protection policy;
present a staging disk to the remote host, wherein the staging disk is allocated from the storage pool, so that the remote host can perform a full backup of the volume to the staging disk using a database backup tool provided by a vendor of the database storage in response to the first backup request;
generate a first point-in-time image of the staging disk for the first time, wherein the first point-in-time image preserves the database structure such that the first point-in-time image can be loaded as an operational database;
transmit a second backup request at a second time to the remote host comprising data indicative of the volume on the database storage to back up according to the protection policy;
present the staging disk to the remote host so that the remote host can use the database backup tool to perform an incremental backup of the volume to the staging disk using the full backup to generate an incrementally updated backup of the volume from the first time to the second time; and
generate a second point-in-time image of the staging disk for the second time, wherein the second point-in-time image backup preserves the database structure such that the second point-in-time image can be loaded as an operational database, thereby allowing the computing device to generate incremental point-in-time images for the volume over time.

11. The computing device of claim 10, wherein the processor is further caused to:
receive a backup result from the remote host comprising data indicative of whether the full backup of the volume to the staging disk succeeded or whether the full backup of the volume to the staging disk failed;
determine, based on the backup result, that the full backup failed; and
identify an error code in the backup result and storing the error code.

12. The computing device of claim 10, wherein the processor is further caused to:
receive a backup result from the remote host comprising data indicative of whether the full backup of the volume to the staging disk succeeded or whether the full backup of the volume to the staging disk failed;
determine, based on the backup result, that the full backup succeeded;
create the point-in-time image of the staging disk; and
catalog the point-in-time image of the staging disk as a most recent backup of the volume.

13. The computing device of claim 10, wherein the processor is further caused to:
receive a response to the first backup request comprising data indicative of staging disk requirements for the volume, the staging disk requirements comprising a required size for a staging disk to back up the volume;
determine the staging disk based on the response, wherein determining the staging disk based on the response comprises:
determining there is no previously cataloged point-in-time image for the volume; and
allocating the staging disk from data storage of the computing device with a size based on the required size from the staging disk requirements.

14. The computing device of claim 13, wherein the size is calculated based on a predetermined threshold that specifies a size of the staging disk that allows repeated back-ups to the staging disk without running out of storage.

15. The computing device of claim 10, wherein the processor is further caused to:
determine that a previously cataloged point-in-time image for the volume expired; and
delete the previously cataloged point-in-time image.

16. The computing device of claim 10, wherein the processor is further caused to:
receive a response to the first backup request comprising data indicative of staging disk requirements for the volume, the staging disk requirements comprising a required size for a staging disk to back up the volume;
determine that a previously cataloged point-in-time image for the volume is associated with a previous staging disk comprising a size below the required size from the staging disk requirements; and
allocate the staging disk from data storage of the computing device with a size based on the required size from the staging disk requirements, wherein the staging disk does not comprise the previously cataloged point-in-time image.

17. A non-transitory computer readable medium having executable instructions operable to cause an apparatus to:
activate a protection policy for database storage at a remote host;

transmit a first backup request at a first time to the remote host comprising data indicative of a volume on the database storage to back up according to the protection policy;

present a staging disk to the remote host so that the remote host can perform a full backup of the volume to the staging disk using a database backup tool provided by a vendor of the database storage in response to the first backup request;

generate a first point-in-time image of the staging disk for the first time, wherein the first point-in-time image preserves the database structure such that the first point-in-time image can be loaded as an operational database;

transmit a second backup request at a second time to the remote host comprising data indicative of the volume on the database storage to back up according to the protection policy;

present the staging disk to the remote host so that the remote host can use the database backup tool to perform an incremental backup of the volume to the staging disk using the full backup to generate an incrementally updated backup of the volume from the first time to the second time; and generate a second point-in-time image of the staging disk for the second time, wherein the second point-in-time image backup preserves the database structure such that the second point-in-time image can be loaded as an operational database, thereby allowing the computing device to generate incremental point-in-time images for the volume over time.

18. The non-transitory computer readable medium of claim 17, wherein the apparatus is further caused to:

receive a backup result from the remote host comprising data indicative of whether the full backup of the volume to the staging disk succeeded or whether the full backup of the volume to the staging disk failed;

determine, based on the backup result, that the full backup failed; and identify an error code in the backup result and storing the error code.

19. The non-transitory computer readable medium of claim 17, wherein the apparatus is further caused to:

receive a backup result from the remote host comprising data indicative of whether the full backup of the volume to the staging disk succeeded or whether the full backup of the volume to the staging disk failed;

determine, based on the backup result, that the full backup succeeded;

create the point-in-time image of the staging disk; and catalog the point-in-time image of the staging disk as a most recent backup of the volume.

20. The non-transitory computer readable medium of claim 17, wherein the apparatus is further caused to:

receive a response to the first backup request comprising data indicative of staging disk requirements for the volume, the staging disk requirements comprising a required size for a staging disk to back up the volume;

determine the staging disk based on the response, wherein determining the staging disk based on the response comprises:

determining there is no previously cataloged point-in-time image for the volume; and allocating the staging disk from data storage of the computing device with a size based on the required size from the staging disk requirements.

* * * * *